United States Patent
Johnson et al.

(10) Patent No.: US 9,489,576 B2
(45) Date of Patent: Nov. 8, 2016

(54) CROP STAND ANALYSIS

(71) Applicant: FI2 Solutions, LLC, Mankato, MN (US)

(72) Inventors: Jerome D. Johnson, Waterville, MN (US); Tyler John Nigon, Minneapolis, MN (US); Mohammad Abouali, Haslett, MI (US)

(73) Assignee: FI2 Solutions, LLC., Mankato, MN (US)

( * ) Notice: Subject to any disclaimer, the term of this patent is extended or adjusted under 35 U.S.C. 154(b) by 0 days.

(21) Appl. No.: 14/668,249

(22) Filed: Mar. 25, 2015

(65) Prior Publication Data
US 2015/0278640 A1 Oct. 1, 2015

Related U.S. Application Data

(60) Provisional application No. 61/970,702, filed on Mar. 26, 2014.

(51) Int. Cl.
| | |
|---|---|
| *G06K 9/00* | (2006.01) |
| *G06T 7/40* | (2006.01) |
| *G06K 9/32* | (2006.01) |
| *G01C 11/04* | (2006.01) |
| *G06T 7/00* | (2006.01) |

(52) U.S. Cl.
CPC ............ *G06K 9/00657* (2013.01); *G01C 11/04* (2013.01); *G06K 9/3233* (2013.01); *G06T 7/0002* (2013.01); *G06T 7/0085* (2013.01); *G06T 7/408* (2013.01); *G06T 2207/10024* (2013.01); *G06T 2207/10032* (2013.01); *G06T 2207/20148* (2013.01); *G06T 2207/30128* (2013.01); *G06T 2207/30188* (2013.01)

(58) Field of Classification Search
None
See application file for complete search history.

(56) References Cited

U.S. PATENT DOCUMENTS

| | | | |
|---|---|---|---|
| 4,371,081 A | | 2/1983 | Satake |
| 5,334,987 A | | 8/1994 | Teach |
| 5,361,201 A | | 11/1994 | Jost et al. |
| 5,389,781 A | | 2/1995 | Beck et al. |
| 5,412,219 A | | 5/1995 | Chappelle et al. |
| 5,442,552 A | * | 8/1995 | Slaughter ............ G05D 1/0246 701/28 |

(Continued)

OTHER PUBLICATIONS

V. Fontaine and T.G. Crowe, Development of Line-Detection Algorithms for Local Positioning in Densely Seeded Crops, Department of Agricultural and Bioresource Engineering, University of Saskatoon, Saskatchewan S7N 5A9, Canada, vol. 48, 2006 Canadian Biosystems Engineering 7.19-7.29.

(Continued)

*Primary Examiner* — Shervin Nakhjavan
(74) *Attorney, Agent, or Firm* — Kinney & Lange, P.A.

(57) ABSTRACT

In one example, a method includes receiving, by a computing device, data for a region of interest that includes growing crops. The received data for the region of interest can include image data for the region of interest. The method further includes identifying, by the computing device based on the received image data, rows of crops within the region of interest. The method further includes determining, by the computing device based on the received data for the region of interest associated with portions of the region of interest included in the identified rows of crops and excluding portions of the region of interest outside the identified rows of crops, a stand status of the growing crops within the region of interest. The stand status includes a quantity status corresponding to a population of crops within the region of interest.

19 Claims, 33 Drawing Sheets

(56) References Cited

U.S. PATENT DOCUMENTS

| | | |
|---|---|---|
| 5,467,271 A | 11/1995 | Abel et al. |
| 5,689,418 A | 11/1997 | Monson |
| 5,751,576 A | 5/1998 | Monson |
| 5,764,819 A | 6/1998 | Orr et al. |
| 5,841,883 A | 11/1998 | Kono et al. |
| 5,845,229 A | 12/1998 | Rawlins |
| 5,857,174 A | 1/1999 | Dugan |
| 5,878,371 A | 3/1999 | Hale et al. |
| 5,913,915 A | 6/1999 | McQuinn |
| 5,919,242 A | 7/1999 | Greatline et al. |
| 5,927,603 A | 7/1999 | McNabb |
| 5,938,709 A | 8/1999 | Hale et al. |
| 5,999,650 A | 12/1999 | Ligon |
| 6,014,451 A | 1/2000 | Berry et al. |
| 6,078,892 A | 6/2000 | Anderson et al. |
| 6,078,901 A | 6/2000 | Ching |
| 6,108,590 A | 8/2000 | Hergert |
| 6,141,614 A | 10/2000 | Janzen et al. |
| 6,160,902 A | 12/2000 | Dickson et al. |
| 6,178,253 B1 | 1/2001 | Hendrickson et al. |
| 6,178,406 B1 | 1/2001 | Cheetham et al. |
| 6,199,000 B1 | 3/2001 | Keller et al. |
| 6,212,824 B1 | 4/2001 | Orr et al. |
| 6,236,907 B1 | 5/2001 | Hauwiller et al. |
| 6,336,051 B1 | 1/2002 | Pangels et al. |
| 6,336,066 B1 | 1/2002 | Pellenc et al. |
| 6,338,040 B1 | 1/2002 | Buman et al. |
| RE37,574 E | 3/2002 | Rawlins |
| 6,366,681 B1 | 4/2002 | Hutchins |
| 6,401,070 B1 | 6/2002 | McManus et al. |
| 6,466,321 B1 | 10/2002 | Satake et al. |
| 6,529,615 B2 | 3/2003 | Hendrickson et al. |
| 6,549,851 B2 | 4/2003 | Greensides |
| 6,596,996 B1 | 7/2003 | Stone et al. |
| 6,597,991 B1 | 7/2003 | Meron et al. |
| 6,606,542 B2 | 8/2003 | Hauwiller et al. |
| 6,683,970 B1 | 1/2004 | Satake et al. |
| 6,721,453 B1 | 4/2004 | Benson et al. |
| 6,745,184 B1 | 6/2004 | Choi et al. |
| 6,750,898 B1 | 6/2004 | Ishida et al. |
| 6,754,184 B2 | 6/2004 | Miyano et al. |
| 6,813,544 B2 | 11/2004 | Hood et al. |
| 6,889,620 B2 | 5/2005 | Fraisse et al. |
| 6,928,434 B1 | 8/2005 | Choi et al. |
| 6,957,202 B2 | 10/2005 | Skaanning et al. |
| 6,990,459 B2 | 1/2006 | Schneider |
| 6,999,877 B1 | 2/2006 | Dyer et al. |
| 7,039,592 B1 | 5/2006 | Yegge et al. |
| 7,047,133 B1 | 5/2006 | Dyer et al. |
| 7,050,910 B2 | 5/2006 | Kleemola et al. |
| 7,068,816 B1 | 6/2006 | Knoblauch et al. |
| 7,103,451 B2 | 9/2006 | Seal et al. |
| 7,123,750 B2 | 10/2006 | Lu et al. |
| 7,167,800 B2 | 1/2007 | Faivre et al. |
| 7,171,912 B2 | 2/2007 | Fraisse et al. |
| 7,184,859 B2 | 2/2007 | Hood et al. |
| 7,184,892 B1 | 2/2007 | Dyer et al. |
| 7,203,667 B2 | 4/2007 | Higgins et al. |
| 7,260,561 B1 | 8/2007 | Heidenreich et al. |
| 7,343,867 B2 | 3/2008 | Fraisse et al. |
| 7,349,888 B1 | 3/2008 | Heidenreich et al. |
| 7,389,181 B2 | 6/2008 | Meadow et al. |
| 7,412,330 B2 | 8/2008 | Spicer et al. |
| 7,440,901 B1 | 10/2008 | Dlott et al. |
| 7,533,069 B2 | 5/2009 | Fairweather |
| 7,542,958 B1 | 6/2009 | Warren et al. |
| 7,542,960 B2 | 6/2009 | Basak et al. |
| 7,555,472 B2 | 6/2009 | Craig et al. |
| 7,657,124 B2 | 2/2010 | Turner et al. |
| 7,657,469 B1 | 2/2010 | Yegge et al. |
| 7,693,765 B2 | 4/2010 | Dell Orfano |
| 7,725,233 B2 | 5/2010 | Hendrickson et al. |
| 7,801,759 B1 | 9/2010 | Adams et al. |
| 7,844,475 B1 | 11/2010 | Murphy |
| 7,904,332 B1 | 3/2011 | Merkley, Jr. et al. |
| 7,916,898 B2 | 3/2011 | Anderson |
| 7,930,085 B2 | 4/2011 | Anderson et al. |
| 7,991,754 B2 | 8/2011 | Maizel et al. |
| 8,046,280 B2 | 10/2011 | Avey et al. |
| 8,046,306 B2 | 10/2011 | Stinson |
| 8,121,345 B2 | 2/2012 | Jochem et al. |
| 8,135,178 B2 | 3/2012 | Hendrickson et al. |
| 8,160,944 B2 | 4/2012 | Orfano |
| 8,189,877 B2 | 5/2012 | Asner |
| 8,195,473 B2 | 6/2012 | Myr |
| 8,196,030 B1 | 6/2012 | Wang et al. |
| 8,208,680 B2 | 6/2012 | Scharf et al. |
| 8,229,768 B1 | 7/2012 | Hopkins, III |
| 8,229,769 B1 | 7/2012 | Hopkins, III |
| 8,243,997 B2 | 8/2012 | Davis et al. |
| 8,244,563 B2 | 8/2012 | Coon et al. |
| 8,249,926 B2 | 8/2012 | Avey et al. |
| 8,250,481 B2 | 8/2012 | Klaric et al. |
| 8,319,165 B2 | 11/2012 | Holland |
| 8,335,747 B1 | 12/2012 | Roberts |
| 8,346,578 B1 | 1/2013 | Hopkins, III et al. |
| 8,510,195 B2 | 8/2013 | Goslinga et al. |
| 8,527,301 B2 | 9/2013 | McComb et al. |
| 2001/0016053 A1 | 8/2001 | Dickson et al. |
| 2002/0017229 A1 | 2/2002 | Pavon et al. |
| 2002/0178229 A1 | 11/2002 | Sinha et al. |
| 2002/0193928 A1 | 12/2002 | Beck |
| 2003/0018481 A1 | 1/2003 | Zhou et al. |
| 2003/0061075 A1 | 3/2003 | Heckman et al. |
| 2003/0139983 A1 | 7/2003 | Spencer et al. |
| 2003/0220805 A1 | 11/2003 | Hoffman et al. |
| 2004/0006736 A1 | 1/2004 | Kawatani |
| 2004/0021862 A1 | 2/2004 | Panigrahi et al. |
| 2004/0087317 A1 | 5/2004 | Caci |
| 2004/0088330 A1 | 5/2004 | Pickett et al. |
| 2004/0167877 A1 | 8/2004 | Thompson, III |
| 2005/0027572 A1 | 2/2005 | Goshert |
| 2005/0075784 A1 | 4/2005 | Gray et al. |
| 2005/0108343 A1 | 5/2005 | Collet et al. |
| 2005/0149464 A1 | 7/2005 | Nugent |
| 2005/0273253 A1 | 12/2005 | Diekhans et al. |
| 2006/0015360 A1 | 1/2006 | Ochs et al. |
| 2006/0015374 A1 | 1/2006 | Ochs et al. |
| 2006/0025927 A1 | 2/2006 | Hoskinson et al. |
| 2006/0095207 A1* | 5/2006 | Reid .................. G01S 11/12 701/301 |
| 2006/0282295 A1 | 12/2006 | McComb et al. |
| 2006/0282467 A1 | 12/2006 | Peterson et al. |
| 2006/0287896 A1 | 12/2006 | McComb et al. |
| 2007/0044445 A1* | 3/2007 | Spicer .................. G01B 11/24 56/10.1 |
| 2007/0050382 A1 | 3/2007 | Bugir et al. |
| 2007/0089390 A1 | 4/2007 | Hendrickson et al. |
| 2007/0208511 A1 | 9/2007 | Glenn et al. |
| 2007/0239337 A1 | 10/2007 | Anderson |
| 2008/0022773 A1 | 1/2008 | McKenna et al. |
| 2008/0140431 A1 | 6/2008 | Anderson et al. |
| 2008/0162556 A1 | 7/2008 | McConnell |
| 2008/0195270 A1 | 8/2008 | Diekhans et al. |
| 2008/0215203 A1 | 9/2008 | Dix et al. |
| 2008/0250330 A1 | 10/2008 | Thompson |
| 2009/0024555 A1 | 1/2009 | Rieck et al. |
| 2009/0037059 A1* | 2/2009 | Huster .................. A01B 69/001 701/50 |
| 2009/0043714 A1 | 2/2009 | Zhao et al. |
| 2009/0150323 A1 | 6/2009 | Hively |
| 2009/0192956 A1 | 7/2009 | Dejean et al. |
| 2009/0216594 A1 | 8/2009 | Verhey et al. |
| 2009/0240516 A1 | 9/2009 | Palestrant |
| 2009/0322357 A1 | 12/2009 | Beaulieu |
| 2010/0042234 A1 | 2/2010 | May et al. |
| 2010/0268326 A1 | 10/2010 | Anderson |
| 2011/0035059 A1 | 2/2011 | Ersavas |
| 2011/0055220 A1* | 3/2011 | Tyburski .................. G06Q 40/04 707/743 |
| 2011/0066337 A1 | 3/2011 | Kormann |
| 2011/0113030 A1 | 5/2011 | Hunter et al. |
| 2011/0137456 A1 | 6/2011 | Koselka et al. |
| 2011/0160994 A1 | 6/2011 | Schmidt et al. |

(56) References Cited

U.S. PATENT DOCUMENTS

| | | |
|---|---|---|
| 2011/0196710 A1 | 8/2011 | Rao |
| 2011/0276336 A1 | 11/2011 | Sweely |
| 2012/0101634 A1 | 4/2012 | Lindores |
| 2012/0101784 A1* | 4/2012 | Lindores ............... G01D 18/00 703/2 |
| 2012/0109387 A1 | 5/2012 | Martin et al. |
| 2012/0123817 A1 | 5/2012 | Hohenberger et al. |
| 2012/0143633 A1 | 6/2012 | Salghetti et al. |
| 2013/0013525 A1 | 1/2013 | Dlott et al. |
| 2013/0018586 A1 | 1/2013 | Peterson et al. |
| 2013/0093592 A1 | 4/2013 | Lan et al. |
| 2013/0162390 A1 | 6/2013 | Ersavas et al. |
| 2013/0168327 A1 | 7/2013 | Clark |
| 2013/0190061 A1* | 7/2013 | Kirchbeck .............. A01F 12/58 460/1 |
| 2014/0012732 A1* | 1/2014 | Lindores .............. A01B 79/005 705/37 |

OTHER PUBLICATIONS

M.M. Lewis, Discriminating Vegetation With Hyperspectral Imagery-What is Possible?, Department of Soil and Water, Adelaide University, PMB 1 Glen Osmond, South Australia, Australia 5064, 2001 IEEE, p. 2899-2901.

Mark Ollis & Anthony Stentz, First Results in Vision-Based Crop Line Tracking, Robotics Institute, Carnegie Mellon University, Pittsburgh PA, 15213.

A. Piron, V. Leemans, F. Lebeau, M.-F. Destain, Improving In-Row Weed Detection in Multispectral Stereoscopic Images, Computers and Electronics in Agriculture, Journal homepage:www.elsevier. com/locate/compag, Computers and Electronics in Agriculture 69 (2009) p. 73-79.

Edwin H. Land and John H. McCann, Lightness and Retinex Theory, Journal of the Optical Society of America, vol. 61, No. 1, Jan. 1971, p. 1-11.

A. Pacheco and H. McNairn, Mapping Crop Residue Cover Over Regional Agricultural Landscapes in Canada, Agriculture and Agri-Food Canada, 960 Carling Avenue, Ottawa, Ontario, Canada K1A 0C6.

Brij Mohan Singh, Rahul Sharma, Ankush Mittal, Debashish Ghosh, Parallel Implementation of Otsu's Binarization Approach on GPU, International Journal of Computer Applications (0975-8887), vol. 32-No. 2, Oct. 2011.

V. Asadi and J. Jafari, Precise Measurement Of Residue Cover by Means Of Image Processing Techniques, International Journal of Natural and Engineering Sciences 5 (3): p. 53-56, 2011

D.S. Shrestha, B.L. Steward, Shape and Size Analysis of Corn Plant Canopies for Plant Population and Spacing Sensing, Applied Engineering in Agriculture, vol. 21 (2): p. 295-303, 2005 American Society of Agricultural Engineers ISSn 0883-8542.

Edwin H. Land, The Retinex Theory of Color Vision, Scientific American, Dec. 1977, vol. 237, No. 6, p. 108-128.

Xue Jinlin, Ju Weiping, Vision-Based Guidance Line Detection in Row Crop Fields, 2010 International Conference on Intelligent Computation Technology and Automation, p. 1140-1143.

J. Kittler and J. Illingworth, On Threshold Selection Using Clustering Criteria, IEEE Transactions on Systems, Man, and Cybernetics, vol. SMC-15, No. 5, Sep./Oct. 1985.

John Canny, A Computational Approach to Edge Detection, IEEE Transactions on Pattern Analysis and Machine Intelligence, vol. PAMI-8, No. 6, Nov. 1986.

Selim Aksoy, Ismet Zeki Yalniz, Kadim Tasdemir, Automatic Detection and Segmentation of Orchards Using Very High-Resolution Imagery.

Nobuyuki Otsu, A Threshold Selection Method From Gray-Level Histograms, IEEE Transactions on Systems, Man, and Cybernetics, vol. SMC-9, No. 1, Jan. 1979.

Junqing Chen, Thrasyvoulos N. Pappas, Aleksandra Mojsilovic, Bernice E. Rogowitz, Adaptive Perceptual Color-Texture Image Segmentation, IEEE Transactions on Image Processing, vol. 14, No. 10, Oct. 2005.

C. Tomasi, R. Manduchi, Bilateral Filtering for Gray and Color Images, Proceeding of the 1998 IEEE International Conference on Computer Vision, Bombay, India.

Francesca Gasparini and Raimondo Schettini, Color Balancing of Digital Photos Using Simple Image Statistics, DISCO (Dipartimento di Informatica, Sistemistica e Comunicazione), Edificio 7 Universita degli Studi di Milano-Bicocca, Via Bicocca degli Arcimboldi 8, 2016 Milano Itlay.

J. Romeo, G. Pajares, M. Montalvo, J.M. Guerrero, M. Guijarro, and A. Ribeiro, Crop Row Detection in Maize Fields Inspired on the Human Visual Perception, The Scientific World Journal, vol. 2012, Article ID 484390, 10 pages.

J.A. Marchant, T. Hague, and N.D. Tillett, Row-Following Accuracy of An Autonomous Vision-Guided Agricultural Vehicle, Elsevier Computers and Electronics in Agriculture 16 (1997) p. 165-175.

Hong Yan, Unified Formulation of a Class of Image Thresholding Techniques, Pattern Recognition, vol. 29, No. 12, p. 2025-2032, 1996.

Liju Dong, Ge Yu, Philip Ogunbona, Wanqing Li, An Efficient Iterative Algorithm for Image Thresholding, Science Direct,www. sciencedirect.com, Pattern Recognition Letters 29 (2008) 1311-1316.

Ching-Chih Weng, Homer Chen, and Chiou-Shann Fun, A Novel Automatic White Balance Method For Digital Still Cameras, Department of Electrical Engineering, Graduate Institute of Communication Engineering Department of Computer Science and Information Engineering National Taiwan University, Taipei, Taiwan,email: b89901135@ntu.edu.tw, homer@cc.ee.ntu.edu. tw,fuh@csie,ntu,edu,tw. pp. 3801-3804.

M.Van Ginkel, C.L. Luengo Hendriks and L.J. Van Vliet, A Short introduction to the Radon and Hough Transforms and How They Relate to Each Other, No. QI-2004-01, in the Quantitative Imaging Group Technical Report Sales, Imaging Science & Technology Department, Faculty of Applied Science, Delft University of Technology, Lorentzweg, Netherlands.

Yang Mingqiang, Kpalma Kidiyo, Ronsin Joseph, A Survey of Shape Feature Extraction Techniques, IETR-INSA, UMR-CNRS 6164, 35043 Rennes, Shandong University, 250100, Jinan, France, China, www.intechopen.com.

Tony F. Chan and Kynunua A, Vese, Active Contours Without Edges, IEEE Transactions on Image Processing, vol. 10, No. 2, Feb. 2001.

L. Lucchese and S.K. Mitra, An Algorithm for Fast Segmentation of Color Images.

Angela Ribeiro, Juan Ranz, Xavier P. Burgos-Artizzu, Gonzalo Pajares, Maria J. Sanchez Del Arco and Luis Navarrete, An Image Segmentation Based on a Genetic Algorithm for Determining Soil Coverage by Crop Residues, Open Access, Sensors, ISSN 1424-8220 www.mdpi.com/journal/sensors.

M.Montalvo, G. Pajares, J.M. Guerrero, J. Romeo, M. Guijarro, A. Ribeiro, J.J. Ruz, J.M. Cruz, Automatic Detection of Crop Rows in Maize Fields With High Weeds Pressure, Expert Systems with Applications, 39 (2012) pp. 11889-11897, SciVerse ScienceDirect, journal homepage: www.elsevier.com.locate.eswa.

G.Zapryanov, D.Ivanova, I. Nikolova, Automatic White Balance Algorithms for Digital Still Cameras-a Comparative Study, Information Technologies and Control 2012, p. 16-22.

Hong-Kwai Lam, Oscar C. Au and Chi-Wah Wong, Automatic White Balancing Using Adjacent Channels Adjustment in RGB Domain, 2004 IEEE International Conference on Multimedia and Expo (ICME).

Hong-Kwai Lam, Oscar C. Au and Chi-Wah Wong, Automatic White Balancing Using Luminance Component and Standard Deviation of RGB Components, 2004 IEEE, p. III-493-III-496.

Hong-Kwai Lam, Oscar C. Au and Chi-Wah Wong, Automatic White Balancing Using Standard Deviation of RGB Components, 2004 IEEE, p. III-921-III-924.

Gonzalo Ruiz-Ruiz, Luis M. Navas-Gracia, Jaime Gomez-Gil, Camera Kinetic Model Applied to Crop Row Tracking and Weed Detection, Department of Agricultural and Forest Engineering, University of Valladolid Avda. Madrid 44, Campus "La Yutera", Palencia, E34004, Spain, Department of Communication and Signal

(56) References Cited

OTHER PUBLICATIONS

Theory and Telematics, University of Valladolid, Cmno. del Cementerio, Campus "Miguel Delibes", Valladolid, E47011, Spain.

Yining Deng, B.S. Manjunath and Hyundoo Shin, Color Image Segmentation, Department of Electrical and Computer Engineering, University of California, Santa Barbara, CA 93106-9560.

A.Jafari, S.S. Mohtasebi, H. Eghbali Jahromi, M. Omid, Color Segmentation Scheme for Classifying Weeds From Sugar Beet Using Machine Vision, Iranian Journal of Information Science and Technology, Jan./Jun. 2006, vol. 4, No. 1, p. 1-12.

Edmund Y. Lam, Combining Gray World and Retinex Theory for Automatic White Balance in Digital Photography, 0-7803-8920-4/05 IEEE, p. 134-139.

A. Sheykhi Arasteh, P. Ahmadi Moghadam, H. Komarizade, M. Foj Laley, Designing Algorithm for Detection of Crop Rows by Using Machine Vision for Use In Variable Rate Systems, International Journal of Agriculture and Crop Sciences, vol. 4 (16) 1150-1153 2012 IJACS Journal.

H.T. Sogaard, H.J. Olsen, Determination of Crop Rows by Image Analysis Without Segmentation, www.sciencedirect.com, Computers and Electronics in Agriculture 38 (2003) 141-158.

Hossein Mobahi, Shankar R. Rao, Allen Y. Yang, Shankar S. Sastry, and Yi Ma, Segmentation Of Natural Images By Texture and Boundary Compression, International Journal of Computer Vision, Apr. 2011.

* cited by examiner

Figure 4D

| | | 50' grid | 100' grid | 200' grid | Random | None | | |
|---|---|---|---|---|---|---|---|---|
| 4 | Tile | 10 | 8 ✓ | 6 | 4 | 0 | 16 | 62.4 |
| 1 | Irrigation | Yes 10 | No 0 ✓ | | | | 0 | |
| 1 | Manure | Yes 10 ✓ | No 0 | | | | 10 | |

Improvements 2.4

| | | None | 0-1% | 2-3% | >3% | | | |
|---|---|---|---|---|---|---|---|---|
| 3 | Pot Holes | 10 | | 5 ✓ | 0 | | 24 | 85.8 |
| 2 | Slope | 0-1% 10 | 2-3% 5 | 5-10% 6 ✓ | 10-20% 4 | >20% 0 | 0 | |
| 3 | Hills | None 10 | Minimal 5 ✓ | Hilly 0 | | | 15 | |

Drainage 2.2

May 6  11:15 am
Watch: Reduced Stand Issue
Farm: Johnson          Field: Back 80     85 acres

*A stand watch has been issued for this field due to the detection of non uniform emergence and low stands. Analysis resulted from an aerial inspection at 10:23 am today, May 6.*

*Recommended action is to monitor stand closely. The following is a summary of current analysis:*

     Acres in the Replant Zone (replant is a possibility)

     Gray Area

     Status Quo

View details
Remind me later
Notify supplier
Send an email

Figure 10                                                                 1000

June 15  4:20 pm
Status Alert: Reduced Stand Issue
Farm:  Johnson              Field:  Back 80      85 acres

*Aerial imagery taken at 2:45 pm today, June 15, revealed reduced stands and uneven growth across the field listed above. These factors will likely result in reduced yield potential as the season progresses.*

*Recommend action is to continue monitoring yield potential. The following is a summary of current analysis:*

    Acres in the Replant Zone

    Gray Area

    Status Quo

View details
Remind me later
Notify supplier
Send an email

Figure 13                                                          1300

May 21  6:15 pm
Alert:  Possible Storm Damage
Farm:  Johnson
Fields:

| Back 80 | 85 acres |
|---------|----------|
| Moe's   | 120 acres |

| Home Place | 160 acres |
|------------|-----------|
| Glenn's    | 60 acres  |

*Spotters indicate severe weather and large hail may have impacted the above fields on May 21.*

*Recommended action is to scout fields for injury and utilize aerial imagery to analyze extent of damage.*

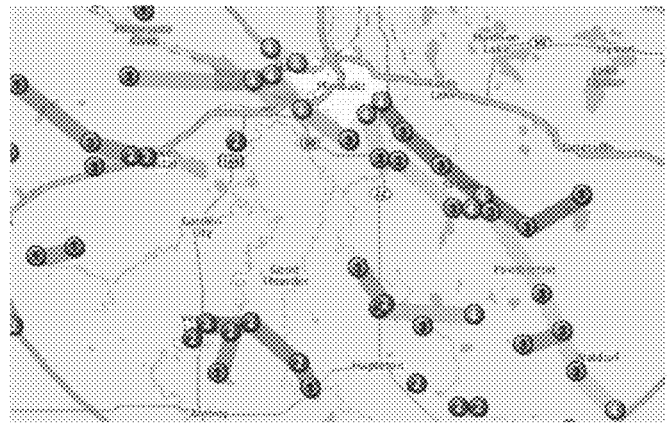

View details
Remind me later
Notify supplier
Send an email

Figure 14                                                            1400

May 22  9:05 am
Alert: Hail Damage
Farm: Johnson
Fields:

| Back 80 | 85 acres |
|---------|----------|
| Moe's   | 120 acres |

| Home Place | 160 acres |
|------------|-----------|
| Glenn's    | 60 acres  |

*Analysis from aerial inspection following the May 21 storm revealed the following status for the above fields:*

| Field Name | Size | Red Region | Gray Area | Status Quo |
|------------|------|------------|-----------|------------|
| Back 80    | 85 acres  | 60 | 10 | 15 |
| Moe's      | 120 acres | 42 | 37 | 41 |
| Home Place | 160 acres | 63 | 12 | 85 |
| Glenn's    | 60 acres  | 0  | 0  | 60 |

*Recommended action: follow up with your crop insurance agent*

View details
Remind me later
Notify supplier
Send an email

Figure 16

Stand: Seed Treatment

Analysis: Stand Relative to Seed Treatment
Scope: Field X – Planted April 20
Field Size: 160 Acres
Index: Attention Recommended
Economic Threshold: Exceeded
Analysis Date: May 23

| Yield Loss | Bu. Loss | 8,480 |
|---|---|---|
| | @ $ 5/Bu. | $42,400 |

| Treatment | Acres (a) | Plant Population (Field) | | | Plant Variability | | | | Yield Lost Field (Bu.) | | |
|---|---|---|---|---|---|---|---|---|---|---|---|
| | | Plants Lost | | Yield Lost Bu./a | Grade | Boss | Laggard | Runt | Yield Bu./a | Due to: | Totals Compared to Benchmark |
| | | Total | In Gaps >4.35' | | | | | | | Population | Variability |
| None | 80 | 305,811 | 160,391 | 15 | % of Plants | 39% | 36% | 25% | 201 | 1,200 | 4,720 | 5,920 |
| | | | | | Est. Yield/a | 113 | 63 | 25 | | | | |
| Treatment X | 80 | 203,874 | 106,929 | 10 | % of Plants | 58% | 39% | 3% | 236 | 800 | 1,760 | 2,560 |
| | | | | | Est. Yield/a | 167 | 68 | 3 | | | | |

Figure 18
Stand: Seed Hybrids across Soil Types

Analysis: Stand Relative to Seed Hybrids across Soil Types ( > than 3 acres)
Scope: Field X – Planted April 20
Field Size: 160 Acres
Index: Attention Recommended
Economic Threshold: Exceeded
Analysis Date: May 23

| Yield Loss | |
|---|---|
| Bu. Loss | 8,996 |
| @ $ 5/Bu. | $44,980 |

| Soil | Hybrid | Acres (a) | Plant Population (Field) ||| Plant Variability ||||| Yield Lost Field (Bu.) |||
|---|---|---|---|---|---|---|---|---|---|---|---|---|---|
| | | | Plants Lost || Yield Lost Bu./a | Grade | Boss | Laggard | Runt | Yield Bu./a | Due to: || Totals Compared to Benchmark |
| | | | Total | In Gaps >4.35" | | | | | | | Population | Variability | |
| Clay | Seed A | 38 | 187,638 | 98,407 | 20 | % of Plants Est. Yield/a | 34% 99 | 54% 95 | 12% 12 | 206 | 760 | 2,052 | 2,812 |
| | Seed B | 46 | 198,495 | 119,124 | 17 | % of Plants Est. Yield/a | 54% 157 | 44% 77 | 2% 2 | 236 | 752 | 1,134 | 1,886 |
| Clay Loam | Seed A | 22 | 96,012 | 56,972 | 17 | % of Plants Est. Yield/a | 49% 125 | 43% 86 | 8% 8 | 219 | 374 | 902 | 1,276 |
| | Seed B | 28 | 127,540 | 72,510 | 18 | % of Plants Est. Yield/a | 44% 128 | 51% 89 | 5% 5 | 222 | 504 | 1,064 | 1,568 |
| Silt Loam | Seed A | 12 | 51,478 | 31,076 | 17 | % of Plants Est. Yield/a | 55% 160 | 39% 68 | 6% 6 | 234 | 204 | 312 | 516 |
| | Seed B | 14 | 59,625 | 36,255 | 17 | % of Plants Est. Yield/a | 36% 105 | 54% 95 | 10% 10 | 210 | 238 | 700 | 938 |

Figure 19

Stand: Tile

Analysis: Stand Relative to Tile Locations
Scope: Field X – Planted April 20
Field Size: 160 Acres
Index: Attention Recommended
Economic Threshold Exceeded
Analysis Date: May 23

| Yield Loss | | |
|---|---|---|
| Bu. Loss: | 6,424 | |
| @ $5/Bu: | $32,120 | |

| From Tile | Acres (a) | Plant Population (Field) | | Yield Lost Bu./a | Plant Variability | | | | Yield Bu./a | Yield Lost Field (Bu.) | | |
| | | Plants Lost | | | Grade | Boss | Laggard | Runt | | Due to | | Totals |
| | | Total | In Gaps >4.35' | | | | | | | Population | Variability | Compared to Benchmark |
|---|---|---|---|---|---|---|---|---|---|---|---|---|
| 0 – 10' | 32 | 50,969 | 26,732 | 6 | % of Plants: Est. Yield/a | 74% 215 | 23% 40 | 3% 3 | 258 | 192 | 64 | 256 |
| 10 – 30' | 45 | 143,349 | 82,702 | 13 | % of Plants: Est. Yield/a | 51% 140 | 44% 77 | 5% 5 | 230 | 585 | 1,350 | 1,935 |
| > 30' | 83 | 317,279 | 153,473 | 15 | % of Plants: Est. Yield/a | 46% 134 | 48% 84 | 6% 6 | 224 | 1,245 | 2,988 | 4,233 |

Figure 21
Stand: Planter Speed

Analysis: Stand Relative to Planter Speed
Scope: Field X – Planted April 20
Field Size: 160 Acres
Index: Attention Recommended
Economic Threshold: Exceeded
Analysis Date: May 23

| Yield Loss | | |
|---|---|---|
| Bu. Loss: | 10,445 | |
| @ $5/Bu. | $52,2225 | |

| Speed (mph) | Acres (a) | Plant Population (Field) | | | Plant Variability | | | | Yield Lost Field (Bu.) | | |
|---|---|---|---|---|---|---|---|---|---|---|---|
| | | Plants Lost | | Yield Lost Bu./a | Grade | Boss | Laggard | Runt | Yield Bu./a | Due to: | | Totals Compared to Benchmark |
| | | Total | In Gaps >4.35" | | | | | | | Population | Variability | |
| < 4.5 | 65 | 118,389 | 66,489 | 7 | % of Plants: | 54% | 31% | 15% | 226 | 455 | 2,210 | 2,665 |
| | | | | | Est. Yield/a | 157 | 54 | 15 | | | | |
| 4.5 - 6 | 65 | 198,347 | 118,578 | 12 | % of Plants: | 41% | 42% | 17% | 210 | 780 | 3,250 | 4,030 |
| | | | | | Est. Yield/a | 119 | 74 | 17 | | | | |
| > 6 | 30 | 184,548 | 144,111 | 25 | % of Plants: | 17% | 39% | 44% | 160 | 750 | 3,000 | 3,750 |
| | | | | | Est. Yield/a | 40 | 68 | 43 | | | | |

CROP STAND ANALYSIS

CROSS-REFERENCE TO RELATED APPLICATION

This application claims priority to Application 61/970,702, filed on Mar. 26, 2014, and entitled CROP STAND ANALYSIS, the entire contents of which are hereby incorporated by reference.

BACKGROUND

The present disclosure relates to computing devices, and more particularly to computing devices for use in determining and analyzing a stand status of growing crops.

The quality of the stand of a crop can have a direct impact on the quality of the harvested crop as well as on the yield and income for the person managing the crop. A crop stand can relate to one or more of a stand population, a stand consistency, and a stand quality. Stand population can refer to a number of plants that have emerged, started growth, and are healthy. Stand consistency can refer to the consistency (or, conversely, the variability) of the planting across a field or portion of a field including multiple plants grouped together and other unintended irregularities, such as skips or areas where there are no plants or a minimal number of plants. Stand quality can refer to the general health of the plant and the capability of the crop to produce a high quality, high yielding harvest.

Identifying a targeted stand and then achieving that stand has long been recognized for its importance by producers (e.g., farmers) who have made and continue to make large investments, such as in planting equipment or other operating costs, in an attempt to improve stand accuracy. For example, planting equipment can include sophisticated machinery and electronics to control and monitor various aspects of planting, such as seed depth, row unit down pressure, seed singulation, seed spacing, and the like. However, final stand quality can ultimately be influenced by numerous factors, such as seed placement, farming practices over the course of the growing season and between seasons, seed genetics, or other conditions and/or events the seed and resulting plants are exposed to after planting. Such influential factors can impact stand performance to different degrees, and can be variable from year to year, region to region, producer to producer, crop to crop, field to field, and between and within crop rows.

SUMMARY

In one example, a method includes receiving, by a computing device, data for a region of interest that includes growing crops. The received data for the region of interest can include image data for the region of interest. The method further includes identifying, by the computing device based on the received image data, rows of crops within the region of interest. The method further includes determining, by the computing device based on the received data for the region of interest associated with portions of the region of interest included in the identified rows of crops and excluding portions of the region of interest outside the identified rows of crops, a stand status of the growing crops within the region of interest. The stand status includes a quantity status corresponding to a population of crops within the region of interest.

In another example, a system includes a computing device including at least one processor and computer-readable memory. The computer-readable memory is encoded with instructions that, when executed by the at least one processor, cause the computing device to receive data for a region of interest that includes growing crops. The received data for the region of interest includes image data for the region of interest. The computer-readable memory is further encoded with instructions that, when executed by the at least one processor, cause the computing device to identify, based on the received image data, rows of crops within the region of interest, and determine based on the received data for the region of interest associated with portions of the region of interest included in the identified rows of crops and excluding portions of the region of interest outside the rows of crops, a stand status of the growing crops within the region of interest. The stand status includes a quantity status corresponding to a population of crops within the region of interest.

In another example, a method includes receiving, by a computing device, data for a region of interest that includes growing crops. The received data for the region of interest includes image data for the region of interest. The method further includes segregating, by the computing device, the image data for the region of interest into a plurality of tiles. Each tile from the plurality of tiles includes image data corresponding to a different geographical portion of the region of interest. The method further includes determining, by the computing device, a plurality of crop masks. Each of the plurality of crop masks corresponds to one of the plurality of tiles and includes a plurality of elements. Each of the plurality of elements corresponds to a pixel of image data included in the respective tile and is categorized as one of a vegetation element indicating that the respective pixel is associated with vegetation within the respective tile and a non-vegetation element indicating that the respective pixel is associated with an absence of vegetation within the respective tile. The method further includes determining, by the computing device for each of the plurality of crop masks, a number of vegetation elements of the respective crop mask corresponding to each of a plurality of candidate row angles, and determining, by the computing device for each of the plurality of crop masks, a dominant row angle as one of the plurality of candidate row angles for the respective crop mask corresponding to a greatest number of vegetation elements. The method further includes identifying, by the computing device for each of the plurality of tiles, rows of crops within the geographical portion of the region of interest corresponding to the respective tile based on the determined dominant row angle of the crop mask corresponding to the respective tile, and determining, by the computing device, a stand status of the growing crops within the region of interest based on the received data for the region of interest associated with geographical portions of the region of interest included in the identified rows of crops within each of the plurality of tiles and excluding geographical portions of the region of interest outside the identified rows of crops.

In another example, a method includes receiving, by a computing device, data for a region of interest that includes growing crops. The received data for the region of interest includes crop data. The method further includes segregating, by the computing device, data representative of the growing crops into a plurality of groups based on one or more parameters of a category of the received data, and determining, by the computing device, a stand status for each of the plurality of groups. The method further includes comparing, by the computing device, the stand status of each of the plurality of groups to at least one benchmark criterion.

The method further includes outputting, by the computing device, an indication of the comparison.

In another example, a system includes a computing device comprising at least one processor and one or more modules executable by the at least one processor of the computing device. The one or more modules are configured to receive data for a region of interest that includes growing crops. The received data for the region of interest includes crop data. The one or more modules are further configured to segregate data representative of the growing crops into a plurality of groups based on one or more parameters of a category of the received data, determine a stand status for each of the plurality of groups, and compare the stand status of each of the plurality of groups to at least one benchmark criterion. The one or more modules are further configured to output an indication of the comparison.

In another example, a method includes receiving, by a computing device, data associated with growing crops, and assigning, by the computing device, the received data associated with the growing crops to crop sets based on parameters of the received data. The method further includes determining, by the computing device, an expected yield for each of the crop sets, comparing, by the computing device, the expected yield for each of the crop sets to a reference yield, and outputting, by the computing device, an indication of the comparison.

In another example, a device includes at least one processor and a computer-readable storage medium. The computer-readable storage medium is encoded with instructions that, when executed, cause the at least one processor to identify a plurality crop groups of a field of crops by comparing data associated with the crops to one or more grouping criteria, determine an anticipated yield of the crops within each of the crop groups based on one or more of a number of crops within the respective group and a grade of the crops within the respective group, and output a report that includes an expected amount of crop loss for each group. The expected amount of crop loss is determined from a difference between the anticipated yield of the crops and a yield convention associated with the crops.

In another example, a system includes at least one processor, a display device operatively coupled to the at least one processor, and a computer-readable storage medium. The computer-readable storage medium is encoded with instructions that, when executed, cause the at least one processor to receive data for a field of cultivated plants, and divide data representing the cultivated plants into a plurality of groups based on criteria associated with one or more of a seed treatment category, a soil compaction category, a seed type category, a soil type category, a drain tile category, a ground surface residue category, and a planting equipment category of the received data. The computer-readable storage medium is further encoded with instructions that, when executed, cause the at least one processor to determine an expected yield loss for each of the plurality of groups. The expected yield loss is determined from a difference between an expected yield for a respective one of the plurality of groups and a benchmark yield associated with a type of the cultivated plants. The computer-readable storage medium is further encoded with instructions that, when executed, cause the at least one processor to output, for display at the display device, a report including an indication of the expected yield loss for each of the plurality of groups.

BRIEF DESCRIPTION OF THE DRAWINGS

FIG. 4D illustrates a table that can be used to determine scores for the grids derived in operations of FIG. 4A.

FIG. 7 illustrates contents of an example alert message.

FIG. 10 illustrates contents of an example alert message reflecting a stand deficiency.

FIG. 13 illustrates an example screen shot of an alert message relating to the occurrence of severe weather.

FIG. 14 illustrates an example screen shot of an alert message based upon an aerial inspection following a hail storm.

FIG. 16 illustrates an example report of a stand status analysis with respect to a seed treatment category of received data for a region of interest.

FIG. 18 illustrates an example report of a stand status analysis with respect to a combination of a seed type category and a soil type category of received data for the region of interest.

FIG. 19 illustrates an example report of a stand status analysis with respect to a drain tile category of received data for a region of interest.

FIG. 21 illustrates an example report of a stand status analysis with respect to a planter equipment speed category of received data for a region of interest.

DETAILED DESCRIPTION

Figure 1:
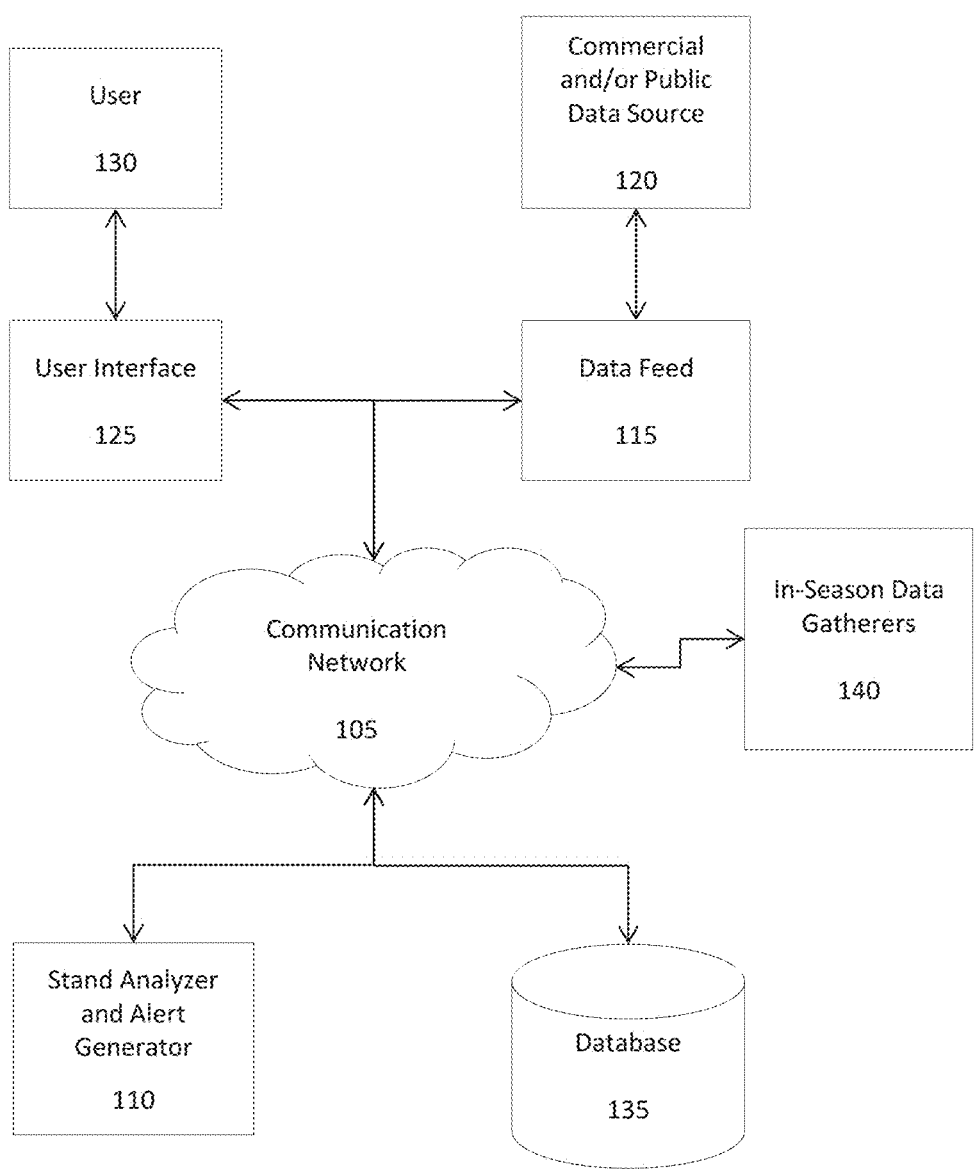
FIG. 1 is a system block diagram of a stand system.

According to techniques of this disclosure, a computing device can process various types of data from various sources to determine and/or analyze a stand status (e.g., one or more of a stand population, a stand consistency, and a stand quality) of growing crops within a region of interest (e.g., a region of interest that includes a field of crops, a portion of a field of crops, areas surrounding a field of crops, or other areas of interest). The computing device can determine the stand status for groups of crops within the region of interest, and can compare the determined stand status for each group with benchmark criteria, such as a benchmark yield of crops. The computing device can output the comparison, such as for display at a display device operatively coupled to the computing device. As such, a computing device implementing techniques of this disclosure can enable accurate determination of an effect of one or more impactful factors to a stand status of the crops. In this way, the computing device can enable possible corrective action, such as replanting, application of fertilizer, or other corrective actions.

In some examples, the computing device can determine rows of crops within the region of interest, and can determine the stand status of the growing crops based on received data associated with portions of the region of interest included in the identified rows and excluding portions of the region of interest outside the identified rows. For instance, the computing device can receive image data for the region of interest, and can identify the rows of crops using, e.g., a Hough transform or other image analysis technique(s) to extract features of the received image data to identify the locations of rows of crops within the region of interest (e.g., field). By determining the stand status based on received data corresponding to the rows of crops and excluding data corresponding to regions, e.g., between rows that can include data corresponding to weeds or other non-crop elements, the computing device can more accurately determine the stand status of the growing crops. Row detection techniques described herein can further enable the computing device to identify gaps in the rows corresponding to an absence of vegetation within the rows, thereby enabling an estimation of a lost yield due to such gaps. Moreover, techniques described herein can enable more accurate crop row detection from images of the field of crops where rows are likely not exactly straight and certain rows within the image are shorter than others (e.g., rows at corners of the image as compared with rows through a center of the image). For instance, rather than base row detection decisions on a plurality of row angles resulting from a typical Hough transform (or other feature extraction technique), a computing device implementing techniques of this disclosure can determine row locations based on a determined dominant row angle for the region of interest, thereby increasing accuracy of the row detection scheme and decreasing a processing burden of the computing device related to the row detection operations. As such, techniques described herein can improve both the accuracy and efficiency of stand status determinations with respect to growing crops within a region of interest.

Seed companies have developed and continue to improve seed genetics in many areas including seed germination and early-seed vigor with the intention of improving stand and getting a crop off to a good start. Universities, the USDA, and Extension offices have performed research relating to the impact of the planting date, soil and air temperature, tillage practices, residue, and other factors in an attempt to develop practices that will improve stand development.

Great care and precision is often used to determine an ideal target stand for a field and/or portion of a field and then to achieve the target stand as the seed is placed in the ground. For some crops, the equipment, systems, and practices used to achieve this precision in planning and placing (planting) the seed is collectively identified as "precision agriculture." However, final stand quality is often ultimately determined by the seed placement, general farming practices, seed genetics, as well as a number of other conditions and events to which the seed and resulting plants are exposed after planting. Such conditions can impact stand performance to different degrees and can be variable from year to year, region to region, farmer to farmer, crop to crop, field to field, and between and within crop rows. Examples of the factors that affect the seed and impact the ultimate stand include soil temperature, soil moisture, tillage practices, ground residue coverage, accuracy of the planter and planter electronics, planter operator skill, soil compaction, seed bed condition (clods, etc.), soil surface crusting, germination rate of the seed due to, e.g., quality of the seed, and the presence of insects that can feed on the seeds.

After the crop emerges, the plants can be exposed to additional conditions that can impact the final crop stand to be harvested. These conditions can be especially impactful when the plant is young and fragile early in its growth cycle. Example factors can include, but are not limited to, excessive rain (including ponding and flooding, especially in low lying areas), erosion, hail, lack of rain, frost, air temperature, wind, diseases, insects, weeds, and pests.

Stand expectations based on careful planning and execution of precision planting and the use of expensive equipment and high quality seed may not be realized due to external events and conditions. These external events and conditions can ultimately impact yield, crop quality, and income. Stand at a time of harvest can be a direct result of the impact of a combination of one or more of these factors occurring over the crop growth cycle.

When a stand status of the growing crops fails to satisfy acceptable criteria, and is discovered early in the growing season, then replanting of the crop or of another crop is a possible remedy; however every delay in replanting, even by one day, can limit remedial options. This can be especially true in regions where the growing seasons are shorter. Also, when stands vary across the field, interplanting alongside the original crop row can be another option. Understanding where existing plants are (and are not) can lead to a customized prescription that instructs the planter to place interplanted seed exactly where it is needed. Even if no corrective actions can be taken in a given crop year (other than a possible insurance claim, which is a viable option in some cases), understanding actual stand quality across fields can help a producer (e.g., a farmer) improve the ability to predict yield and therefore improve marketing practices. Finally, understanding the actual stand can provide information such that corrective action can be taken in subsequent years to improve the stand of future crops. Possible ways to improve stand in subsequent years can include modified (e.g., improved) practices, seed selection, planning, equipment use, planting execution, and a wide variety of other corrective actions.

Existing techniques to determine a stand status of growing crops are typically manual in nature and measure stand only in the portion of the field that is monitored. For example, techniques typically referred to as the $1/1000^{th}$ Acre Method, the Wheel Method, and the Hoop Method have been established to determine a stand status of growing crops within a field. The $1/1000$th Acre Method can include counting the number of plants in a length of row equal to $1/1000$th of an acre based on row width. The number of plants in the length of the row can be multiplied by 1,000 to arrive at the determined number of plants per acre. The process may typically be repeated at several locations of a field. The Wheel Method can include counting 150 plants and measuring the distance from the first to the last plant with, e.g., a measuring wheel. A benchmark number can be divided by the number of feet traveled to determine an estimated plant population. As one example, 150 plants can be counted in 94 feet of 30-inch rows. In such an example, the estimated plants per acre of the field can be determined by dividing 2,613,600 (i.e., an example benchmark number) by 94 (i.e., the distance from the first to last counted plant in this example) to arrive at an estimated 27,804 plants per acre. The Hoop Method can include tossing a hoop of known diameter into a filed and counting the number of plants inside the hoop. The hoop can be tossed and plants counted with respect to at least five locations of the field. The average number of plants falling within the hoop can be multiplied by a factor to determine an estimated number of plants per acre. For instance, a hoop having a diameter of 28¼" can correspond to a factor of 10,000.

These techniques (e.g., the $1/1000$th Acre Method, the Wheel Method, and the Hoop Method) measure stand in terms of population and only measure it within limited portions of a field, and therefore may not reflect the stand across the entire field. Furthermore, such techniques may not associate the variability of the stand with locations of the field. The random sampling of stand quality may be acceptable within the measured area, but this measurement may not reflect the stand quality across the entire field. Seeds that are planted can be subjected to factors that undermine stand quality across a field. Therefore, even seeds that are initially planted and spaced with great care, when subjected to varying field conditions, often result in stands that are inconsistent across the field. As one example, a plant that is not healthy may typically not add to yield and, in fact, can act as a type of weed by depriving healthy plants of water, nutrients, sunlight, and other factors necessary to produce a high quality, high yielding crop. Accordingly, variability of a quality status of plants across the field can impact a final yield of the crop. As another example, a field can be subjected to a hail storm. The hail may randomly impact particular plants resulting in portions of the field where the stand is not impacted and other areas where there are gaps in plant development, thereby resulting in areas within a field where the stand is as intended (e.g., meets acceptable stand criteria) and other areas where there are gaps or no plants at all.

According to techniques described herein, a computing device can automatically process and analyze multiple types of data in combination to accurately determine stand. Data types can include field and crop data and real-time or near real-time data produced by a UAV (unmanned aerial vehicle), flying camera, flying robot, satellite, airplane, and/or ground-located sensor. The computing device can assign plants within the region of interest to a plurality of groups according to parameters associated with received data for the region of interest (e.g., a field, a portion of a field, or other regions of interest). Such parameters of the received data can include, but are not limited to, an existence and/or type of seed treatment, a position of a plant relative to support regions of a planter device (e.g., wheels) used to plant the crops, a type of soil in which the plant is growing, a type of seed from which the plant emerged, a distance of the plant from drain tile, an amount of residue (e.g., ground cover) proximate the plant, a speed of planting equipment while planting the crops, or other parameters. The computing device can determine a stand status for each group of plants, and can compare the stand status for each group to one or more benchmark criteria, such as a benchmark yield (e.g., a hypothetical yield of given acceptable ranges and/or combinations of impactful factors). The computing device can output the comparison, such as for display on a display device operatively coupled to the computing device. In this way, a computing device implementing techniques of this disclosure can output a stand status of growing crops within a region of interest as the stand status relates to one or more individual types of data (e.g., soil data, tile data, seed type, and/or treatment data, etc.) Accordingly, the computing device can help increase the accuracy of stand analysis, thereby enabling possible corrective action when a stand status does not meet acceptable stand criteria.

FIG. 1 illustrates a block diagram depicting an example system 100 for executing one or more of the processes described herein. System 100 includes a communication network 105, which communicatively couples a stand analyzer and alert generator 110, a database 135, a user interface 125 (associated with a user 130), a data feed 115 (associated with commercial and/or public data source 120), and an in-season data gatherer 140. Note, although only one communication network 105 is shown in the illustration, there can, in fact, be multiple such networks and internetworks involved and such networks and internetworks are grouped together for purposes of simplifying the present discussion. Further, in some instances some of the components illustrated in FIG. 1 can be combined or can be absent from instantiations of the present disclosure. For example, once the stand determination alert has been generated, user 130 can view the alert on a computing device, such as a personal computer, a laptop, a tablet computer, a smart phone, or other portable computer-based devices, in which case the stand determination alert information can be self-contained and access to the communication network and other elements of system 100 may not be required until the stand determination alert or information concerning the stand determination needs to be modified or updated. Although only one user interface is shown, multiple such interfaces can exist. Thus, system 100 in FIG. 1 should best be regarded merely as an example of a system in which the present disclosure finds application.

As indicated, communication network 105 communicatively couples the other elements of system 100 to one another. Example communication networks 105 include cloud computing networks, the Internet, local area networks (LAN), wireless local area networks (WLAN), and wide area networks (WAN). Usually, though not necessarily, user 130 can connect to system 100 periodically to change his or her preferences (e.g., include or exclude certain geographic areas for the system's analysis, change the sensitivity parameters that the user has pre-established, or make other modifications). In some cases, users 130 can communicate status to other users 130 such as employees, consultants, buyers, suppliers, bankers, landlords, and other farmers. In some embodiments, multiple users 130 can be enabled to communicate with one another via a communication network 105 in a manner similar to, for example, a social network. This information can be useful to establish stand determination findings that extend beyond a singular operation. In some embodiments, Stand Analyzer and Alert Generator 110 can reside on and/or be executed by a computer-based platform, such as a server or set of servers. Such server(s) can be physical servers and/or virtual machines executing on another hardware platform.

Computer-based systems described herein (e.g., including servers) can be considered examples of computing devices that can include one or more processors and associated processing elements and storage devices communicatively interconnected to one another by one or more busses or other communication mechanism for communicating information. Storage within such devices can include memory, such as random access memory (RAM) or other dynamic storage devices, for storing information and instructions to be executed by the processor(s) and for storing temporary variables or other intermediate information during the use of the stand determination alert system described herein. Such a computer system can also include read only memory (ROM) or other static storage device(s) for storing static information and instructions for the processor(s). A storage device, such as a hard disk or solid state memory can also be included for storing information and instructions, such as the instructions to compute stand determination from externally gathered data (e.g., image data), perform one or more analyses based on the gathered data, and to output an indication of the analyses and/or issue alerts. RAMs, ROMs, hard disks, solid state memories, and the like, are all examples of tangible computer readable media, which can be used to store the instructions for performing various techniques described herein. Execution of such instructions can cause the various computer-based elements of system 100 to perform the processes described herein, although in some instances, hard-wired circuitry can be used in place of or in combination with such computer-readable instructions to implement techniques of this disclosure.

To facilitate user interaction, collection of information, and provision of results, the computer systems described herein will typically include and/or be operatively (e.g., communicatively) coupled to a display device, though such a display may not be included with a server, which typically communicates results to a client/manager station (via an associated client/manager interface) rather than presenting the same locally. Client/manager stations will also typically include one or more input devices such as keyboards and/or mice (or similar input devices) for communicating information and command selections to the local station(s) and/or server(s).

To facilitate network communications, the computing devices associated with system 100 can include a communication interface that communicatively couples the one or more computing devices (e.g., via a one-way and/or two-way data communication path). For example, such communication interfaces can be Ethernet or other modems to provide a wired data communication connection or a wireless communication interface for communication via one or more wireless communication protocols. The communication interfaces can send and receive electrical, electromagnetic, and/or optical signals that carry digital data streams representing various types of information.

Stand Analyzer and Alert Generator 110, in some examples, can be configured to generate a stand alert by receiving input from user 130, data feed 115, commercial and/or public data sources 120, in-season data gatherer 140, and/or accessing data stored in database 135. Stand Analyzer and Alert Generator 110 can use historical crop information in order to, for example, determine stand based on past field or seed stand performance and/or practices such as planting or tillage that have impacted stand.

Data feed 115 can provide remotely gathered data relating to, for example, vegetation characteristics, weather, climate, and geological data and events (e.g., thunderstorms, floods, etc.). Data feed 115 can be provided by, for example, various public (e.g., the U.S. Department of Agriculture or the National Oceanic and Atmospheric Administration) or private sources and can be so provided on a fee or fee-free basis. Stand Analyzer and Alert Generator 110 can automatically include consideration of historically known climate conditions (e.g., historic temperature or rainfall, etc.) for a geographic location when generating a stand alert. On some occasions, a data feed can be associated with a system used by or provided by an agricultural product supplier. On some occasions, data feed 115 can be provided by a social networking service (e.g., Twitter, Facebook). In this way, one or more users can communicate information between one another that may be relevant to stand determination, status updates of current stand statuses for peer farmers, or stand treatment prescriptions and strategies of peer farmers. Alerts can be generated in a partially or wholly automated manner by Stand Analyzer and Alert Generator 110 analyzing, for example, peer group data, historical, real-time, or known data relating to stand determinations.

Example commercial and/or public data sources 120 include the Internet (public and private data services), combines, planters, and other equipment used to execute various agricultural practices. Other commercial and/or public data sources 120 can be academic and/or research organizations, suppliers of crop inputs, buyers of crops, and peer farmers.

In-season data gatherers 140 can include sensors carried by UAVs, aircrafts, satellites, irrigation equipment, and/or in-field sensors to measure field and crop conditions for one or more crops and fields or portions of fields included within the stand analyzer and alert system monitored area. The measurements are of the stand condition of the region of interest (e.g., field), including but not limited to data related to crop color (e.g., visible and/or non-visible color data), patterns, tone, texture, shape, shadow, temperature, size of the area, the intuited stand statuses, and/or information concerning the larger area in proximity to the targeted field or portion of that field. In this disclosure, sensors carried by UAVs are the data source for in-season crop condition data.

Database 135 can be one or a series of databases linked together and in communication with Stand Analyzer and Alert Generator 110. Database 135 can store data related to any facet of stand determination including, for example, current and historical data, including imagery produced by sensors carried by an unmanned aerial vehicle (UAV), satellite, or other aerial device, other ground-based sensor device, or other hand-held device. Database 135 can also include field location, soil characteristics, topography, historical weather, crop data, such as crop type, seed variety and other seed performance characteristics, other crop characteristics and practices (such as when and how the field is tilled and planted), historical nutrient measurements, historical yield maps, notes, local knowledge, and planned events. Further details regarding the information stored in database 135 are discussed below with regard to FIG. 2.

Generating a stand determination alert can involve the user 130 manually selecting or entering, for example, various observations and preferences for the area (e.g., areas to exclude, visually determined conditions, and/or notification trigger parameters) using the user interface 125. A user can enter local knowledge into Stand Analyzer and Alert Generator 110 for incorporation into the stand determination and alert system. For example, a user can enter a period of time in which a particular field will be analyzed, details concerning manure applications, or observations made when planting or harvesting that can be incorporated into the Stand Analyzer and Alert Generator 110. On some occasions, manually selected preferences and other user-entered information can be stored in database 135.

The Stand Analyzer and Alert Generator 110 can provide information about determined stand statuses (e.g., to user 130). For example, Stand Analyzer and Alert Generator 110 can output one or more indications, such as one or more of an e-mail and/or a message relayed via a messaging system accessible through communication network 105. In one example, the one or more indications can include a hyperlink to a portal at which details regarding the stand determination are available. Other forms of communication, such as an instant message or a text message sent via short message service (SMS) (e.g., to a mobile phone) can also be used to indicate a stand deficiency has occurred. In the illustrated example of FIG. 1, user interface 125 can represent any device via which user 130 can be provided with information regarding the stand status determination. Example user interfaces 125 can include desktop or laptop computer systems, mobile computing devices (including but not limited to so-called "smart phones"), tablet computing devices, and portable computing devices.

In some embodiments, one or more users 130 can access a stand determination analysis via user interface 125 communicatively coupled to network 105. Interfaces for various types of users can be different in form and content, or similar to user interface 125. Example users can include employees, managers, owners, equipment operators, suppliers, consultants, regulators, and/or others who assist user 130 in determining and/or executing a corrective strategy or having an interest in the status or outcome, anticipated and realized.

Figure 2:
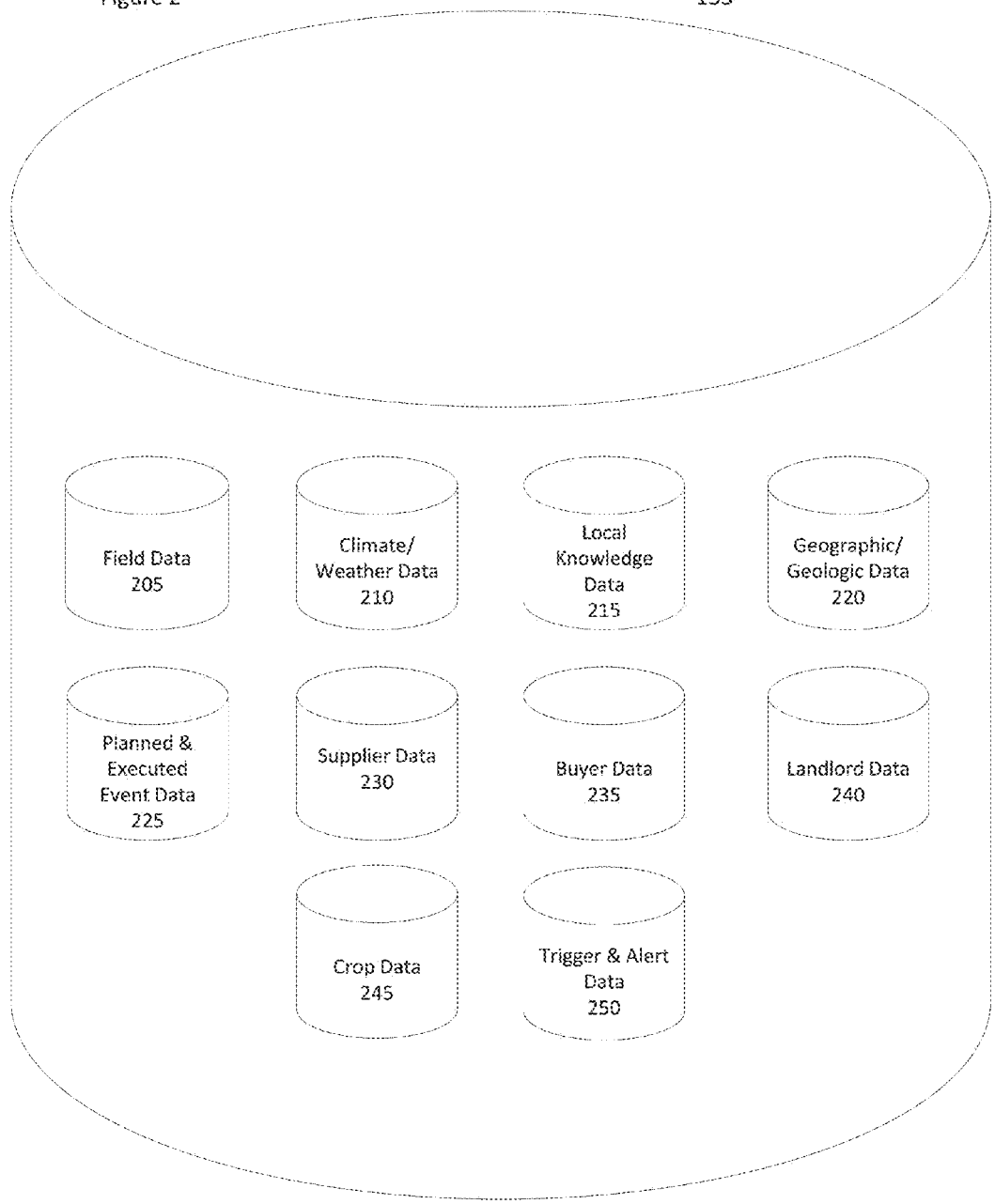
FIG. 2 is a block diagram representation of sets of databases employed in the system of FIG. 1.

FIG. 2 is a block diagram depicting example sets of data or databases that can be included in database 135. For example, database 135 can include field data 205, climate and weather data 210, local knowledge data 215, geologic/geographic data 220, planned and executed event data 225, supplier data 230, buyer data 235, landlord data 240, crop data 245, and trigger and alert data 250. In some examples, database 135 can include greater or fewer categories of data than those illustrated with respect to FIG. 2. In certain examples, database 135 can be implemented via more than one database. For instance, categories of data illustrated in FIG. 2 with respect to database 135 can be stored across multiple databases and/or multiple types of databases. Examples of such databases, including database 135, can include relational databases, multidimensional databases, object-oriented databases, or other types of databases. Information stored in database 135 can be received from, for example, a user, such as user 130, a data feed, such as data feed 115, an in-season data gathering source, such as in-season data gathering source 140, via a communication network, such as communication network 105, and/or a combination of the foregoing.

Field data 205 can include information regarding, for example, field locations, the shape of the field, the proximity of the field to other relevant locations such as other fields managed and operated by the user. In this embodiment, field data can include field data for other farmers' fields. Field data 205 can also include data associated with the field's characteristics, such as topographical information, soil types, organic matter, moisture condition and water-carrying capacity, fertility, and other non-crop vegetation on the field. In addition, field data 205 can include historical crop production data on the field, including crops planted in prior years and historical yields, including yield maps illustrating yield variability across the field, as-planted maps, and tile maps. In addition, field data 205 can include historical practices specific to that field, including for example, tillage and irrigation.

Climate and weather data 210 can include information relating to historical and predicted weather and/or climate conditions for a particular region, area, or field. For example, rainfall, hail, wind, and other factors that can impact stand.

Local knowledge data 215 can include information relating to knowledge or preferences specific to a user and can include, for example, preferred agronomic and other crop production practices, site-specific knowledge, past experiences, activities, observations, and outcomes. On some occasions, local knowledge data 215 can be used to override or modify an aspect of a stand determination analysis. On some occasions, local knowledge data 215 can include data received via a social network from other users. For example, stand problems on a nearby field operated by another farmer can be relevant to the user's fields; i.e., cutworm on one field is possibly an indicator of a stand problem on another field, or hail on a neighboring field can be an indicator of a stand problem on the user's fields.

Geographic/geologic data 220 can include geographic and/or geologic data related to, for example, fields which are included in the determination, analysis, and alerts. Examples of geographic or geologic data 220 can include roadway, surface and/or underground water, and landmark locations. Geographic/geologic Data 220 can be derived from a variety of sources, such as satellite images, global positioning information, historical information regarding an area of land, plat book service providers, non-governmental organizations, and public and private organizations and agencies.

Planned and executed event data 225 can include information regarding planned events preceeding, during, and/or following the crop-growing season. Example planned events can relate to activities such as when crops are planted and the seed specifications and planting information, such as planted seed locations and population, scouting events, fertility tests, follow-up assessments, scheduled aerial data gathering events, and treatment events.

Supplier data 230 can include supplier information (names, locations, services, products, prices, contractual information, etc.), as well as delivery and/or instructions, dates and other special activities related to stand determination analysis and alerts.

Buyer data 235 can include data that relates to obligations and specifications that a buyer of an agricultural crop can have imposed on the farmer that impact the stand determination analysis and status, such as, for example, restrictions, response requirements, standards, notifications, schedules, requirements, and the like.

Landlord data 240 can include data that relates to obligations and specifications that a landlord can have imposed on the farmer that impact the stand determination, such as, for example, restrictions, response requirements, standards, notifications, schedules, requirements, and the like.

Crop data 245 can include crop conditions over the growing season as determined through various sensing methods, such as through UAVs or visual observations, and through the user's local knowledge. It can include previously performed analyses and determinations of stand.

Trigger and alert data 250 can include specific measurement parameters which, if exceeded, cause an alert to be triggered and sent to the user. In the present embodiment, the triggers are preset to defaults by the stand analyzer and alert system. However, the user can override the default triggers on a field and/or operational level if he or she feels the need to do so. Additional data in this database can include historical determinations and alerts that have been previously sent to the user.

Figure 3:
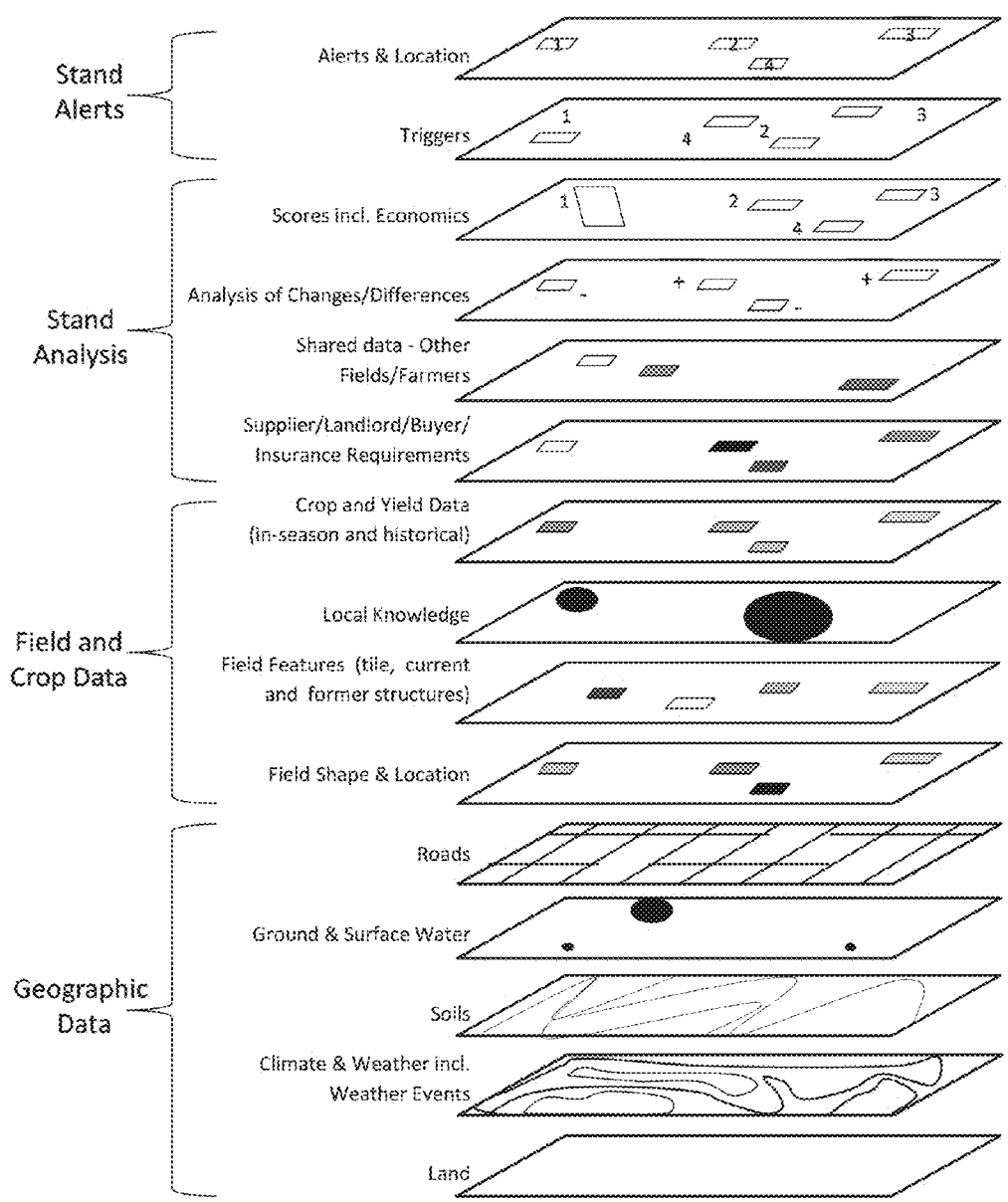
FIG. 3 is a graphical representation of types of data that can be included in the databases.

FIG. 3 illustrates an example geographic information system (GIS). As illustrated in FIG. 3, GIS image 300 can include geographic and/or geologic data 220. As shown, GIS image 300 includes various data structures, each of which can be regarded as a layer. These layers provide information regarding various data elements of a stand analysis and alert for a field, including, for example, geographic data, field and crop data, stand analysis data, and stand alert data.

Example geographic data can include information related to an area of land (the field plus adjacent areas) (e.g., topography, slope, etc.), historical weather and climate information, soil attributes (e.g., soil types, texture, organic matter, fertility test results, etc.), the presence and location of ground and surface water, and any man-made features upon the land (e.g., buildings, roads, ditches, etc.) currently existing or formerly in existence. Example field and crop data can include the location, size, and shape of the field, and can be related to tiling information. Example local knowledge can include special insights concerning the field that only the person farming the field would know. Local knowledge can also include comments and data related to special events and visual observations. Historical crop and outcome data can include data related to former crops planted and yields, fertility tests, fertilizer applications, and other applied products. An example stand determination analysis can include and/or be based on requirements imposed on the farmer by the landlord or buyer of the crop and/or instructions and contracts with the supplier of crop inputs and services. The stand determination analysis can also include and/or be based on data that relates to insuring the crops, data shared from other farmers, and determined stand status scores, including economic viability concerning replanting areas of stand deficiency. Stand determination alerts data can be those issued alerts that are stored in database 135.

Figure 4A:
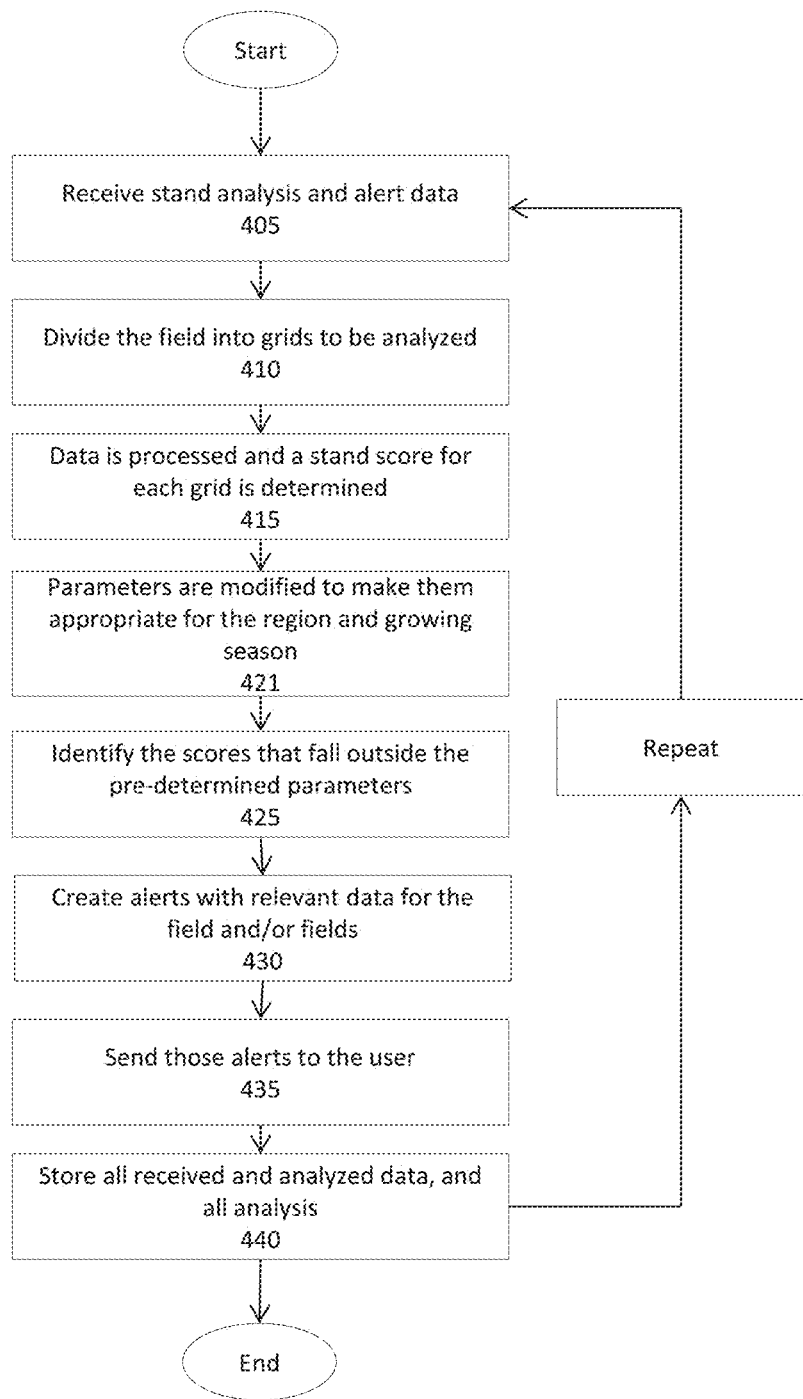
FIG. 4A is a flow diagram illustrating example operations to generate a stand determination alert.

FIG. 4A is a flow chart depicting an example process 400 for generating a stand determination alert in accordance with one or more aspects of this disclosure. Process 400 can be executed by the Stand Analyzer and Alert Generator 110 described in connection with FIG. 1 in cooperation with, for example, any of the systems and/or system components disclosed herein.

In step 405, information regarding stand determination can be received by, for example, Stand Analyzer and Alert Generator 110 from, for example, a user, such as user 130 (via a user interface, such as user interface 125), a database, such as database 135, a data feed, such as data feed 115, and an in-season data gatherer, such as in-season data gatherer 140, via a communication network, such as communication network 105. Example received information can relate to target areas for the stand determination and alert system, a UAV event and the data generated, an in-field sensor, commercial and/or public data, and/or data entered by a user based on a visual inspection. Additional examples include disease or pest information that impacts stand status from a public or social network, hail, rain, or other weather event, planned events, local knowledge, historical patterns, scientific research, and/or geologic/geographic characteristics of target areas. On some occasions, the received information in step 405 can include one or more previously generated stand determination analyses. The target area can be divided into grids where the grid size is based on the input of the user or determined by the Stand Analyzer and Alert Generator (step 410). Grid sizes can vary from a few square feet to one or more acres. The smaller the grid the more accurately the Stand Analyzer and Alert Generator will determine the stand for that specific grid. The new data can then be processed and analyzed in combination with other data to determine a stand score for each grid (step 415).

When the stand analysis is performed by the Stand Analyzer and Alert Generator 110, the results are then analyzed against predefined triggers. Such triggers for the Stand Analyzer and Alert Generator 110 can change depending on, for example, the time of year, the type of crop, and the stage of the crop in its growth cycle. For example, early in the growing season the triggers can be at a level such that the user is notified with a higher sensitivity to stand deficiency because replanting certain areas in the field can be a viable option if deficient stand population and consistency are discovered early. Later in the season replanting may not be a viable option because any replanted crops may not have time to mature in the remaining growing season. This example is reflective of more northern farming areas where the growing season (summer) is shorter in duration relative to other climates. The final replant decision can be based on multiple factors, including the time of the year, the financial costs of replanting or not, insurance terms, and contractual obligations with the landlord or buyer of the crop. Therefore, scores and/or triggers are modified (step 421) to reflect the changing crop options during the course of the year.

The scores for each grid can then be analyzed against predefined acceptability parameters (step 425), and if they fall outside those parameters, they trigger the stand determination and alert system to notify the user. If a trigger is activated, the Stand Analyzer and Alert Generator 110 creates the appropriate alert (step 430) and notifies the user using the preferred communication method as defined by the user (step 435). Finally, that data, both received and the analysis resulting from it, is stored within the Database 135 (step 440).

Figure 4B:
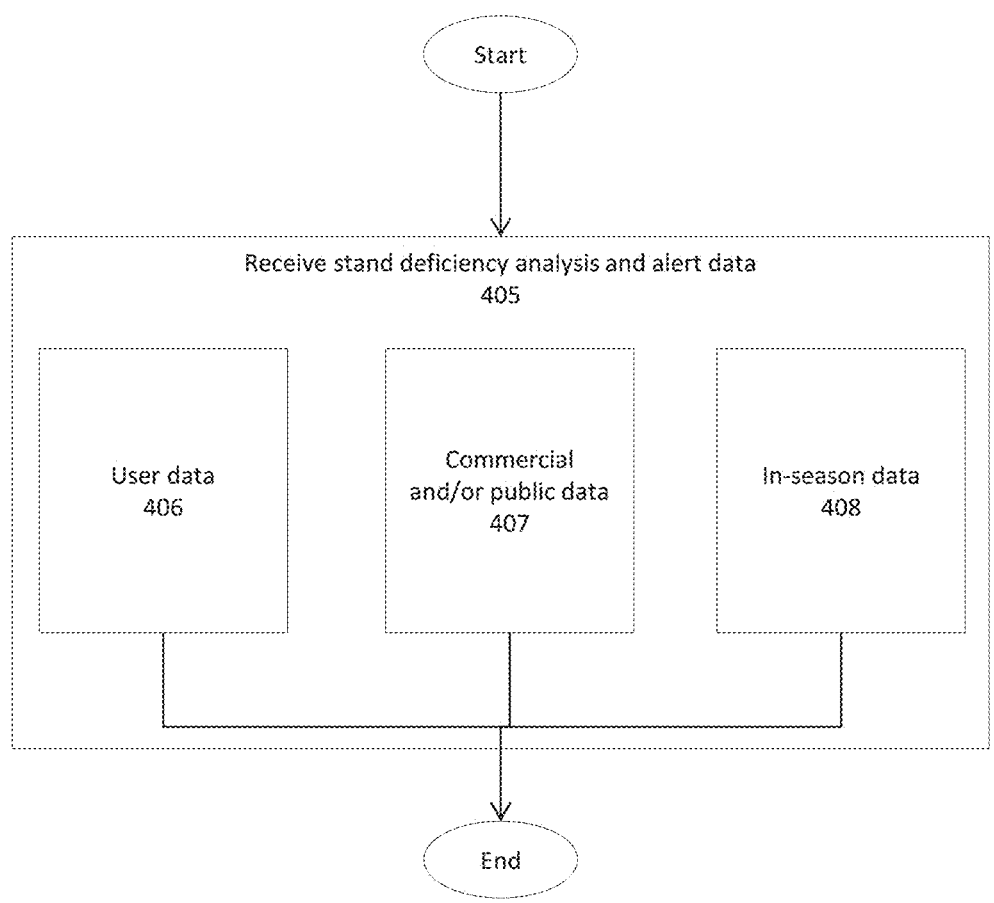
FIG. 4B is a flow diagram illustrating further details of the operations of FIG. 4A.

FIG. 4B is a flow chart depicting example process 401 for receiving stand determination analyzer and alert data in the flow chart of FIG. 4A with regard to step 405. Process 401 can be executed by the stand determination and alert system described in connection with FIG. 1 in cooperation with, for example, any of the systems and/or system components disclosed herein.

In step 405, new data has been received and analyzed by the stand determination and alert system. New data can be entered and/or received from one or more sources, such as from the user (block 406), commercial and/or public sources (block 407), often, but not always, accessed through the Internet, and in-season data gathering sources (block 408) that reflect in-season crop status such as the data produced by a sensor carried by a UAV or an in-field sensor. In step 406, the user enters into the Stand Analyzer and Alert Generator 110 any information that relates to a region of interest (e.g., field(s) and/or crop(s)), including planted seed and as-planted data, local knowledge, local observations, planned events, and supplier, buyer, and landlord data. In step 407, the Stand Analyzer and Alert Generator 110 searches for and receives data from the System Database 135 and data from free and fee-based sources (commercial and/or publicly available data) that relates to geographic data, climate/weather data, and economic data including pricing and agronomic data. In step 408, the Stand Analyzer and Alert Generator 110 receives data reflecting the current status of the crop from a UAV (or other in-season data-gathering device) after its flight.

Figure 4C:
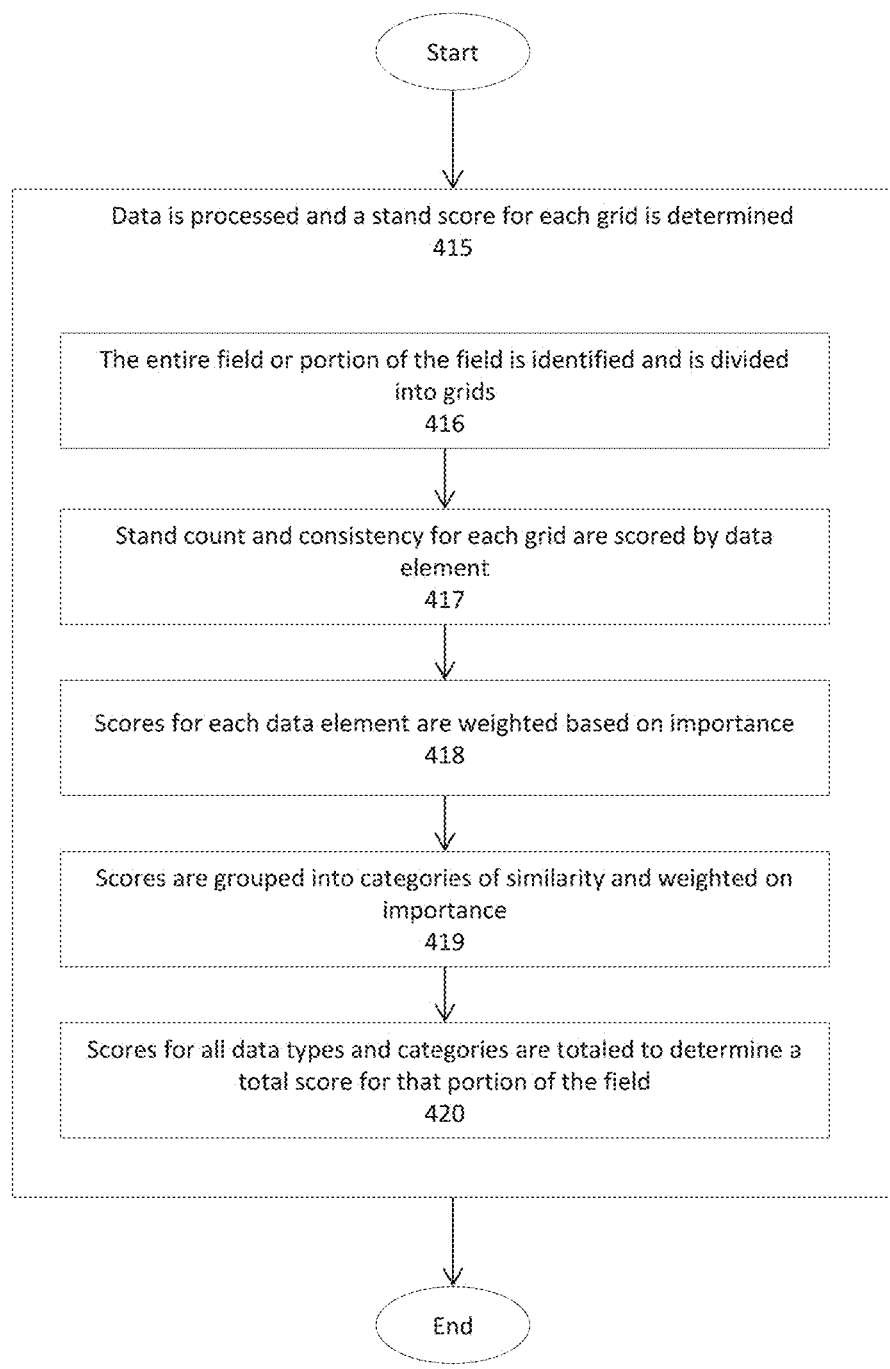
FIG. 4C is a flow diagram illustrating further details of the operations of FIG. 4A.

FIG. 4C is a flow chart depicting example process 402 for analyzing the received stand determination data with regard to step 415 shown in FIG. 4A. After the stand determination data is received by the Stand Analyzer and Alert Generator 110, the field or a portion of the field is identified by the system and then divided into grids for analysis (step 416). In some scenarios, only a portion of a region of interest is analyzed, such as a portion corresponding to a troublesome portion of a field. Across a field the stand can be variable due to a number of factors, for example field topography including hills, slopes and low areas, tile placement, soils texture, planting equipment malfunctions, and variable levels of rain, hail, and wind, as well as a variety of other factors. The grids can provide a method to determine stand for each portion of the field independently of the other portions of the field. In some scenarios, only one grid can indicate a stand issue while all other grids indicate normal stand condition. However, issues with one grid can be an early indicator of widespread stand issues to follow. The size of the grids can vary between applications, such as between fields and/or users (e.g., based on preference). For instance, a user who has a field with greater variability can use smaller grids to accurately analyze the field. The size of the grids can be automatically determined by Stand Analyzer and Alert Generator 110, or can be determined via inputs received, e.g., from the user.

Data is then analyzed for each grid (steps 417, 418, and 419). This analysis can include image processing and data analysis, in combination with observations and local knowledge entered by the user. The types and scope of the analysis can vary depending on the crop, time of year, latitude and longitude, and the specific data elements of focus. As an example, Stand Analyzer and Alert Generator 110 can determine a number of plants included in a region of interest (e.g., a field, a portion of a field, such as one or more grids, etc.) using computer vision techniques to analyze image data received for the region of interest. For instance, Stand Analyzer and Alert Generator 110 can identify individual plants within the region of interest and can assign a unique identifier to each plant to determine a total number of plants within the region of interest. In some examples, Stand Analyzer and Alert Generator 110 can determine a quality status of plants within the region of interest, such as by determining a size of plants within the region of interest. For instance, Stand Analyzer and Alert Generator 110 can analyze image data of the crops to determine a number of pixels associated with each plant. The number of pixels of the image associated with a plant can correlate to the size of the plant. For example, a greater number of pixels associated with a plant can correspond to a larger plant, which can thereby correspond to a higher yielding plant. Similarly, fewer pixels associated with a plant can correspond to a smaller plant, which can thereby correspond to a lower yielding plant. In this way, Stand Analyzer and Alert Generator 110 can analyze data, such as image data, to categorize and/or analyze data representative of crops within the region of interest.

In the present embodiment, each grid is scored by data element (step 417). There can be multiple degrees or levels of factors that impact stand for each data element; for example: type of tile, such as 50' grid, 100' grid, 200' grid, random, or none. Each of these types of tile can impact stand by various degrees and therefore a value is assigned. The data element can then have a value related to the type and existence of tile in the grid. Other data elements may only have a simple yes or no response option. Another example data element can be the imagery captured by a sensor carried by a UAV. The Stand Analyzer and Alert Generator 110 can continue to analyze each of the data elements for each grid and assign a score to them. Each of the scores can then be modified based on weighting (step 418) for that individual data element. For example, an actual stand count resulting from a UAV event that was recently received can carry higher weighting than data related to tile, topography, or soils, etc.

In the present embodiment, the data elements are grouped together with other similar data elements into categories (step 419). For example, a soils category can contain soil texture, soil variability, soil organic matter, and the like. The scores for each category are then totaled and modified based on weighting for that category (step 420). All categories can be totaled to arrive at a score for that portion of the field.

FIG. 4D is an example table that can be used to arrive at a score for each grid of a field (step 415). In the present embodiment, the data elements are assigned response options with corresponding values for each response option (403a). The data elements are grouped together in categories of similarity (403b). In addition, each data element is assigned a particular weighting of importance within its category to place the appropriate amount of emphasis on each data element (403c). The categories of data elements (403d) are also assigned a particular weighting overall against other categories (403e). These response option values, weighted according to ranking of importance, both within each data element (403f) and within its category (403h), are then summed to create a final stand score (403g). In the present embodiment, two categories are listed, Improvements and Drainage. Although the factors and categories can vary according to the type of crop, the area the crop is planted on, the farmer's preferences, etc., some potential categories of consideration include, crop stress, fertility added, soils, drainage, improvements, weather's impact on nutrient availability, management practices, production history, and seed-as-planted.

Figure 4E:
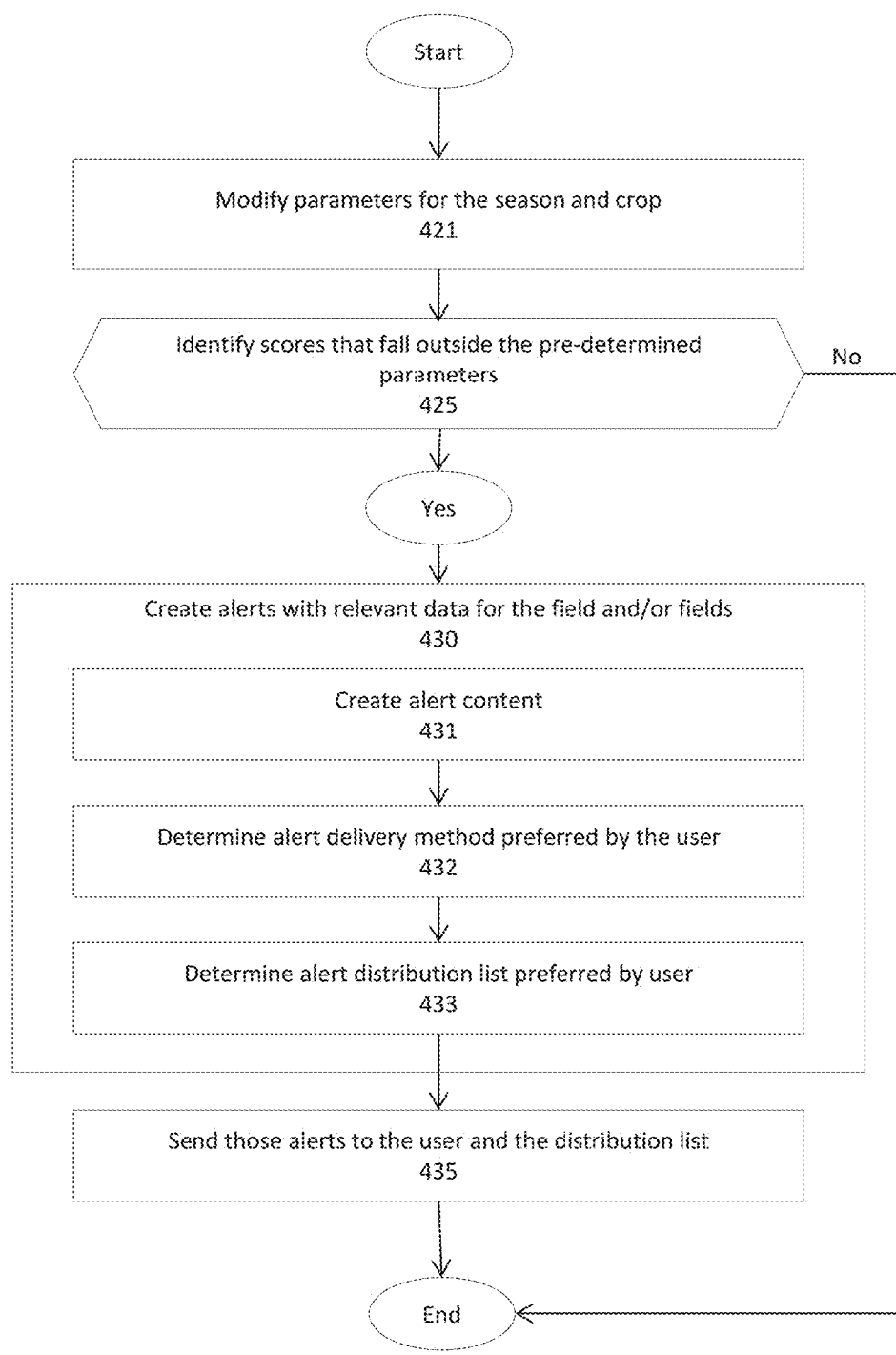
FIG. 4E is a flow diagram illustrating example operations for outputting a notification of changes in stand determinations.

FIG. 4E is a flow chart depicting an example process 404 for outputting a notification of stand determination with regard to steps 421, 425, 430, and 435. Notifying users of changes in stand determination begins, in certain examples, after each grid has been analyzed and a score of stand determination has been determined. The scores for the grids that are included in the analysis are compared against the parameters of acceptability for the particular crop and the particular season. The parameters are modified throughout the season depending on the type of crops planted and the time of the year (step 421). If the scores exceed the parameters, then a notification to be sent to the user is triggered (step 425); if not, then no notification is sent. In some examples, scores that do not fall outside the parameters can be stored as data in database 135. Example parameters can include scores that indicate an unexpected change in normal and customary plant growth, an indication that the crop stand is deteriorating by a pre-defined measure, or a defined minimum number of grids, acres, or percent of the field that has demonstrated an indication of stand issues. If an alert is triggered, then the stand deficiency parameters have been exceeded and a notice will be sent to the user (step 430).

In step 430, the alert content is automatically created by the stand analyzer and alert generator (step 431). Example content to be included in the message can include a reason for the alert, the date and condition of the last data sample, the location(s) of the determined change in stand, the number of grids excluded from analysis, and the number of grids or acres determined to have activated the trigger of an alert. The alert content can depend on the embodiment and can differ for many reasons including, for example, the preference of the user, type of crop, or severity of the stand issues. Another example of message content is a notification to "check a field" or maintain surveillance on a field on a "watch list." In some embodiments, the content of the notification can differ based on the role of the individual. For example, a supplier can receive a message with information that differs from a message received by a peer farmer included on the distribution list.

Stand Analyzer and Alert Generator 110 can determine the method by which the notification is to be output (step 432) and the list of people who will also receive the notification list (step 433), identified as the distribution list in the present document. The user can elect to receive the notification by any number of methods or combination of methods; for example, via a text message or email, and/or phone call. The user can create a distribution list that identifies the individuals or organizations that should know about the stand or those who may be helpful and could take action to quickly remedy the stand deficiencies. Examples of people who a user may want to include in a distribution list are him- or herself, a farm manager, consultant, supplier, buyer, landlord, peer farmer, and/or banker. The user can notify those included on the distribution list by any number of methods or combination of methods; for example, via a text message and/or email (step 435). In some embodiments the user may want to notify other peer farmers using these methods, however, the user can also use a type of social network to provide notifications. Following step 435, process 404 may end.

Figure 5:
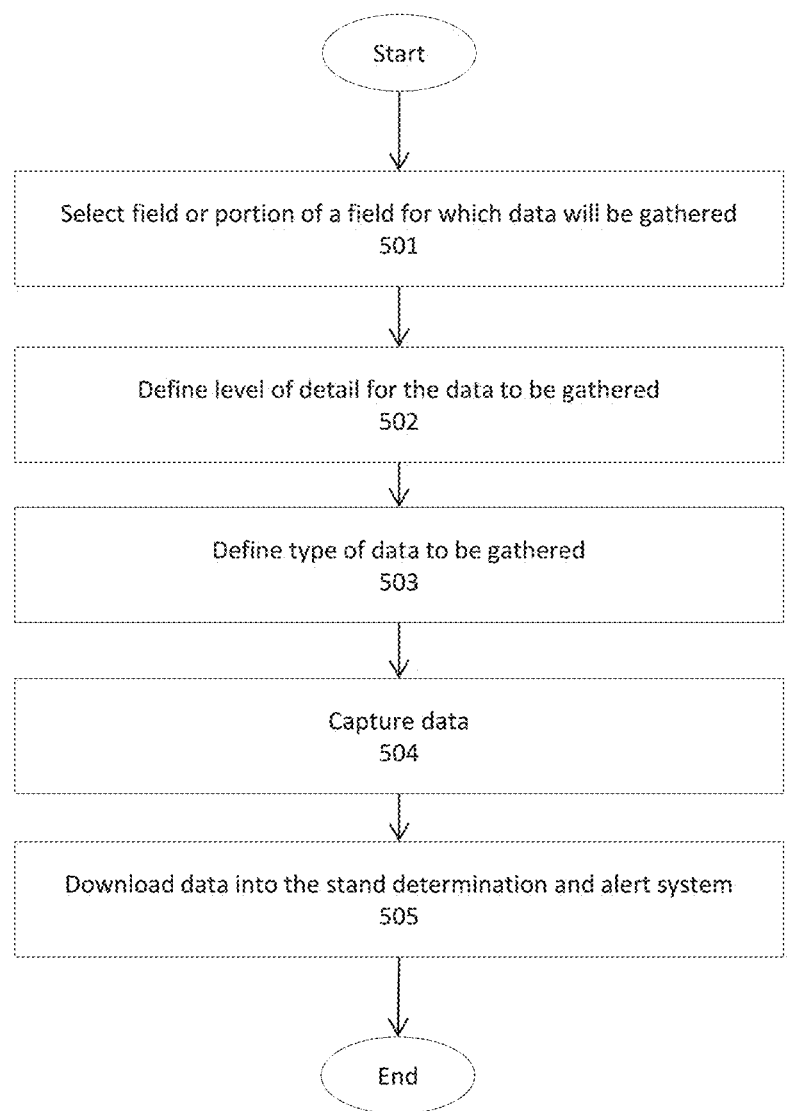
FIG. 5 is a flow diagram illustrating example operations for collecting in-season imagery of plant conditions.

FIG. 5 is a flow chart depicting an example process 500 for gathering in-season imagery of plant conditions with regard to step 405 of FIG. 4A. As previously described herein, it can be important to identify stand issues as soon as possible such that corrective action can be taken and the deficiency rectified so that crop deterioration and yield loss is minimized. In some examples, aerial vehicles, such as UAVs, manned aircraft, and satellites can be utilized for efficient and timely data gathering. In certain examples, data can be gathered and received from in-field and remote ground-based sensors.

Process 500 begins with the selection of the field or portions of a field from which data will be gathered (step 501). Example data regarding the areas to be analyzed can include latitude and longitude, shapes, soils, slopes, topography, historical data, weather, crop, practices, and GIS data. Stand Analyzer and Alert Generator 110 can use this data and combine it with other data available for that area.

Data can be gathered for an entire field or only a portion of a field. In the event that data is gathered for only a portion of a field, a boundary of that portion can be defined (step 501) for the field in question. The level of detail can be determined (step 502) for the information to be gathered. As described above, the level of detail can be in grids that are in various sizes, such as sizes determined by the user. The type of data to be gathered can be determined (e.g., via input from a user) (step 503). The data-capture device (i.e., a sensor attached to a UAV) can capture the data (step 504), and the data can be downloaded into the stand analyzer and alert system database 135 (step 505). Example methods to extract and download data from the capture device to the database can be via a memory stick or other memory card or a wireless transfer directly from the device to the database.

FIGS. 6-15 illustrate various aspects of graphical user interface (GUI) screens that can be used to gather and/or present information regarding stand determination and alert users of a stand deficiency or issue in accordance with embodiments of the present invention. The GUIs shown in FIGS. 6-15 can be prepared by, for example, Stand Analyzer and Alert Generator 110 and provided to a user, such as user 130 via an interface, such as user interface 125. FIGS. 6-15 illustrate example GUIs that relate to a user who is receiving alerts, gathering data, reviewing information, and managing crop development, and demonstrate the use of a "smart phone," tablet-style computer, and/or PC as well as email and text messages, as user interface 125.

Figure 6:
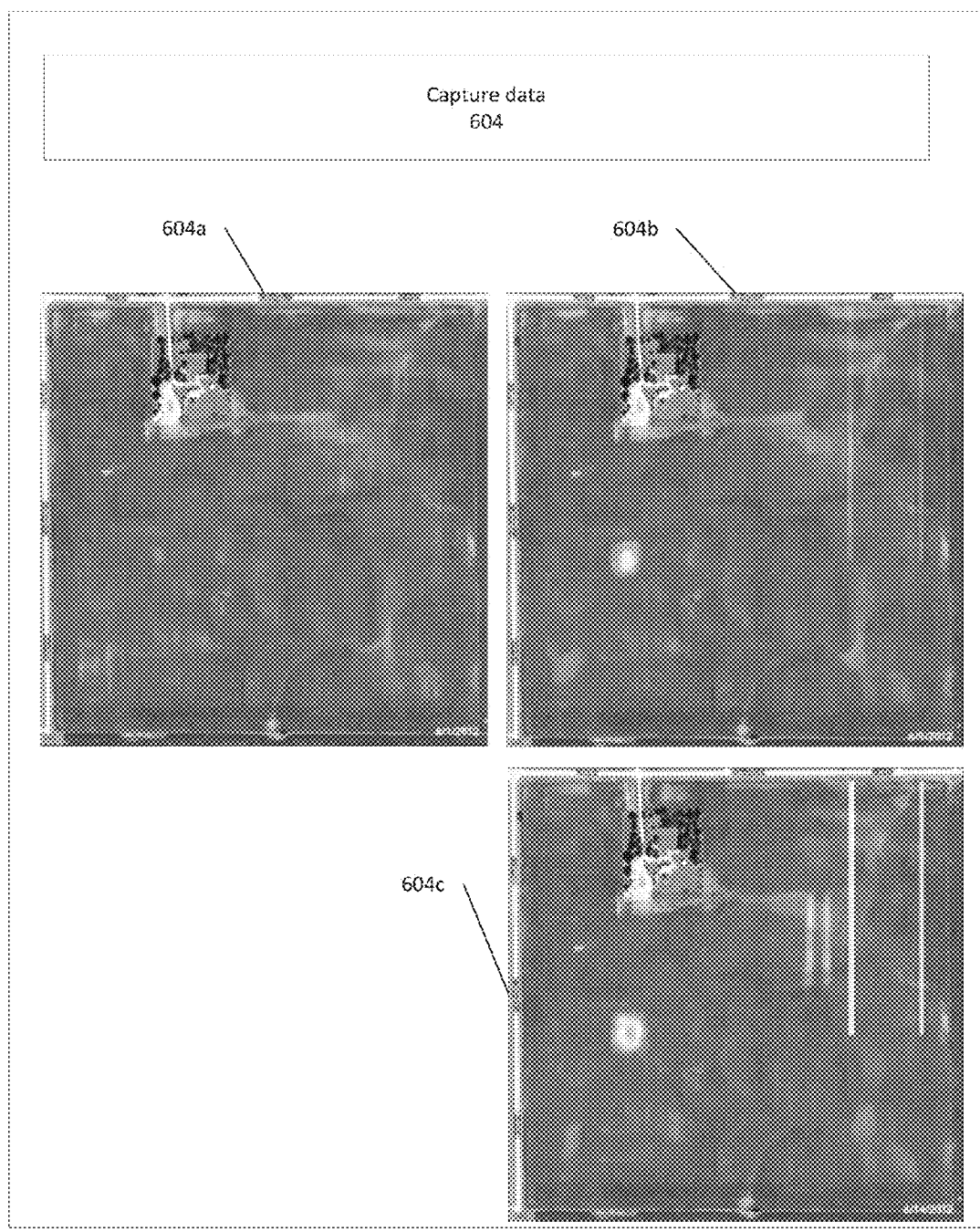
FIG. 6 illustrates aspects of example graphical user interface (GUI) screens derived in accordance with one or more aspects of this disclosure.

FIG. 6 includes three images of a field captured by a sensor carried by an aerial vehicle (e.g., a UAV) over a period of days and illustrates changes in the crop's condition over time (604a, 604b, and 604c). In this embodiment, the images and related data, captured over time, is analyzed and the stand status is determined. As previously described, the stand status is measured, for example, based on texture, color (traditional and infrared), patterns, tone, shadows, and temperature combined with other available data and is the basis for generating a score of stand status by the Stand Analyzer and Alert Generator 110.

In some embodiments, certain visual and other display techniques can be used to make the stand deficiencies more apparent. For instance, visual indicators of the crop's growth can be amplified by electronic means to enhance the image and illustrate any deficiencies. As another example, time-lapse photography techniques can be utilized, such as when changing crop conditions can be visually observed over time.

FIG. 7 shows an example of an alert message that can be output in response to a determined stand deficiency. This example message alerts the user that a stand deficiency has been determined by the Stand Analyzer and Alert Generator 110 and in this embodiment the user is advised that he or she may want to personally investigate/inspect the location of the deficiency to make a final determination. The user can be the producer (e.g., farmer) or another person designated by the user to receive the information, such as a crop consultant, buyer, supplier, landlord, or other designated person or organization. In this example, new additional data was received by the Stand Analyzer and Alert Generator 110, which can be processed by the Stand Analyzer and Alert System 110 to determine and/or update a stand score. In this example, the stand score triggered an alert; 50 acres have a stand deficiency and replanting may be the recommended prescription, 15 acres are in a "gray area" where the farmer needs to determine the best course of action, if any, and 20 acres are within acceptable parameters (status quo) and no corrective action is needed at this time. When the score exceeded the predefined parameters of acceptability, it triggered the Stand Analyzer and Alert Generator 110 to automatically generate an alert and send it to the appropriate user and/or those authorized by the user to receive the alert via communication network 105. The alerts can contain various levels of detail, such as the size and/or location of the area/grids where the analysis was performed and deficiencies found. The alert can also contain content that is unique, based on the preferences or roles of the user. Stand Analyzer and Alert Generator 110 can determine to issue an alert based on any one or more of the received data, such as data received by a sensor carried by an aerial vehicle (e.g., a UAV), data received via a rain sensor, weather data, or other types of data. While the use of a UAV is the preferred method to generate additional new, in-season, aerial data, it is only one type of device that could be used. For example, an in-field or remote sensor, a rain monitoring device, and/or a weather forecast can all cause the Stand Analyzer and Alert Generator 110 to determine that an alert is required.

Figure 8:
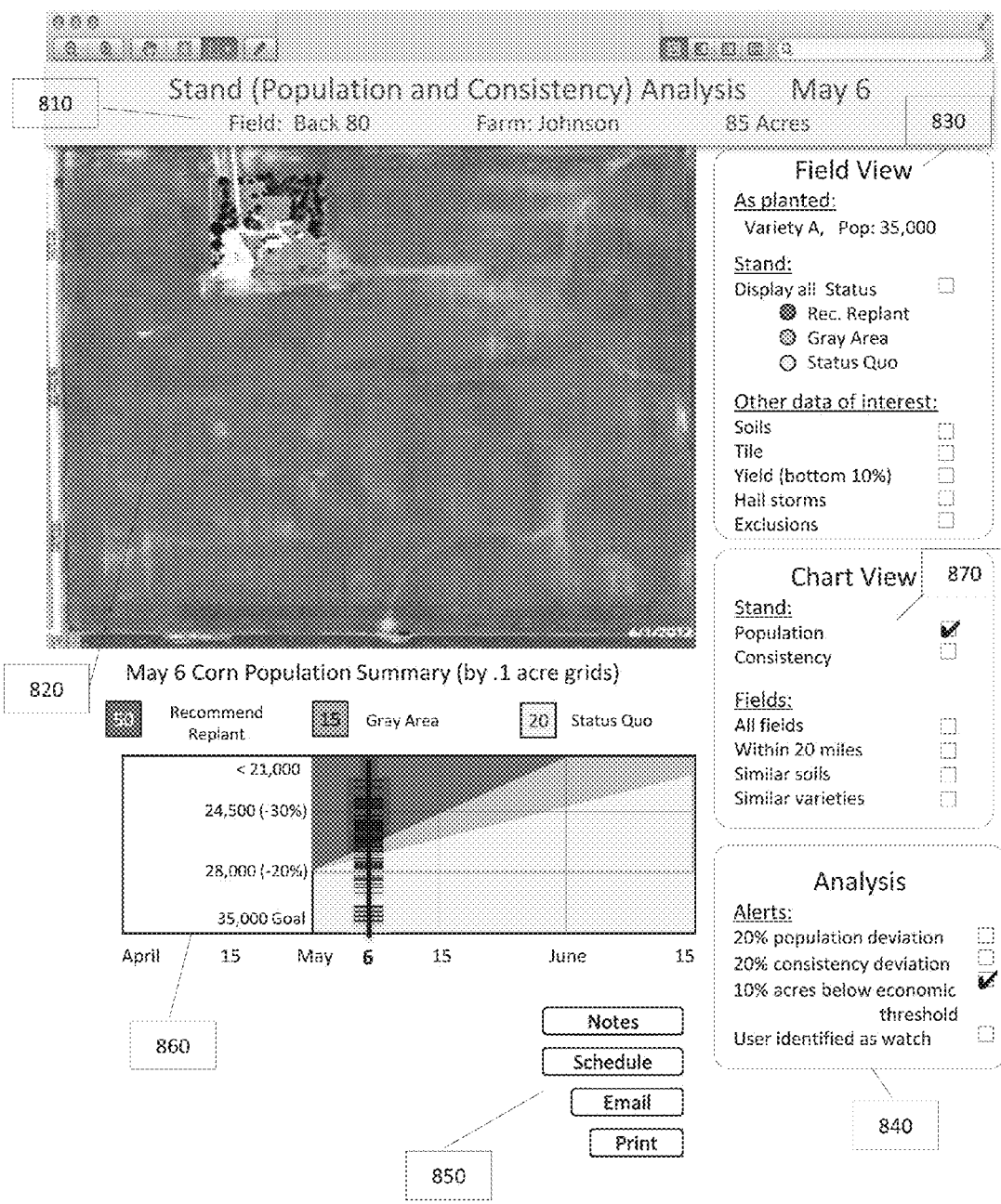
FIG. 8 illustrates an example screen shot of a user interface relating to a specific field.

FIG. 8 illustrates an example of a user interface that can be used to review information related to stand determination. In this embodiment, an alert has been triggered and the user has been notified of a potential stand problem on this field. However, in this embodiment the user can access this information regardless of whether or not an alert has been triggered. The content on this screen can vary depending on the role of the user and the presentation of the content can vary depending on the manner in which it is viewed.

Screen 800 provides a user with information regarding stand determination for a specific field along with additional information that can be helpful to the user. In this example, field identifiers 810 as well as an image of the field 820 are provided. Along with the image of field 820, there is a modifiable field view area 830 that contains controls that allow the user to alter the views of the image of the field 820, in addition to the ability to exclude areas of the field that are not to be included in the analysis. An analysis area 840 is also provided and identifies the alert status and the triggers, or sensitivity parameters, which, if activated, result in an alert. The ability to take actions regarding the issued alert 850 is also provided. This screen shows a graphical chart 860 that can show trends in stand determination over time. Finally, chart view 870 enables the user to change the view of the content contained in the chart 860.

Screen 800 contains field identifiers 810. In this embodiment the field and farm names are displayed, as well as the acreage. Other possible content for this portion of the screen can include latitude and longitude, crop type, and/or ownership status.

In example screen 800 there is an image of the field 820. In this example, the image is the result of a sensor carried by a UAV and an in-season data gathering event. While not shown on this sample screen, it is understood that various types of information can be available to the user, such as by moving a cursor over the image. For example, displaying multiple images taken over time can provide a view of the changes in crop stand over time. In some embodiments, the user can be able to zoom in on part of a field and thereby gain a closer view. In some embodiments, the views available can depend on the capabilities of the user interface device, on the capabilities of the sensor (e.g., an image sensor carried by a UAV) capturing the data, and on the transmission capabilities of the communication network 105.

The modifiable field view area 830 enables the user to control the content displayed on the field image 820. In this embodiment, the user can overlay information relating to the soils, tile, yield, weather, and exclusions onto the field image 820. This additional information can change the way the user views and interprets the data. The exclusion portion of the field view 830 of this example user interface relates to portions of the field that will be excluded from analysis and alerts. For instance, a user can exclude (e.g., based on local knowledge) those portions of the data that would naturally deviate from the data received for the region of interest and throw off the data set. For example, the user may want to exclude former building sites from the analysis because they can skew the results. The Stand Analyzer and Alert Generator 110 can utilize such exclusion zones to prevent certain alerts (e.g., nuisance alerts) from being output (e.g., to the user). Each of the view types listed in the field view 830 can aid the user in making determinations of what follow-up actions, if any, should be taken.

Analysis area 840 includes a summary of the alert analysis, as well as identifies the triggers which will cause an alert to be sent to the user. Here, the user is able to identify the parameters, which if exceeded, will trigger an alert to be sent to the user via the communication network. For example, the user can request to receive an alert when a certain amount of a field or a certain percentage of deficiency has been shown to have stand issues. For example, the system could send an alert when the portions of the field are identified as having at least a twenty percent deviation in population compared to the rest of the field as determined by the Stand Analyzer and Alert Generator 110. The check mark indicates that that parameter has been selected. Specifically, an alert is issued in this example when at least ten percent of the field has been identified as being below the economic threshold. In some examples, an alert can be output daily, weekly, or in other increments of time. Triggers can also be added and/or deleted (e.g., by a user).

Capabilities to take actions based on the analysis are, in this example, indicated by the buttons 850 in the lower right portion. For example, it is possible to send an email to a supplier such that they can correct the problem. Or the user can make a note, or schedule an event, or simply print out a report. Specific information relating to the stand determination and potential follow-up actions can be included; for example, the coordinates of the portions of the field with stand issues can be included in an email, as well as other information.

Graphical chart 860 allows the user to view additional types of data and analysis of data concerning stand determination for this specific field. This embodiment includes a graphical method to view each of the grids of data in comparison with each other. In this example, the black horizontal dashes represent a grid from the field and its stand consistency and population. The bottom of the chart consists of a timeline upon which various data gathering events and analyses will be displayed. In this example, a UAV has gathered data on May 6th, and it has been analyzed on a grid-by-grid basis and graphed vertically. In the example shown, the data is superimposed upon a graph that displays the diminishing return further into the growing season to replant particular grids. As is shown in the graph, early in the growing season (in this embodiment, the month of May), it is more economically viable to replant areas where there is a stand deficiency. This replanting option is demonstrated here as a dark gray. As the growing season progresses, it becomes less viable to replant areas; in the present document this is referred to and displayed as a "gray area". The gray area is where the decision to replant areas of stand deficiency could be decided either way. Finally, the area where the plant growth and stand is deemed appropriate is listed as being "status quo". Again, as the growing season progresses, even lessened stand success is considered status quo, as the return on investment to replant the affected stand deficiencies is not supported by economic viability. Data gathering events further in the season are shown and discussed below. The determination of when there is a diminished return in the replanting cycle could be based on historical data from this field, or possibly based on available online research by a university or other research organization concerning plant health at specific times in its development cycle.

Chart view 870 can enable the user to control the view of the data in the graphical chart 860. The user can determine and control what specific data is to be displayed on the chart. Comparisons can be made with other fields, such as other fields operated by the user or other farmer. This sharing of data (e.g., between users and/or systems) can be communicated via, for example, a social network or another Internet-based communication method. The user may want to compare this present field to another in proximity to this field because these fields are most likely to be subject to the same weather and growing conditions. In some embodiments, the user may be limited to comparisons to fields that have specific characteristics, such as planting date, varieties, soil types, and farming practices, etc.

Figure 9:
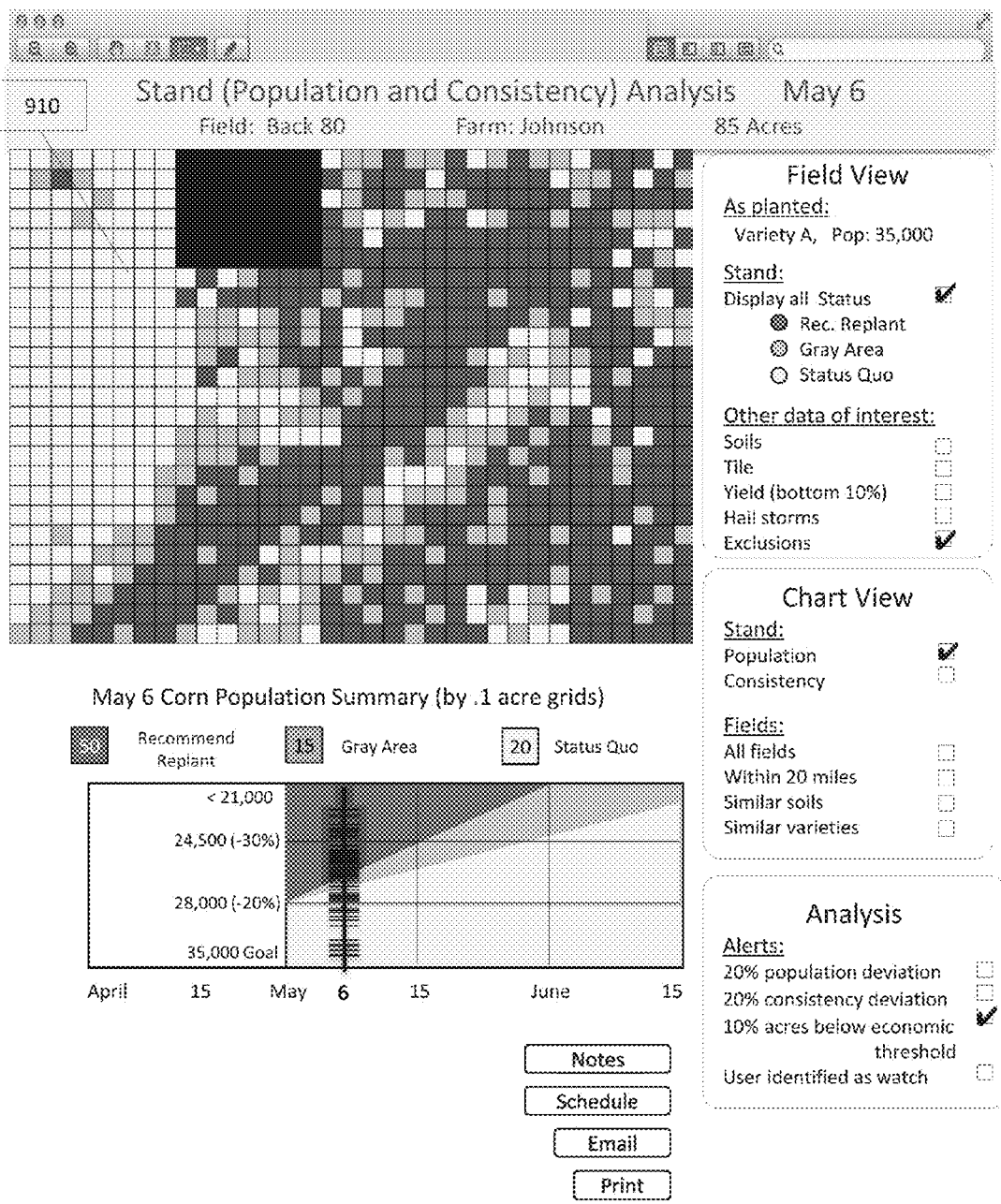
FIG. 9 illustrates an example screen shot including grids of a field.

FIG. 9 illustrates an example screen 900 further detailing the type of information determined and displayed by the Stand Analyzer and Alert Generator 110. In the example of FIG. 9, the content and controls are the same as those described with regard to FIG. 8 and its narrative description except that the grids into which the field is divided for the purpose of data gathering and analysis are displayed in this embodiment and are visually placed on the field map 910. The various sizes and number of grids can be due to the elevation at which the image was taken, or the user may have desired to gather greater detail of data on specific dates, or yet another reason for the various grid sizes may be that the user decided to obtain a data sample for only a portion of the field on a particular day. Also, the black square on the top of the field map indicates that the user has chosen to activate the exclusion layer data, and so this area is now excluded from the analysis. The colors of the various grid squares indicate their stand status, and with their placement on the actual field map 910, trends are easy to identify.

FIG. 10 illustrates example screen 1000 of an alert message that may be output in response to a determined stand deficiency. This example message alerts the user that a stand deficiency has been determined by the Stand Analyzer and Alert Generator 110 and in this embodiment the user is advised that he or she should continue monitoring yield potential and use this analysis as a predicting indicator in his or her crop marketing valuations. This alert, sent after aerial imagery gathered on June 15th, reflects that at this late point in the crop-growing season, there are no benefits to replanting stand deficient areas economically, and so monitoring the continued growth and yield potential, and using that information to accurately market his or her crop is the best course of action.

Figure 11:
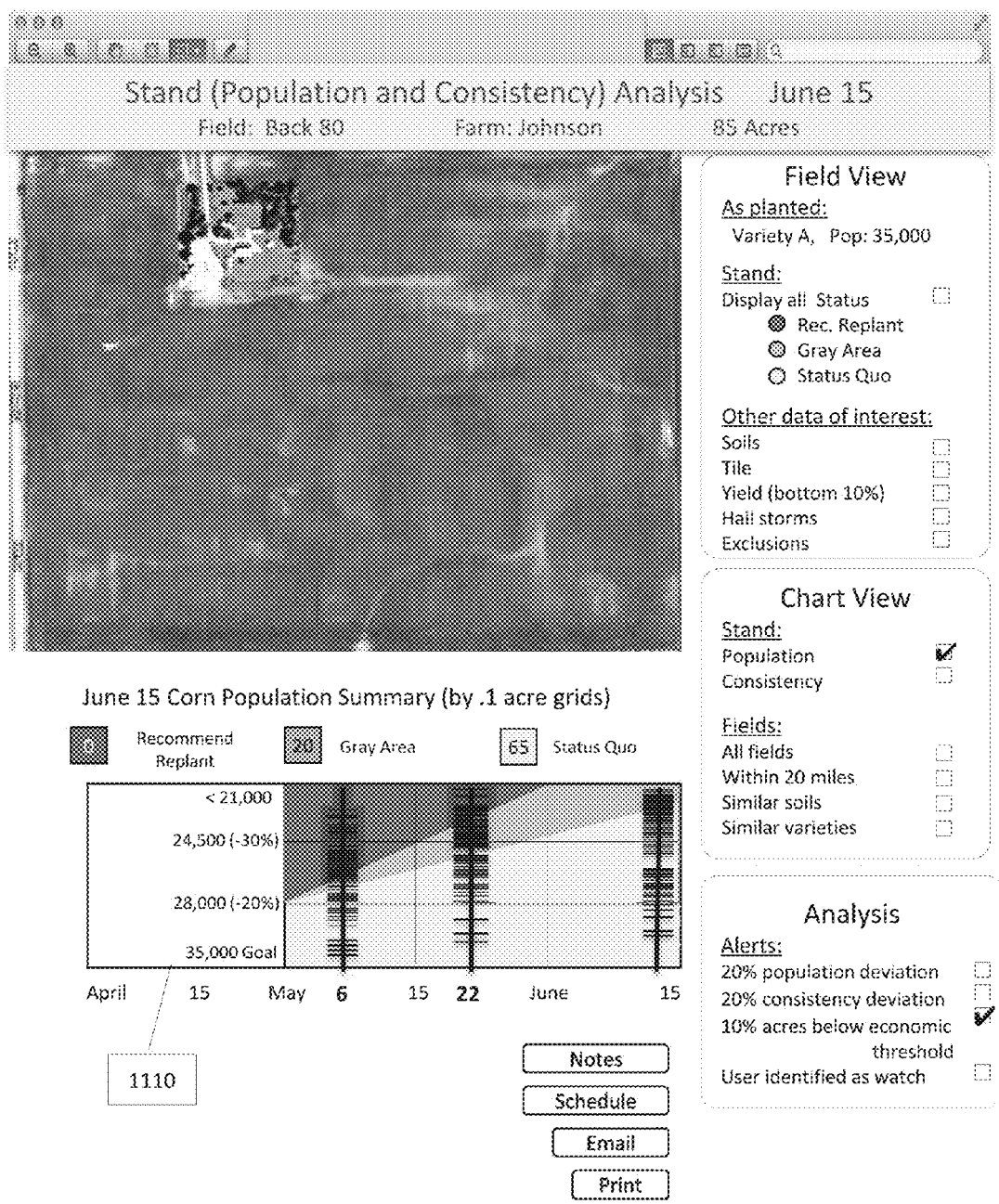
FIG. 11 illustrates an example screen shot subsequent to an alert generated with respect to a field.

FIG. 11 illustrates an example screen 1100 of a user interface that can be used to review information related to stand determination. In this embodiment, an alert has been triggered and the user has been notified of a potential problem on this field. In some examples, this information can be accessed regardless of whether or not an alert has been triggered. In certain examples, content and/or presentation of information on screen 1100 can vary depending on the role of the user and the manner in which it is viewed.

FIG. 11 provides a user with information regarding stand determination for a specific field along with additional information that may be helpful to the user. In FIG. 11, this is the third data gathering event for this particular field, as demonstrated by the graphical chart 1110. This chart indicates that as the growing season has progressed, more and more of the crop is at the status quo level.

Figure 12:
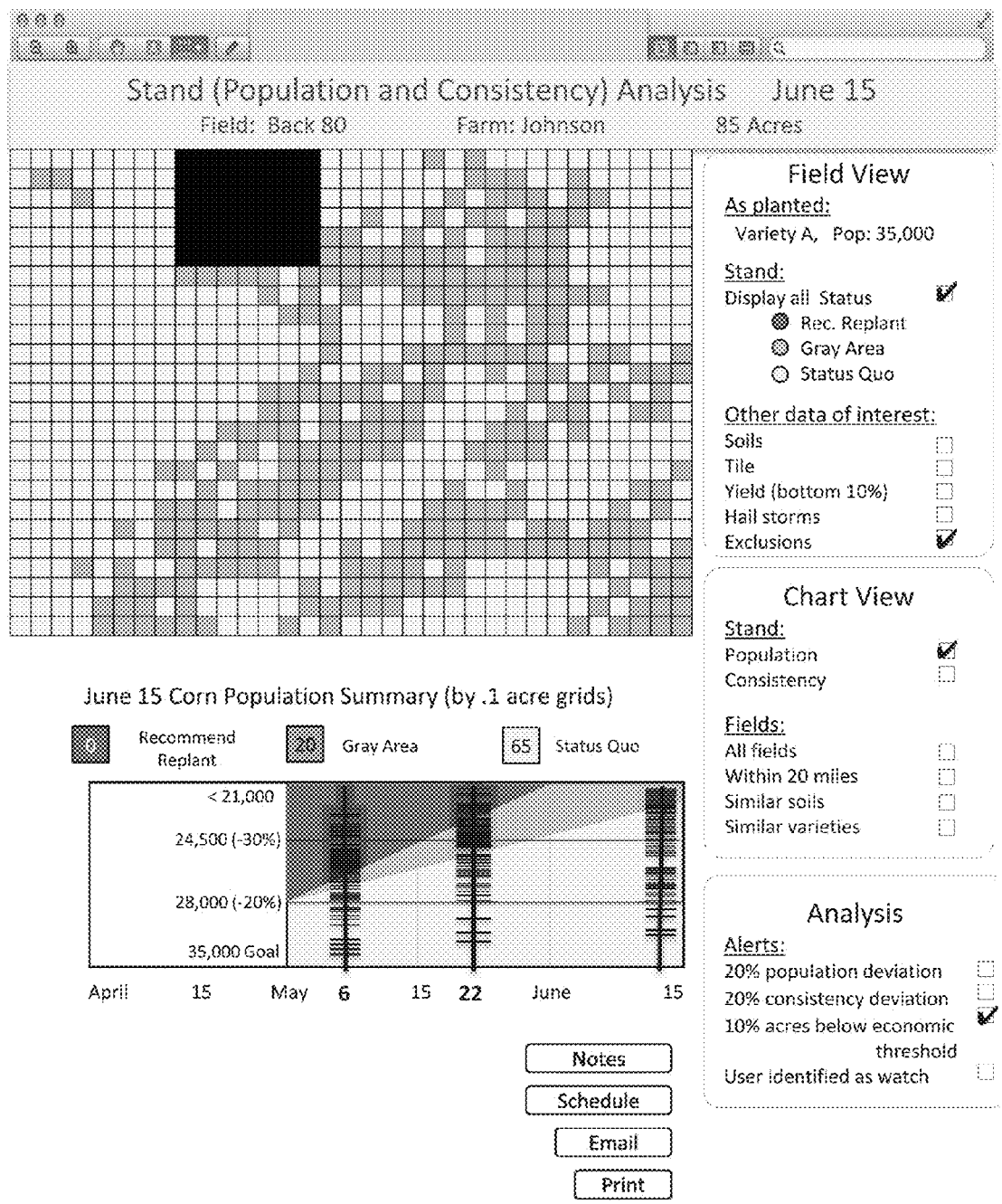
FIG. 12 illustrates an example screen shot including information generated by the stand analyzer and alert generator.

FIG. 12 illustrates an example screen 1200 further detailing the type of information that can be determined and displayed by Stand Analyzer and Alert Generator 110. In this example, the content and controls are the same as those described with regard to FIG. 11 and its narrative description except that the grids into which the field is divided for the purpose of data gathering and analysis is displayed in this embodiment and are visually placed on the field map.

FIG. 13 illustrates an example screen 1300 of an alert message that can be output in response to a severe weather event. This example message alerts the user that possible storm damage on four of the user's fields has been determined by the Stand Analyzer and Alert Generator 110. In this embodiment, the alert is issued on May 21 in response to the occurrence of large hail in the area. The user is recommended to scout the fields for injury and utilize aerial imagery to analyze the extent of the damage.

FIG. 14 illustrates an example screen 1400 of an alert message that can be output in response to an aerial imagery inspection. In this embodiment, the user used aerial imagery sensors to confirm field injury following the determination that severe weather may have affected the area the previous day (screen 1300). In this embodiment, four of the user's fields are determined to have been in the path of a hail storm, and so the user-requested analysis of these four fields to determine the damage to the crop. The alert message includes a table breaking down the determined stand deficiency for each of the four fields. In this embodiment, three of the four fields have sustained crop damage. The alert message includes a recommendation to contact the user's crop-insurance agent.

Figure 15:
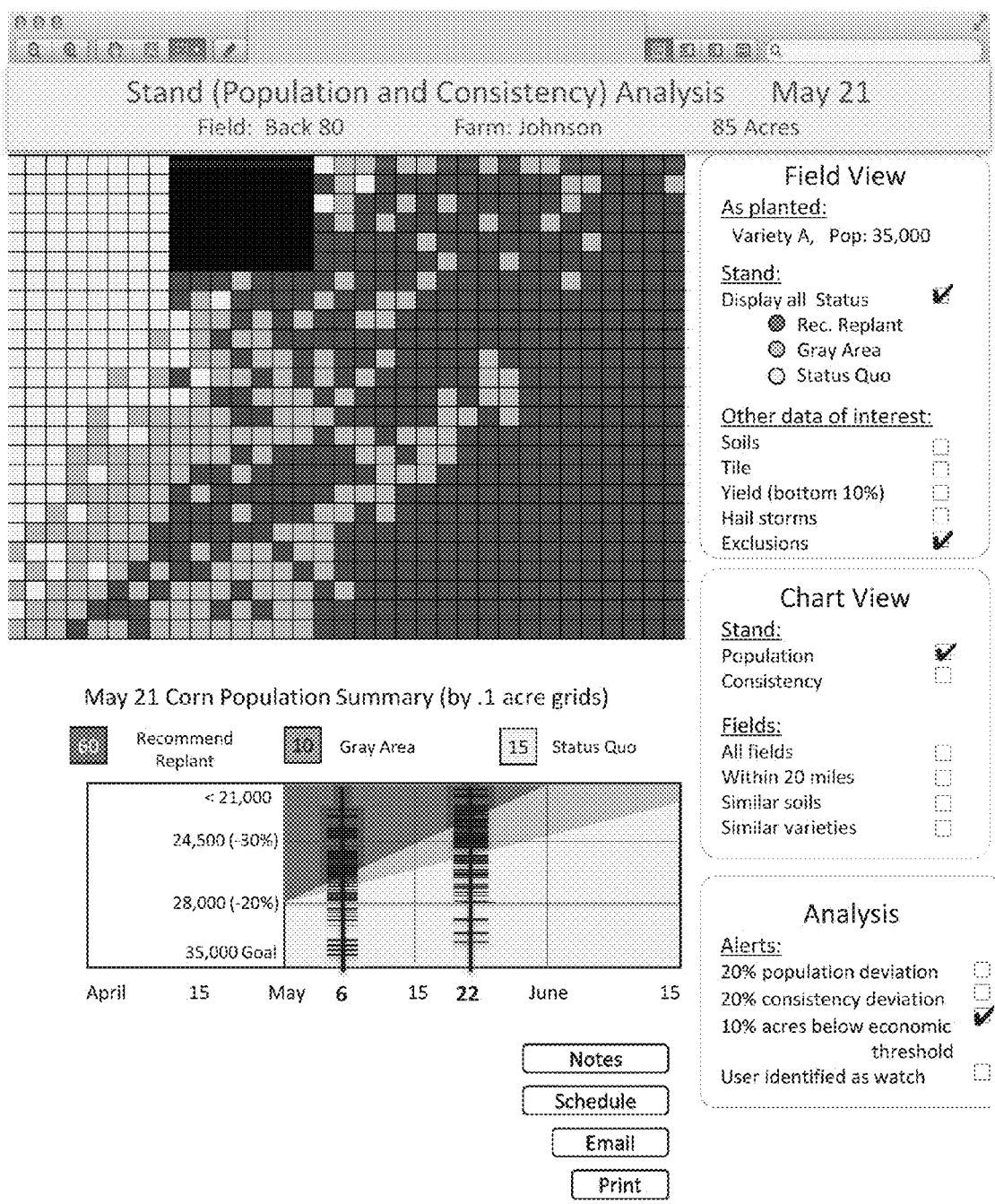
FIG. 15 illustrates an example user interface (UI) that can be used to review a stand determination based on aerial imagery following storm damage to a crop.

FIG. 15 illustrates an example screen 1500 of a user interface that can be used to review information related to stand determination. In this embodiment, the user sought aerial imagery in response to an alert of a determined hail storm (screen 1300). The aerial imagery of the four fields (screen 1400) determined a stand deficiency. Screen 1500 illustrates the user interface of one of the fields upon which hail damage has been determined. This screen is similar to screens 900 and 1200 in its form and the discussion of screen 900 applies to screen 1500 as well.

In some examples, Stand Analyzer and Alert Generator 110 can analyze a stand status of a crop with respect to various factors, such as environmental factors and/or operational practice factors. Environmental factors and operational practices to which a crop is exposed can vary considerably from field to field, and also within a field. An analysis that correlates such factors to a stand status of the crop can help identify issues and/or problems that may have negative impacts to the stand status, and ultimately to a yield (e.g., a number of bushels per acre) of the harvested crop. Examples of potentially impactful environmental factors and operational practices can include, but are not limited to, the air temperature and soil temperature from the time of planting through crop emergence, the type of seed treatment (if any) applied to seeds used to plant the crops, the presence and location of soil compaction (i.e., increased soil density) resulting from, e.g., a travel path of planter or other equipment over the field, the type of seeds in relation to the type of soil in which the seeds are planted, location and proximity of drain tile to one or more portions of the crops, and the presence and extent of residue (e.g., ground cover, such as debris from harvestings in prior years).

Early emergence quality of a crop can be categorized into groups corresponding to an expected yield of the crop. For instance, in some examples, such as with respect to corn plants, early emergence quality can be divided into boss, laggard, and runt categories. A boss category can correspond to a plant that satisfies threshold high-yield criteria (e.g., threshold size, expected yield, time of emergence criteria, or other such criteria). For instance, a plant that meets (or exceeds) a threshold size within a threshold time of emergence can be categorized as a boss plant. Such boss plants may typically be early-emerging plants that can be expected to produce high yields at a time of harvest. A laggard category can correspond to plants that satisfy threshold medium-yield criteria, such as plants with slightly delayed or deficient growth. A runt category can correspond to plants that satisfy threshold low-yield criteria, such as plants with very delayed or deficient growth. In some examples, those plants that satisfy neither high-yield criteria nor medium-yield criteria can be categorized as runts.

With early growth differentiation, it can be possible to extrapolate to an expected yield of a plant (e.g., in bushels per acre) at a time of harvest, such as by determining an expected average corn cob size and number of kernels. Such analysis can be useful to determine a stand status corresponding to expected yield of a crop, such as within a threshold time of emergence of the crop (e.g., an hour after emergence, a day after emergence, a week after emergence, or other threshold times). In addition, the stand status can be compared to one or more benchmark criteria, such as benchmark yield criteria determined e.g., based on industry-accepted values. In this way, Stand Analyzer and Alert Generator 110 can output an indication of a comparison of a determined stand status for a region of interest to benchmark criteria, thereby enabling a determination of an expected yield and/or lost yield of the crops.

As one example operation, Stand Analyzer and Alert Generator 110 can receive data for a region of interest that includes growing crops. For instance, the region of interest can include one or more fields and/or portions of fields of growing crops. Stand Analyzer and Alert Generator 110 can segregate data representative of the growing crops into a plurality of groups based on one or more parameters of a category of the received data. Example categories of received data can include image data (e.g., image data received from an image sensor carried by, for example, an aerial vehicle), seed treatment data, soil compaction data, seed type data, soil type data, drain tile data, ground surface residue data, planter equipment speed and/or performance data, or other types of data. Example parameters of the categories of data can include a type and/or existence of seed treatment, proximity of the crops to a path of a support structure (e.g., tires, tracks, etc.) of equipment used to plant and/or apply substances such as fertilizer to the crops, a type of seed associated with the crops, a type of soil associated with the crops, proximity of the crops to drain tile, an amount of ground surface residue associated with the crops, a speed of planter equipment used to plant the crops, or other parameters.

Stand Analyzer and Alert Generator 110 can segregate the data representative of the growing crops into a plurality of groups based on the one or more parameters of the category of data. As one example, Stand Analyzer and Alert Generator 110 can segregate data representative of the growing crops into a first group corresponding to a first seed treatment type and a second group corresponding to a second, different seed treatment type.

Stand Analyzer and Alert Generator 110 can determine a stand status for each of the plurality of groups. The stand status can include one or more of a population status, a consistency status (or, conversely, a variability status), and a quality status of the respective group. For example, Stand Analyzer and Alert Generator 110 can determine a plant population status for each group of a plurality of groups corresponding to seed treatment types. In some examples, the stand status can include an expected yield (e.g., in bushels per acre) of the crops within each group. Stand Analyzer and Alert Generator 110 can compare the stand status to at least one benchmark criterion, such as a benchmark yield criterion. The benchmark criterion can be determined, for example, based on one or more industry-accepted values (e.g., an industry-accepted yield per acre). Stand Analyzer and Alert Generator 110 can output an indication of the comparison, such as a report or other indication of a yield per acre for each group, a yield loss for each group as compared to benchmark criteria, or other indications. In this way, Stand Analyzer and Alert Generator 110 can analyze a stand status of growing crops within a region of interest with respect to one or more categories of received data, thereby helping to identify a contribution of any one or more impactful factors to the stand of the crop.

FIG. 16 illustrates an example report 1600 of a stand status analysis with respect to a seed treatment category of received data for a region of interest. Report 1600 can include seed treatment type parameters that identify a type of treatment applied to crops within the region of interest. That is, seed treatments (e.g., chemical treatments) such as antimicrobial treatments, fungicidal treatments, insecticidal treatments, or other treatments can be applied to seeds prior to planting to provide protection and/or enhanced germination and growth properties to the seeds. As illustrated in FIG. 16, report 1600 can include untreated parameter 1602 and treatment type X parameter 1604. Seed treatment type X parameter 1604 can correspond to a particular type of seed treatment (i.e., any type of treatment, denoted by the X). Untreated parameter 1602 can correspond to those seeds to which no seed treatment was applied. That is, in some examples, the non-existence of a treatment applied to a seed can be considered a parameter of seed treatment type (e.g., a seed treatment type "none").

Stand Analyzer and Alert Generator 110 can segregate data representative of the growing crops into groups based on the one or more parameters of the category of received data. For example, as in FIG. 16, Stand Analyzer and Alert Generator 110 can segregate data representative of the growing crops into untreated group 1606 and treatment X group 1608. In the example of FIG. 16, eighty acres of a field (e.g., a region of interest) has received no seed treatment (corresponding to parameter untreated parameter 1602), and another eighty acres of the field has received seed treatment type X (corresponding to parameter treatment type X parameter 1604). In this way, parameters 1602 and 1604 can be considered grouping criteria.

Stand Analyzer and Alert Generator 110 can determine a stand status for each for the plurality of groups. The stand status can include any one or more of a population status, a consistency (or variability status), and a quality status of the crops. For example, as in FIG. 16, Stand Analyzer and Alert Generator 110 can determine population status 1610 and variability status 1612 for each of groups 1606 and 1608.

Population status 1610 can identify a number of plants included in the respective group. For instance, Stand Analyzer and Alert Generator 110 can receive data for the region of interest that includes image data, such as image data from an image sensor carried by an aerial vehicle (e.g., a UAV). Stand Analyzer and Alert Generator 110 can determine, such as via computer vision techniques, a number of plants included in the region of interest. In some examples, Stand Analyzer and Alert Generator 110 can assign a unique identifier to each of the identified plants, such as by assigning integers of increasing values to the individual plants as the individual plants are identified. Accordingly, Stand Analyzer and Alert Generator 110 can segregate the unique plant identifiers (i.e., data representative of the plants, in this example) into groups, such as groups 1606 and 1608. In this way, groups 1606 and 1608 can be considered crop sets that include crops categorized based on parameters 1602 and 1604.

Population status 1610 can include an indication of a total number of plants included in each of groups 1606 and 1608. In addition, as illustrated, population status 1610 can include an estimated number of plants lost in each of groups 1606 and 1608. For instance, Stand Analyzer and Alert Generator 110 can compare the total number of plants included in each of groups 1606 and 1608 to benchmark (or reference) criteria, such as benchmark plant populations per acre of the crops. As one example, an industry-accepted benchmark plant population per acre of corn can be 33,000 plants per acre. Stand Analyzer and Alert Generator 110 can compare the total number of plants within the group to the benchmark criteria to determine the number of plants lost (as compared to the benchmark) within the respective group.

As illustrated, population status 1610 can include an indication of a number of plants lost in gaps (e.g., row gaps) greater than (or equal to) 4.35 feet (1.33 meters). For instance, Stand Analyzer and Alert Generator 110 can determine a number and/or total amount of gaps (i.e., spaces within rows of a field where no plants have emerged) that are greater than 4.35 feet (corresponding to one-ten-thousandth of an acre). Accordingly, Stand Analyzer and Alert Generator 110 can determine, based on the benchmark plant population criteria, a number of lost plants within the gaps.

In some examples, such as the example of FIG. 16, population status 1610 can include an indication of an expected lost yield of plants for each respective group. For instance, Stand Analyzer and Alert Generator 110 can determine an expected (or anticipated) yield of the crops within each respective group. Stand Analyzer and Alert Generator 110 can determine the expected yield, such as by multiplying a total number of plants included within the respective group by a benchmark yield per plant. Stand Analyzer and Alert Generator 110 can multiply the estimated number of lost plants within a respective one of untreated group 1606 and treatment X group 1608 by the benchmark yield per plant to determine an estimated yield loss for the group. As illustrated, Stand Analyzer and Alert Generator 110 can divide the estimated lost yield for the group by the number of acres of crops included in the group to determine an anticipated yield loss per acre for the respective group. As illustrated in the example of FIG. 16, Stand Analyzer and Alert Generator 110 can determine an estimated yield loss due to lost plant population (as compared to the benchmark criteria) for untreated group 1606 as fifteen bushels per acre. Stand Analyzer and Alert Generator 110 can determine an estimated yield loss due to lost plant population (as compared to the benchmark criteria) for treatment X group 1608 as ten bushels per acre.

As in the example of FIG. 16, the determined stand status can include variability status 1612. Variability status 1612 can include an indication of a total estimated yield (e.g., in bushels per acre) for each respective group (e.g., untreated group 1606 and treatment X group 1608, respectively). For instance, as illustrated in FIG. 16, variability status 1612 can include an indication of an estimated yield corresponding to untreated group 1606 as 201 bushels per acre. Variability status 1612 can include an indication of an estimated yield corresponding to treatment X group 1608 as 238 bushels per acre.

Stand Analyzer and Alert Generator 110 can determine the estimated yield for each respective group based on a grade of plants associated with each group. For instance, Stand Analyzer and Alert Generator 110 can assign each plant within a group to one of a boss grade, a laggard grade, and a runt grade. As discussed above, a boss grade can correspond to a plant satisfying high-yield criteria, such as a plant that is greater than (or equal to) a threshold size. A boss grade may typically correspond to early-emerging plants that exhibit strong growth characteristics and may be expected to produce high yields at a time of harvest. A laggard grade can correspond to a plant that does not satisfy the high-yield criteria, but that satisfies separate medium-yield criteria, such as a threshold size that is less than a threshold size corresponding to the high-yield criteria. For instance, Stand Analyzer and Alert Generator 110 can compare a size of a plant to the high-yield size threshold. When Stand Analyzer and Alert Generator 110 determines that the size of the plant is greater than (or equal to) the high-yield size threshold size, Stand Analyzer and Alert Generator 110 can categorize the plant as a boss grade plant. When Stand Analyzer and Alert Generator 110 determines that the size of the plant is less than (or equal to) the high-yield size threshold, Stand Analyzer an Alert Generator 110 can compare the size of the plant to a medium-yield size threshold. When Stand Analyzer and Alert Generator 110 determines that the size of the plant is greater than the medium-yield size threshold, Stand Analyzer and Alert Generator 110 can categorize the plant as a laggard grade plant. When Stand Analyzer and Alert Generator 110 determines that the size of the plant is less than the medium-yield size threshold, Stand Analyzer and Alert Generator 110 can categorize the plant as a runt grade plant.

Stand Analyzer and Alert Generator 110 can determine an estimated size of a plant, such as from image data received for the region of interest. For example, the received data for the region of interest can include image data retrieved from an image sensor. For instance, the image sensor can be an overhead image sensor, such as an image sensor mounted on a ceiling or overhead equipment of a greenhouse, an image sensor carried by an aerial vehicle such as a UAV, satellite, or other aerial vehicle, or other such image sensor. Stand Analyzer and Alert Generator 110 can identify a number of pixels of the image associated with each individual plant to determine an estimated size of the plant. An increased number of pixels of the image associated with the plant can correspond to an increased size of a plant. Similarly, a decreased number of pixels of the image associated with the plant can correspond to a decreased size of a plant. As such, Stand Analyzer and Alert Generator 110 can determine an estimated size of each plant within the region of interest and/or respective group, thereby facilitating further analysis and categorization of the crops within the region of interest.

Variability status 1612 can include an indication of a number of plants assigned to each plant grade. For instance, as illustrated in FIG. 16, variability status 1612 can include an indication of a percentage of a number of plants included in each of groups 1606 and 1608 that are assigned to each of the boss grade, the laggard grade, and the runt grade. In addition, variability status 1612 can include an indication of an estimated yield of each grade of plant for each respective one of untreated group 1606 and treatment X group 1608. For example, Stand Analyzer and Alert Generator 110 can multiply a number of plants within the respective group that are assigned to a particular grade by a benchmark yield (e.g., an industry-accepted reference yield) corresponding to plants of that grade to determine a total estimated yield for plants assigned to the grade. For instance, in the example of FIG. 16, Stand Analyzer and Alert Generator 110 can multiply a number of plants assigned to the boss grade of untreated group 1606 by a benchmark yield per plant for boss-grade plants to determine a total estimated yield of the boss-grade plants within untreated group 1606 (e.g., 113 bushels per acre in this example). Stand Analyzer and Alert Generator 110 can multiply the number of plants assigned to each of the grades by corresponding benchmark yield criteria for plants of that grade to determine the estimated yield for each grade within a group. In some examples, Stand Analyzer and Alert Generator 110 can determine a total estimated yield for each of untreated group 1606 and treatment X group 1608 by aggregating the respective estimated yields for each grade. For instance, Stand Analyzer and Alert Generator 110 can aggregate (e.g., sum) the estimated yield of boss plants within treatment X group 1608 (e.g., 167 bushels per acre), the estimated yield of laggard plants within treatment X group 1608 (e.g., 68 bushels per acre), and the estimated yield of runt plants within treatment X group 1608 (e.g., 3 bushels per acre) to determine a total estimated yield for treatment X group 1608 (e.g., 238 bushels per acre).

As illustrated in FIG. 16, report 1600 can include lost yield status 1614. Lost yield status 1614 can include an indication of an anticipated total lost yield for each of untreated group 1606 and treatment X group 1608. For instance, in the illustrated example, lost yield status 1614 includes an indication of 5,920 bushels of anticipated lost yield associated with untreated group 1606, and an indication of 2,560 bushels of anticipated lost yield associated with treatment X group 1608. In addition, lost yield status 1614 can include an indication of an anticipated total lost yield for each of groups 1606 and 1608 associated with population status 1610 and variability status 1612. For instance, in the example of FIG. 16, lost yield status 1614 includes an indication of 1,200 bushels of anticipated lost yield associated with population status 1610 for untreated group 1606, and an indication of 4,720 bushels of anticipated lost yield associated with variability status 1612 for untreated group 1606. Similarly, lost yield status 1614 includes an indication of 800 bushels of anticipated lost yield associated with population status 1610 for treatment X group 1608, and an indication of 1,760 bushels of anticipated lost yield associated with variability status 1612 for treatment X group 1608.

Stand Analyzer and Alert Generator 110 can determine the anticipated lost yield (e.g., the total anticipated lost yield, the anticipated lost yield associated with plant population status 1610, and the anticipated lost yield associated with variability status 1612) by comparing the estimated yield for each group with one or more benchmark criteria. For example, Stand Analyzer and Alert Generator 110 can determine a total estimated lost yield for the group by aggregating (e.g., summing) the anticipated lost yield associated with each of population status 1610 and variability status 1612. Stand Analyzer and Alert Generator 110 can compare the total estimated yield for each group (e.g., an estimated yield in bushels per acre multiplied by a number of acres in the group) with a benchmark yield criterion. Stand Analyzer and Alert Generator 110 can subtract the total estimated yield for each of groups 1606 and 1608 from the benchmark yield criterion to determine an anticipated total yield loss associated with the respective group.

Stand Analyzer and Alert Generator 110 can determine the estimated lost yield associated with each of plant population status 1610 and variability status 1612 by multiplying the anticipated lost yield associated with plant population status 1610 and variability status 1612 for the group by the number of acres included in the group. For instance, Stand Analyzer and Alert Generator 110 can multiply the anticipated yield loss of 15 bushels per acre associated with plant population status 1610 by the eighty acres of crops included in untreated group 1606 to derive an anticipated yield loss of 1,200 bushels associated with plant population status 1610 for untreated group 1606. Stand Analyzer and Alert Generator 110 can determine an anticipated lost yield associated with plant variability status 1612 for untreated group 1606 by comparing the anticipated yield associated with untreated group 1606 (e.g., 201 bushels per acre in this example) to a benchmark yield criteria, such as 260 bushels per acre (e.g., an industry-accepted value). Accordingly, Stand Analyzer and Alert Generator 110 can multiply the estimated lost yield associated with plant variability status 1612 for untreated group 1606 (e.g., 59 bushels per acre corresponding to an estimated yield of 201 bushels per acre subtracted from a benchmark yield of 260 bushels per acre) by the number of acres in untreated group 1606 (e.g., eighty acres) to determine an anticipated lost yield associated with plant variability status 1612 for untreated group 1606 (e.g., 4,720 in this example). Stand Analyzer and Alert Generator 110 can perform similar comparisons and analyses with respect to treatment X group 1608 to determine estimated crop loss values corresponding to treatment X group 1608.

As illustrated in FIG. 16, report 1600 can further include total lost yield status 1616. Total lost yield status 1616 can include an indication of a total anticipated lost yield for the region of interest, such as total anticipated lost yield 1618. Stand Analyzer and Alert Generator 110 can determine a value of total anticipated lost yield 1618, such as by aggregating (e.g., summing) the anticipated lost yield for each of the groups. For instance, as in the example of FIG. 16, Stand Analyzer and Alert Generator 110 can sum the anticipated lost yield for untreated group 1606 (e.g., 5,920 bushels in this example) and the anticipated lost yield for treatment X group 1608 (e.g., 2,560 bushels in this example) to arrive at a value for total anticipated lost yield 1618 (e.g., 8,480 bushels in this example). Total lost yield status 1616 can further include an indication of total expected economic loss 1620 corresponding to the value of total anticipated lost yield 1618. For instance, Stand Analyzer and Alert Generator 110 can multiply total estimated yield 1618 by a benchmark economic yield criterion (e.g., five dollars per bushel in this example) to arrive at a total expected economic loss 1620 (e.g., 42,400 dollars in this example).

In this way, Stand Analyzer and Alert Generator 110 can analyze data received for a region of interest to determine a crop stand status corresponding to a seed treatment category of the data. While illustrated with respect to two parameters 1602 and 1604 and corresponding groups 1606 and 1608, it should be understood that report 1600 and the associated analysis can include any number of parameters and groups, such as three groups, four groups, five groups, or more groups. Similarly, while the illustrated example is described with respect to three grades of plants (i.e., boss, laggard, and runt), in other examples Stand Analyzer and Alert Generator 110 can categorize plants included in the respective groups according to greater or fewer than three grades.

Figure 17:
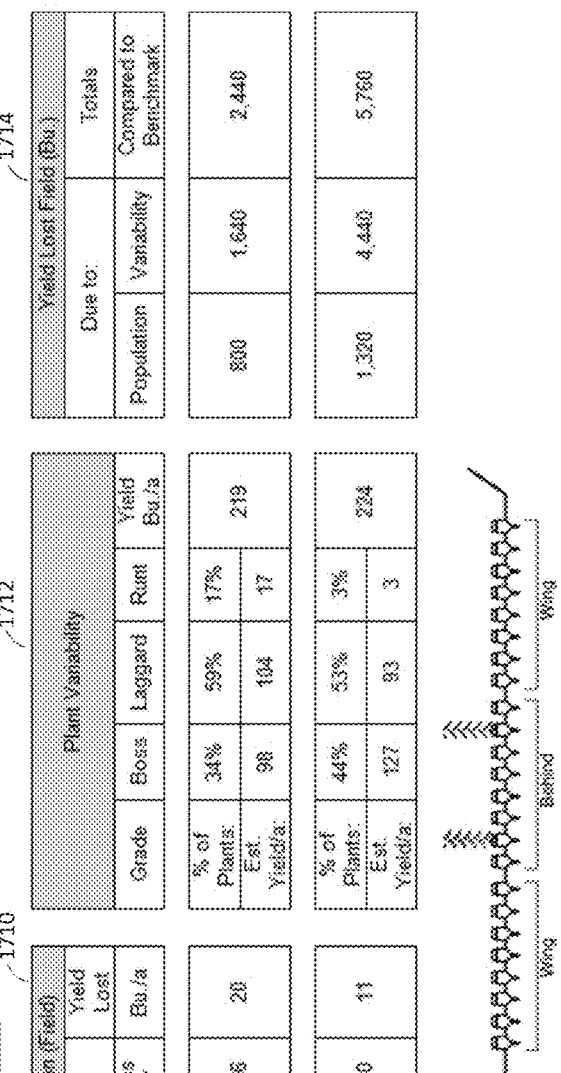
FIG. 17 illustrates an example report of a stand status analysis with respect to a soil compaction treatment category of received data for a region of interest.

FIG. 17 illustrates an example report 1700 of a stand status analysis with respect to a soil compaction treatment category of received data for a region of interest. As illustrated in FIG. 17, report 1700 can include soil compaction parameters 1702 and 1704. Soil compaction parameters 1702 and 1704, in this example, can indicate proximity of the crops to a path of a support structure (e.g., tires, tracks, and the like) of equipment used to plant and/or apply fertilizer to the crops. That is, as equipment moves over the field, wheels or other support structures of the equipment can compact the soil under the support structure, thereby increasing density of the surface soil beneath the path of the structure. Seeds planted within the compacted soil can emerge at different rates than those planted within non-compacted soil, thereby resulting in variability in the stand status across the field. For instance, the compacted soil can absorb water or other nutrients (e.g., fertilizer) at slower rates than non-compacted soil, thereby possibly decreasing growth potential of plants within the compacted regions. Planters, sprayers, or other equipment can have several regions, such as a center region and outer wing regions. The center region is typically proximate the support structure, while the outer wings may be unsupported. Accordingly, plants that are proximate a path of the center region of the equipment (e.g., proximate the support structure) may be located within compacted soil, while plants that are proximate a path of an outer wing region of the equipment (e.g., less proximate the support structure) may be located within less dense, non-compacted soil.

In the example of FIG. 17, parameter 1702 can correspond to plants that are proximate a path of a support structure of a planter, sprayer, or other equipment that has traveled over the region of interest. Parameter 1704 can correspond to plants that are less proximate to the path of the support structure (e.g., those plants proximate a path of an unsupported portion of the equipment, such as an outer wing of the equipment).

Stand Analyzer and Alert Generator 110 can segregate data representative of the growing crops into groups based on the one or more parameters of the category of received data. For example, as in FIG. 17, Stand Analyzer and Alert Generator 110 can segregate data representative of the growing crops into groups 1706 and 1708. In the example of FIG. 17, forty acres of a field (e.g., a region of interest) is proximate a path of a center region (e.g., a support structure) of a planter, and 120 acres of the field is proximate a path of an outer wing (e.g., a non-supported region) of the planter.

Stand Analyzer and Alert Generator 110 can determine a stand status for each for the plurality of groups. As illustrated, the stand status determined by Stand Analyzer and Alert Generator 110 can include population status 1710 and variability status 1712. As described above with respect to FIG. 16, population status 1710 can include indications of one or more of a total number of plants within each group, an estimated number of plants lost within each group, an estimated number of plants lost within gaps of greater than (or equal to) 4.35 feet, and an estimated yield loss (e.g., in bushels per acre) for the respective group. Each of the estimations included in population status 1710 can be determined based on a comparison with one or more benchmark criteria, such as benchmark population criteria and benchmark yield criteria.

Variability status 1712 can include an indication of a total estimated yield of crops within each respective group. As described above, Stand Analyzer and Alert Generator 110 can assign plants within each group to one of a plurality of grades, such as one of a boss grade, a laggard grade, and a runt grade. The total estimated yields can be based on comparisons of the number of plants within each grade to benchmark yield criteria associated with the grade of plant.

Report 1700 can further include lost yield status 1714. As was similarly described above, lost yield status 1714 can include indications of a total estimated lost yield for a group, as well as estimated lost yields associated with each of population status 1710 and variability status 1712 for the respective group.

As illustrated in FIG. 17, report 1700 can further include total lost yield status 1716. Total lost yield status 1716 can include an indication of a total anticipated lost yield for the region of interest, such as total anticipated lost yield 1718. Stand Analyzer and Alert Generator 110 can determine a value of total anticipated lost yield 1718, such as by aggregating (e.g., summing) the anticipated lost yield for each of the groups. For instance, Stand Analyzer and Alert Generator 110 can sum the anticipated lost yield for group 1706 and the anticipated lost yield for group 1708 to arrive at a value for total anticipated lost yield 1718. Total lost yield status 1716 can further include an indication of total expected economic loss 1720 corresponding to the product of total anticipated lost yield 1718 and a benchmark economic yield criterion.

FIG. 18 illustrates an example report 1800 of a stand status analysis with respect to a combination of a seed type category and a soil type category of received data for the region of interest. As illustrated in FIG. 18, report 1800 can include soil type parameters 1802, 1804, and 1806. In addition, report 1800 can include seed type parameters 1808A-1808C (collectively referred to herein as "seed type parameters 1808") and 1810A-1810C (collectively referred to herein as "seed type parameters 1810").

Soil type parameters 1802, 1804, and 1806 can correspond to different types of soil associated with portions of the crops. For instance, a first portion of the crops can be planted in a soil type corresponding to parameter 1802 (e.g., clay), a second portion of the crops can be planted in a soil type corresponding to parameter 1804 (e.g., clay loam), and a third portion of the crops can be planted in a soil type corresponding to parameter 1806 (e.g., silt loam). The type of soil in which a plant is growing can affect the growth parameters of the plant. For instance, certain types of soil can absorb and hold moisture and nutrients more readily than other types, thereby creating growth differentials for any particular plant between types of soil in which the plant grows. In addition, various seed types can be available for a given crop (e.g., corn, soy beans, or other cultivated plants). Each of the varying seed types can have differing seed genetics, thereby providing different growth profiles for each type of seed. The differing seed types can germinate and/or grow at various rates in differing types of soil. Accordingly, Stand Analyzer and Alert Generator 110 can output report 1800 including an analysis of a combination of a seed type category of the received data and a soil type category of the received data.

In the example of FIG. 18, each of seed type parameters 1808 can correspond to a first type of seed (e.g., indicated as Seed A in this example). Similarly, each of seed type parameters 1810 can correspond to a second, different type of seed (e.g., indicated as Seed B in this example).

Stand Analyzer and Alert Generator 110 can segregate data representative of the growing crops into groups based on the one or more parameters of the categories of received data. For example, as in FIG. 18, Stand Analyzer and Alert Generator 110 can segregate data representative of the growing crops into groups 1812, 1814, 1816, 1818, 1820, and 1822. That is, group 1812 can correspond to those crops associated with both soil type parameter 1802 (e.g., clay) and seed type parameter 1808A (e.g., Seed A). Group 1814 can correspond to those crops associated with both soil type parameter 1802 (e.g., clay) and seed type parameter 1810A (e.g., Seed B). Group 1816 can correspond to those crops associated with both soil type parameter 1804 (e.g., clay loam) and seed type parameter 1808B (e.g., seed A). Group 1818 can correspond to those crops associated with both soil type parameter 1804 (e.g., clay loam) and seed type parameter 1810B (e.g., seed B). Group 1820 can correspond to those crops associated with both soil type 1806 (e.g., silt loam) and seed type parameter 1808C (e.g., seed A). Group 1822 can correspond to those crops associated with both soil type 1806 (e.g., silt loam) and seed type parameter 1810C (e.g., seed B). In this way, Stand Analyzer and Alert Generator 110 can segregate (e.g., group) data representative of the crops within a region of interest (e.g., one or more fields and/or portions of fields) into a plurality of groups based on parameters of a plurality of categories of the received data. While illustrated in the example of FIG. 18 as segregating the data representative of the crops into groups based on parameters of two categories of data, in other examples, Stand Analyzer and Alert Generator 110 can segregate the data into a plurality of groups based on parameters of more than two categories of data, such as three or more categories of data.

Stand Analyzer and Alert Generator 110 can determine a stand status for each for the plurality of groups. As discussed above, the stand status can include any one or more of a population status, a consistency (or variability status), and a quality status of the crops. For example, in the example of FIG. 18, Stand Analyzer and Alert Generator 110 can determine population status 1824 and variability status 1626 for each of groups 1812, 1814, 1816, 1818, 1820, and 1822.

Population status 1824 can include representations of a total number of plants in a respective group, an estimated number of lost plants in a respective group, an estimated number of plants lost in gaps greater than 4.35 feet in a respective group, an estimated lost yield in a respective group, or other population status indicators. As described above, Stand Analyzer and Alert Generator 110 can determine a total number of plants in a respective group by determining a total number of plants in the region of interest (e.g., via computer vision techniques) and categorizing each plant according to the parameters of the categories of data (e.g., parameters 1802-1810). Stand Analyzer and Alert Generator 110 can determine an anticipated yield and/or yield loss by comparing the number of plants within each group to one or more benchmark (e.g., reference) criteria, such as benchmark yield criteria and/or benchmark population criteria.

Variability status 1826, as described above, can include an indication of a number of plants within each group (e.g., a portion of the crops within each group) associated with one of a plurality of grades of plant (e.g., boss, laggard, and runt grades). Stand Analyzer and Alert Generator 110 can determine an estimated yield of the crops within each group, such as by multiplying a number of plants in each grade of the group by a corresponding benchmark yield value associated with the grade.

Report 1800 can further include lost yield status 1828. As was similarly described above, lost yield status 1828 can include an indication of a total estimated lost yield for each group, an estimated lost yield associated with population status 1824, and an estimated lost yield associated with variability status 1826. Stand Analyzer and Alert Generator 110 can determine the estimated lost yield associated with population status 1824 for each group by multiplying the anticipated lost yield associated with population status 1824 for the group by the number of acres of crops included in the group. Stand Analyzer and Alert Generator 110 can determine an estimated lost yield associated with variability status 1826, such as by comparing the estimated yield (e.g., in bushels per acre) associated with variability status 1826 for the group with a benchmark yield criteria and multiplying the estimated yield loss (e.g., in bushels per acre) by the number of acres included in the respective group. Stand Analyzer and Alert Generator 110 can determine the total estimated lost yield for a group, such as by aggregating the estimated yield loss associated with population status 1824 and the estimated yield loss associated with variability status 1826 for the respective group.

As illustrated in FIG. 18, report 1800 can further include total lost yield status 1830. Total lost yield status 1830 can include an indication of a total anticipated lost yield for the region of interest, such as total anticipated lost yield 1832. Stand Analyzer and Alert Generator 110 can determine a value of total anticipated lost yield 1832, such as by aggregating (e.g., summing) the anticipated lost yield for each of the groups. For instance, Stand Analyzer and Alert Generator 110 can sum the anticipated lost yield for each of groups 1812, 1814, 1816, 1818, 1820, and 1822 to arrive at a value for total anticipated lost yield 1832. Total lost yield status 1830 can further include an indication of total expected economic loss 1834 corresponding to the product of total anticipated lost yield 1832 and a benchmark economic yield criterion.

FIG. 19 illustrates an example report 1900 of a stand status analysis with respect to a drain tile category of received data for a region of interest. As illustrated in FIG. 19, report 1900 can include drain tile parameters 1902, 1904, and 1906. Drain tile parameters 1902, 1904, and 1906 can indicate proximity of the crops to drain tile. Drain tile can be used to allow remove excess water from the soil subsurface. Excess water can inhibit crop growth, such as by inhibiting proper root development, encouraging fungal or other crop diseases, and the like. Accordingly, proximity of plants to drain tile can affect growth characteristics of the plants, thereby leading to possible growth differentiation within a field.

In the example of FIG. 19, parameter 1902 can correspond to plants that are located within ten feet of drain tile. Parameter 1904 can correspond to plants that are located between ten and thirty feet of drain tile. Parameter 1906 can correspond to plants that are located more than thirty feet from drain tile.

Stand Analyzer and Alert Generator 110 can segregate data representative of the growing crops into groups based on the one or more parameters of the category of received data. For example, as in FIG. 19, Stand Analyzer and Alert Generator 110 can segregate data representative of the growing crops into groups 1908, 1910, and 1912. In the example of FIG. 19, thirty-two acres of crops are located within ten feet of drain tile, forty-five acres of crops are located within thirty feet of drain tile, and eighty-three acres of crops are located over thirty feet from drain tile.

Stand Analyzer and Alert Generator 110 can determine a stand status for each for the plurality of groups. As illustrated, the stand status determined by Stand Analyzer and Alert Generator 110 can include population status 1914 and variability status 1716. As was similarly described above, population status 1914 can include indications of one or more of a total number of plants within each group, an estimated number of plant loss within each group, an estimated number of plants lost within gaps of greater than (or equal to) 4.35 feet, and an estimated yield loss (e.g., in bushels per acre) for the respective group. Each of the estimations included in population status 1914 can be determined based on a comparison with one or more benchmark criteria, such as benchmark population criteria and benchmark yield criteria.

Variability status 1916 can include an indication of a total estimated yield of crops within each respective group. As described above, Stand Analyzer and Alert Generator 110 can assign plants within each group to one of a plurality of grades, such as one of a boss grade, a laggard grade, and a runt grade. The total estimated yields can be based on comparisons of the number of plants within each grade to benchmark yield criteria associated with the grade of plant.

Report 1900 can further include lost yield status 1918. As was similarly described above, lost yield status 1918 can include indications of a total estimated lost yield for a group, as well as estimated lost yields associated with each of population status 1914 and variability status 1916 for the respective group. For instance, Stand Analyzer and Alert Generator 110 can determine the estimated lost yield associated with population status 1914 for each group by multiplying the anticipated lost yield associated with population status 1914 for the group by the number of acres of crops included in the group. Stand Analyzer and Alert Generator 110 can determine an estimated lost yield associated with variability status 1916, such as by comparing the estimated yield (e.g., in bushels per acre) associated with variability status 1916 for the group with a benchmark yield criteria and multiplying the estimated yield loss (e.g., in bushels per acre) by the number of acres included in the respective group. Stand Analyzer and Alert Generator 110 can determine the total estimated lost yield for a group, such as by aggregating the estimated yield loss associated with population status 1914 and the estimated yield loss associated with variability status 1916 for the respective group.

Report 1900 can further include total lost yield status 1920. Total lost yield status 1920 can include an indication of a total anticipated lost yield for the region of interest, such as total anticipated lost yield 1922. Stand Analyzer and Alert Generator 110 can determine a value of total anticipated lost yield 1922, such as by aggregating (e.g., summing) the anticipated lost yield for each of the groups. For instance, Stand Analyzer and Alert Generator 110 can sum the anticipated lost yield for each of groups 1908, 1910, and 1912 to arrive at a value for total anticipated lost yield 1922. Total lost yield status 1920 can further include an indication of total expected economic loss 1924 corresponding to the product of total anticipated lost yield 1922 and a benchmark economic yield criterion.

Figure 20:
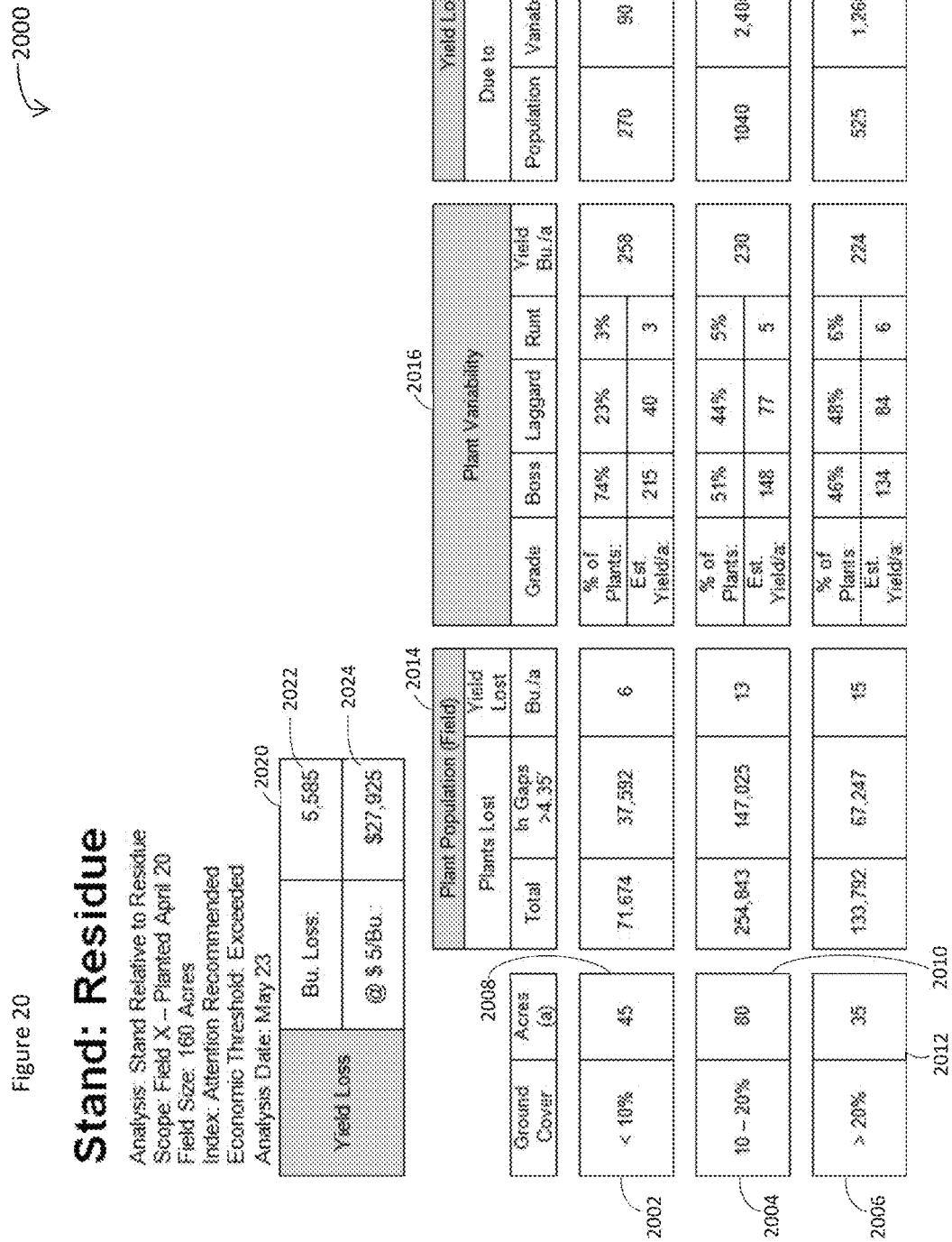
FIG. 20 illustrates an example report of a stand status analysis with respect to a ground surface residue category of received data for a region of interest.

FIG. 20 illustrates an example report 2000 of a stand status analysis with respect to a ground surface residue category of received data for a region of interest. As illustrated in FIG. 20, report 2000 can include surface residue parameters 2002, 2004, and 2006. Surface residue parameters 2002, 2004, and 2006 can indicate an amount of ground surface residue associated with the crops. Ground surface residue, often referred to as ground cover, can result from debris or other material covering the ground surface. For instance plant debris from prior plantings can result in ground cover that can be variable across a field. Such ground cover can inhibit plant growth by depriving the soil beneath the residue (and emerging plants) from sunlight or other nutrients (e.g., fertilizer). Accordingly, those plants associated with a greater amount of ground cover can exhibit inhibited growth characteristics as compared to plants associated with lesser amounts of ground cover.

In the example of FIG. 20, parameter 2002 can correspond to plants that are associated with less than ten percent ground surface residue. Parameter 2004 can correspond to plants that are associated with between ten and twenty percent ground surface residue. Parameter 2006 can correspond to plants that are associated with greater than twenty percent ground surface residue.

Stand Analyzer and Alert Generator 110 can segregate data representative of the growing crops into groups based on the one or more parameters of the category of received data. For example, as in FIG. 20, Stand Analyzer and Alert Generator 110 can segregate data representative of the growing crops into groups 2008, 2010, and 2012. In the example of FIG. 20, forty-five acres of crops are associated with less than ten percent ground surface residue, eighty acres of crops are associated with between ten and twenty percent ground surface residue, and thirty-five acres of crops are associated with greater than twenty percent ground surface residue.

Stand Analyzer and Alert Generator 110 can determine a stand status for each for the plurality of groups. As illustrated, the stand status determined by Stand Analyzer and Alert Generator 110 can include population status 2014 and variability status 2016. As was similarly described above, population status 2014 can include indications of one or more of a total number of plants within each group, an estimated number of plant loss within each group, an estimated number of plants lost within gaps of greater than (or equal to) 4.35 feet, and an estimated yield loss (e.g., in bushels per acre) for the respective group. Each of the estimations included in population status 2014 can be determined based on a comparison with one or more benchmark criteria, such as benchmark population criteria and benchmark yield criteria.

Variability status 2016 can include an indication of a total estimated yield of crops within each respective group. As described above, Stand Analyzer and Alert Generator 110 can assign plants within each group to one of a plurality of grades, such as one of a boss grade, a laggard grade, and a runt grade. The total estimated yields can be based on comparisons of the number of plants within each grade to benchmark yield criteria associated with the grade of plant.

Report 2000 can further include lost yield status 2018. As was similarly described above, lost yield status 2018 can include indications of a total estimated lost yield for a group, as well as estimated lost yields associated with each of population status 2014 and variability status 2016 for the respective group. For instance, Stand Analyzer and Alert Generator 110 can determine the estimated lost yield associated with population status 2014 for each group by multiplying the anticipated lost yield associated with population status 2014 for the group by the number of acres of crops included in the group. Stand Analyzer and Alert Generator 110 can determine an estimated lost yield associated with variability status 2016, such as by comparing the estimated yield (e.g., in bushels per acre) associated with variability status 2016 for the group with a benchmark yield criteria and multiplying the estimated yield loss (e.g., in bushels per acre) by the number of acres included in the respective group. Stand Analyzer and Alert Generator 110 can determine the total estimated lost yield for a group, such as by aggregating the estimated yield loss associated with population status 2014 and the estimated yield loss associated with variability status 2016 for the respective group.

As illustrated in FIG. 20, report 2000 can further include total lost yield status 2020. Total lost yield status 2020 can include an indication of a total anticipated lost yield for the region of interest, such as total anticipated lost yield 2022. Stand Analyzer and Alert Generator 110 can determine a value of total anticipated lost yield 2022, such as by aggregating (e.g., summing) the anticipated lost yield for each of the groups. For instance, Stand Analyzer and Alert Generator 110 can sum the anticipated lost yield for each of groups 2008, 2010, and 2012 to arrive at a value for total anticipated lost yield 2022. Total lost yield status 2020 can further include an indication of total expected economic loss 2024 corresponding to the product of total anticipated lost yield 2022 and a benchmark economic yield criterion.

FIG. 21 illustrates an example report 2100 of a stand status analysis with respect to a planter equipment speed category of received data for a region of interest. As illustrated in FIG. 21, report 2100 can include planter speed parameters 2102, 2104, and 2106. Planter speed parameters 2102, 2104, and 2106 can indicate a speed of planter equipment associated with the growing crops. A speed of planting equipment used to plant crops can have a direct impact on a consistency of the planting, and therefore the stand status of the crops. For example, as the speed of the planting equipment increases, the accuracy and precision of the planting equipment can decrease with respect to seed placement, seed depth, or other planting parameters. Accordingly, those plants associated with a faster planter speed can exhibit inhibited growth characteristics as compared to plants associated with a slower planter speed.

In the example of FIG. 21, parameter 2102 can correspond to plants that are associated with a planter equipment speed of less than 4.5 miles per hour (7.24 kilometers per hour). Parameter 2104 can correspond to plants that are associated a planter speed between 4.5 miles per hour and six miles per hour (9.66 kilometers per hour). Parameter 2106 can correspond to plants that are associated with planter speeds that are greater than six miles per hour.

Stand Analyzer and Alert Generator 110 can segregate data representative of the growing crops into groups based on the one or more parameters of the category of received data. For example, as in FIG. 21, Stand Analyzer and Alert Generator 110 can segregate data representative of the growing crops into groups 2108, 2110, and 2112. In the example of FIG. 21, sixty-five acres of crops are associated with a planter speed of less than 4.5 miles per hour, sixty-five acres of crops are associated with a planter speed between 4.5 miles per hour an six miles per hour, and thirty acres of crops are associated with a planter speed that is greater than six miles per hour.

Stand Analyzer and Alert Generator 110 can determine a stand status for each for the plurality of groups. As illustrated, the stand status determined by Stand Analyzer and Alert Generator 110 can include population status 2114 and variability status 2116. As was similarly described above, population status 2114 can include indications of one or more of a total number of plants within each group, an estimated number of plant loss within each group, an estimated number of plants lost within gaps of greater than (or equal to) 4.35 feet, and an estimated yield loss (e.g., in bushels per acre) for the respective group. Each of the estimations included in population status 2114 can be determined based on a comparison with one or more benchmark criteria, such as benchmark population criteria and benchmark yield criteria.

Variability status 2116 can include an indication of a total estimated yield of crops within each respective group. As described above, Stand Analyzer and Alert Generator 110 can assign plants within each group to one of a plurality of grades, such as one of a boss grade, a laggard grade, and a runt grade. The total estimated yields can be based on comparisons of the number of plants within each grade to benchmark yield criteria associated with the grade of plant.

Report 2100 can further include lost yield status 2118. As was similarly described above, lost yield status 2118 can include indications of a total estimated lost yield for a group, as well as estimated lost yields associated with each of population status 2114 and variability status 2116 for the respective group. For instance, Stand Analyzer and Alert Generator 110 can determine the estimated lost yield associated with population status 2114 for each group by multiplying the anticipated lost yield associated with population status 2114 for the group by the number of acres of crops included in the group. Stand Analyzer and Alert Generator 110 can determine an estimated lost yield associated with variability status 2116, such as by comparing the estimated yield (e.g., in bushels per acre) associated with variability status 2116 for the group with a benchmark yield criteria and multiplying the estimated yield loss (e.g., in bushels per acre) by the number of acres included in the respective group. Stand Analyzer and Alert Generator 110 can determine the total estimated lost yield for a group, such as by aggregating the estimated yield loss associated with population status 2114 and the estimated yield loss associated with variability status 2116 for the respective group.

As illustrated in FIG. 21, report 2100 can further include total lost yield status 2120. Total lost yield status 2120 can include an indication of a total anticipated lost yield for the region of interest, such as total anticipated lost yield 2122. Stand Analyzer and Alert Generator 110 can determine a value of total anticipated lost yield 2122, such as by aggregating (e.g., summing) the anticipated lost yield for each of the groups. For instance, Stand Analyzer and Alert Generator 110 can sum the anticipated lost yield for each of groups 2108, 2110, and 2112 to arrive at a value for total anticipated lost yield 2122. Total lost yield status 2120 can further include an indication of total expected economic loss 2124 corresponding to the product of total anticipated lost yield 2122 and a benchmark economic yield criterion.

Figure 22:
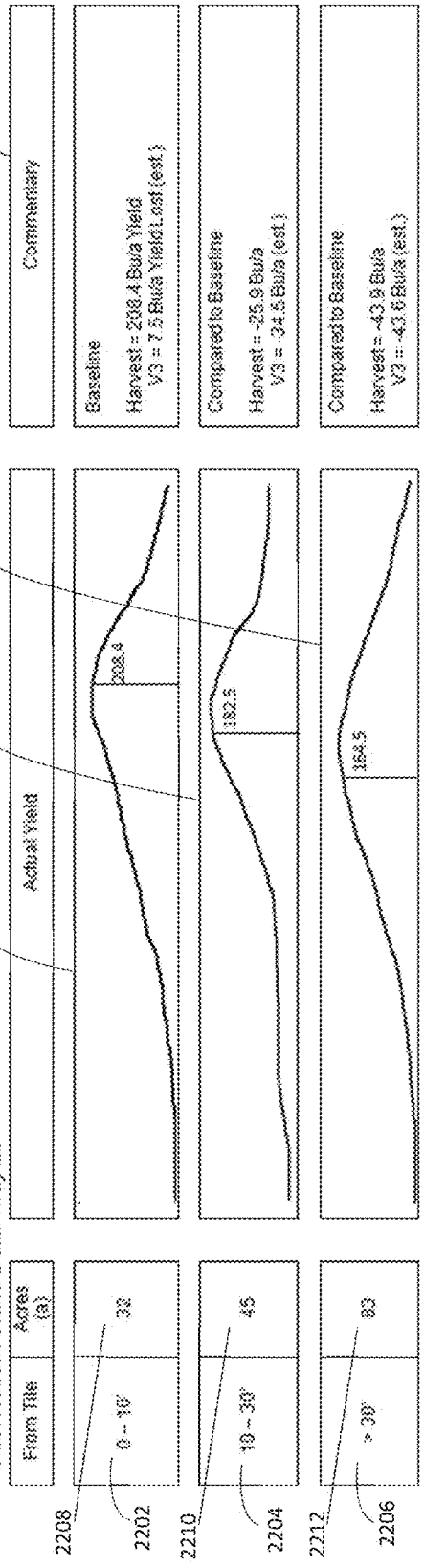
FIG. 22 illustrates an example report of a stand status analysis including a measured yield of crops with respect to a drain tile category of received data for the region of interest.

FIG. 22 illustrates an example report 2200 of a stand status analysis including a measured yield of crops with respect to a drain tile category of received data for the region of interest. As illustrated in FIG. 22, report 2200 can include drain tile parameters 2202, 2204, and 2206. Drain tile parameters 2202, 2204, and 2206 can indicate proximity of the crops to drain tile.

In the example of FIG. 22, parameter 2202 can correspond to plants that are located within ten feet of drain tile. Parameter 2204 can correspond to plants that are located between ten and thirty feet of drain tile. Parameter 2206 can correspond to plants that are located greater than thirty feet from drain tile.

In some examples, such as the example of FIG. 22, Stand Analyzer and Alert Generator 110 can receive data indicating a measured yield of the crops within the region of interest. For instance, yield of the crops within the region of interest can be measured during or after harvest, such as through the use of weigh tickets. The measured data can be received by Stand Analyzer and Alert Generator 110 and correlated to one of groups 2208, 2210, and 2212. As illustrated, measured yield 2214 can be correlated to group 2208 associated with crops that are less than ten feet from drain tile. Similarly, measured yield 2216 and measured yield 2218 can be correlated to groups 2204 and 2206, respectively. Report 2200 can include analysis (or commentary) 2220, which can include a comparison of the measured yield with a benchmark yield associated with the group. In this way, report 2200 can output a comparison of a harvested yield based on data measured during and/or after the crops are harvested with a benchmark yield to provide an indication of crop performance. In addition, report 2200 can enable a comparison of an anticipated yield and/or yield loss with the measured yield and/or yield loss to provide an indication of accuracy of the anticipated values.

While FIG. 22 has been described with respect to a drain tile category of received data for the region of interest, it should be understood that any one or more of the preceding example categories of data can include a comparison to measured yield of the harvested crop.

Figure 23:
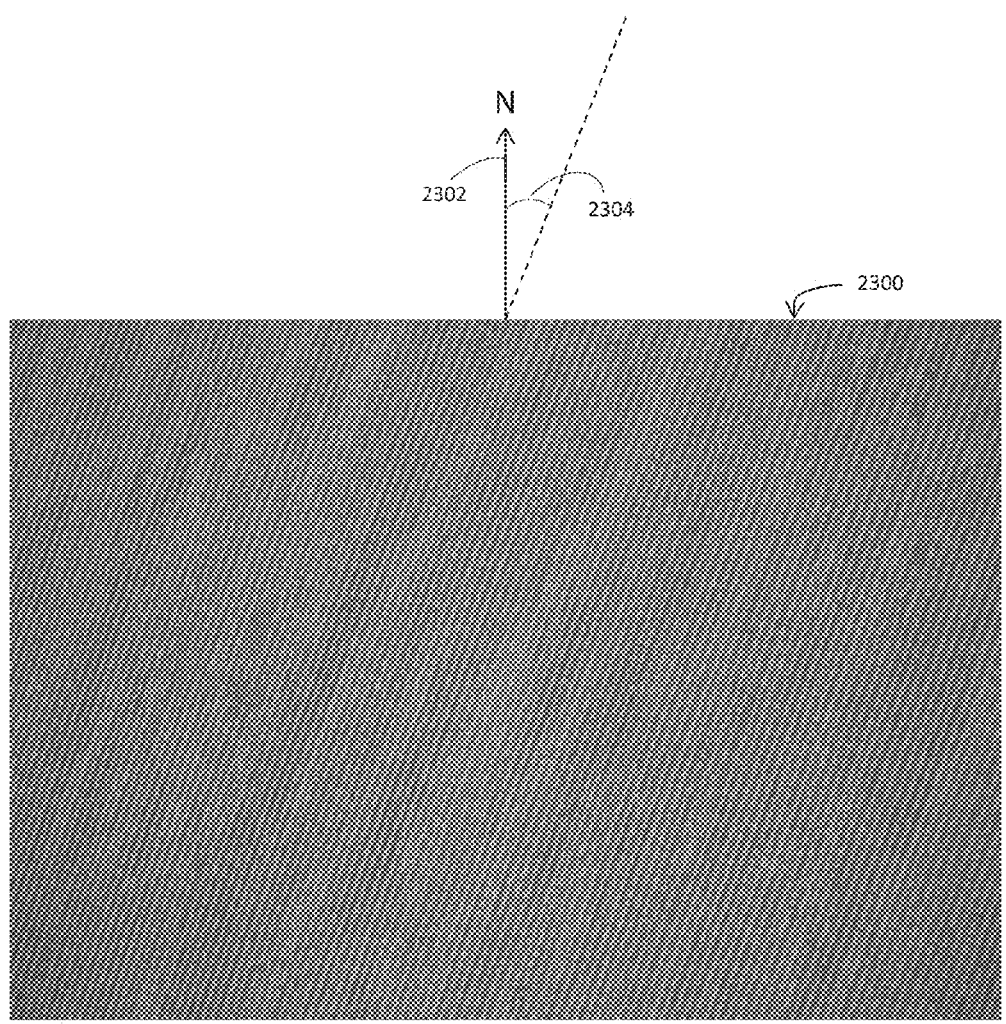
FIG. 23 illustrates example image data for a region of interest that can be used to determine a stand status of growing crops within the region of interest.

FIG. 23 illustrates example image 2300 for a region of interest that can be used to determine a stand status of growing crops within the region of interest. As illustrated in FIG. 23, image 2300 can include image data captured by an image sensor carried by, e.g., an aerial vehicle, such as an airplane, helicopter, UAV, satellite, or other aerial vehicle, thereby providing an overhead image of a region of interest that includes growing crops. In the example of FIG. 23, image 2300 includes image data corresponding to numerous rows of growing crops, such as corn, soybeans, wheat, potatoes, or other growing crops. In addition, image 2300 includes image data corresponding to non-vegetation regions, such as the regions between rows of crops as well as regions within rows having an absence of vegetation. While in the example of FIG. 23 image 2300 corresponds to a portion of a field of crops, in other examples, image 2300 can correspond to an entire field of crops, multiple fields of crops, or other geographical areas. As such, in some examples, Stand Analyzer and Alert Generator 110 can determine an entire field of crops as a region of interest. In other examples, Stand Analyzer and Alert Generator 110 can partition the region of interest and/or image 2300 to determine a plurality of tiled portions (or tiles) of the region of interest. In such examples, Stand Analyzer and Alert Generator 110 can determine a stand status of growing crops included in each of the plurality of tiled portions and, in certain examples, can aggregate the determined stand statuses for each of the plurality of tiles to determine an aggregate stand status for an entire field of crops.

Image 2300 can be a georeferenced image, such that each pixel of image 2300 corresponds to a unique geographical location within the region of interest. For instance, Stand Analyzer and Alert Generator 110 can receive image 2300 along with georeferenced data of image 2300 corresponding to pixels of image 2300 such that pixels of image 2300 are associated with latitude and longitude values of the region of interest. In other examples, Stand Analyzer and Alert Generator 110 can geo-rectify image 2300 by associating pixels of image 2300 with latitude and longitude values corresponding to known latitude and longitude values that the portion of image 2300 represents, such that each of the pixels corresponds to a unique latitude and longitude combination. That is, image 2300 can include a plurality of pixels, such as tens, hundreds, thousands, tens of thousands, or more pixels. Each pixel can be associated with a particular latitude and longitude pair, such that each of the plurality of pixels is georeferenced with a geographical location of the region of interest that the pixel represents.

Stand Analyzer and Alert Generator 110 can, in some examples, determine an orientation direction of image 2300, such as orientation direction 2302. Stand Analyzer and Alert Generator 110 can determine locations of rows of crops within image 2300 using orientation direction 2302, such as by calculating a row angle 2304 of crop rows with respect to orientation direction 2302, as is further described below. While in the example of FIG. 23, orientation direction 2302 extends in a northerly direction, in other examples, orientation direction 2302 can extend in other directions. In general, orientation direction 2302 can be any orientation direction by which Stand Analyzer and Alert Generator 110 can compare candidate row angles to determine a dominant row angle of crops within the region of interest, as is further described below.

In some examples, such as the example of FIG. 23, a color of each of the pixels of image 2300 can be represented using the RGB color model. For instance, using the RGB color model, each of the pixels of image 2300 can be represented by a combination of a red value indicating an intensity of a contribution of a red color to the color of the respective pixel, a green value indicating an intensity of a contribution of a green color to the color of the respective pixel, and a blue value indicating an intensity of a contribution of a blue color to the color of the respective pixel. In this way, each of the colors of the pixels of image 2300 can be represented using varying combinations of intensity values for red, green, and blue colors (referred to herein as "RGB" values). Stand Analyzer and Alert Generator 110 can utilize the RGB values to categorize portions (e.g., pixels) of image 2300 as corresponding to either vegetation or non-vegetation areas of image 2300. For instance, Stand Analyzer and Alert Generator 110 can determine a crop mask that includes a plurality of elements, each of the plurality of elements corresponding to a pixel of image 2300 and categorized as one of a vegetation element indicating that a corresponding pixel of image 2300 is associated with vegetation within the region of interest and a non-vegetation element indicating that a corresponding pixel of image 2300 is associated with an absence of vegetation within the region of interest. In certain examples, Stand Analyzer and Alert Generator 110 can determine the crop mask using the green value of each pixel of image 2300 and excluding the red value and blue value of the corresponding pixel, as is further described below.

Accordingly, Stand Analyzer and Alert Generator 110 can receive image 2300 for a region of interest (e.g., a portion of a field of crops, an entire field of crops, multiple fields of crops, or other regions of interest) and can determine areas of the image data (and the corresponding areas of the region of interest) corresponding to vegetation and areas of the image data corresponding to an absence of vegetation. Stand Analyzer and Alert Generator 110 can determine, based on image 2300, rows of crops within the region of interest, and can determine a stand status of the growing crops based on received data for the region of interest associated with portions of the region of interest included in the identified rows of crops and excluding portions of the region of interest outside the identified rows of crops. In this way, Stand Analyzer and Alert Generator 110 can increase an accuracy of the stand status determination by excluding data from non-row regions that can include non-crop vegetation (e.g., weeds).

Figure 24:
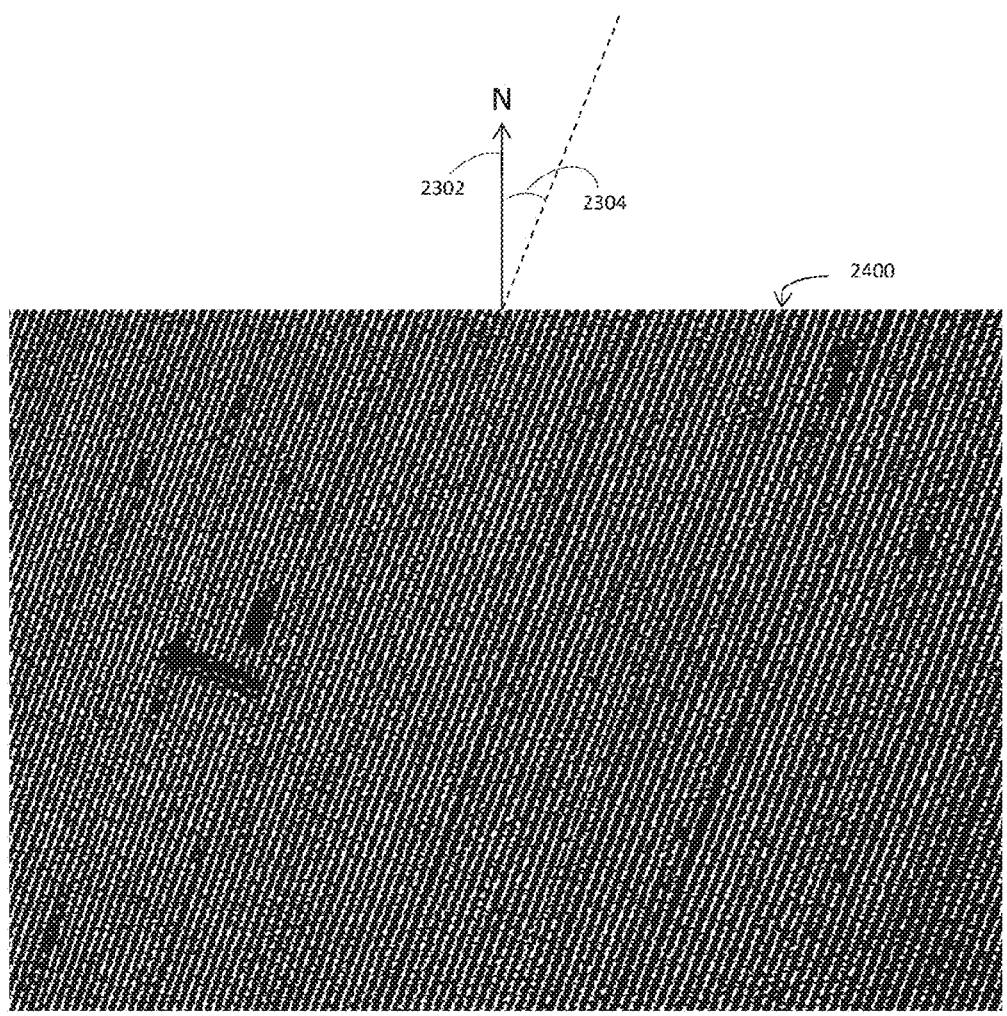
FIG. 24 illustrates an example crop mask that differentiates between areas of a region of interest corresponding to vegetation and areas of the region of interest corresponding to an absence of vegetation.

FIG. 24 illustrates an example crop mask 2400 that differentiates between areas of a region of interest corresponding to vegetation and areas of the region of the interest corresponding to an absence of vegetation. Stand Analyzer and Alert Generator 110 can determine crop mask 2400 based on received image data for the region of interest. In the example of FIG. 24, Stand Analyzer and Alert Generator 110 determines crop mask 2400 based on image 2300 of FIG. 23.

Stand Analyzer and Alert Generator 110 can determine crop mask 2400 to include a plurality of elements, each of the plurality of elements corresponding to a pixel of image 2300 and categorized as one of a vegetation element indicating that a corresponding pixel of image 2300 is associated with vegetation within the region of interest and a non-vegetation element indicating that a corresponding pixel of image 2300 is associated with an absence of vegetation within the region of interest. In the example of FIG. 24, elements of the color white correspond to vegetation elements and elements of the color black correspond to non-vegetation elements.

In some examples, such as the example of FIG. 24, Stand Analyzer and Alert Generator 110 can determine the plurality of elements of crop mask 2400 such that each of the plurality of elements of crop mask 2400 has a one-to-one correspondence with pixels of image 2300. That is, in certain examples, Stand Analyzer and Alert Generator 110 can determine crop mask 2400 such that each element of crop mask 2400 corresponds to one pixel of image data 2300 and no two elements of crop mask 2400 correspond to a same pixel of image data 2300. In this way, Stand Analyzer and Alert Generator 110 can determine elements of crop mask 2400 that correspond to both pixels of image 2300 and the geographical area of the region of interest represented by the corresponding pixels. That is, Stand Analyzer and Alert Generator 110 can determine crop mask 2400 as a georeferenced data structure (e.g., array, matrix, raster image, or other data structure) having elements that correspond to geographical locations of the region of interest. As illustrated in FIG. 24, Stand Analyzer and Alert Generator 110 can determine orientation direction 2302 of crop mask 2400, thereby providing a same reference orientation as that of image 2300 by which to determine row angle 2304 of rows of crops within the region of interest.

Stand Analyzer and Alert Generator 110 can determine crop mask 2400 using the green value of each pixel of image 2300 to categorize a corresponding element as either a vegetation element or a non-vegetation element. That is, because green color values typically differ substantially between vegetation (e.g., crops) and non-vegetation (e.g., soil), green values of pixels of image 2300 can provide an effective differentiator between pixels (and hence elements of crop mask 2400) corresponding to vegetation and pixels corresponding to non-vegetation.

In some examples, Stand Analyzer and Alert Generator 110 can compare the green value of each pixel of image 2300 to a threshold value corresponding to a bifurcation between vegetation and non-vegetation. For instance, Stand Analyzer and Alert Generator 110 can categorize elements of crop mask 2400 corresponding to pixels having a green value that exceeds the threshold value as vegetation elements, and can categorize elements of crop mask 2400 corresponding to pixels having a green value that does not exceed the threshold value as non-vegetation elements. Stand Analyzer and Alert Generator 110, in certain examples, assigns a logical true value (e.g., 1) to those elements categorized as vegetation elements and assigns a logical false value (e.g., 0) to those elements categorized as non-vegetation elements, though in certain examples the assignment of logical true and false values can be reversed (i.e., logical true values representing non-vegetation elements and logical false values representing vegetation elements). In this way, Stand Analyzer and Alert Generator 110 can determine crop mask 2400 as a binary mask having a plurality of elements, each element indicating whether an associated pixel of image 2300 (and hence an associated geographical area of the region of interest) corresponds to vegetation or an absence of vegetation within the region of interest.

In certain examples, Stand Analyzer and Alert Generator 110 can determine values of the plurality of elements of crop mask 2400 using Otsu's method, according to the following equation:

$$\sigma_\omega^2(t) = \omega_1(t)\sigma_1^2(t) + \omega_2(t)\sigma_2^2(t) \qquad \text{Equation (1)}$$

where $\omega_1$ represents a probability of a vegetation classification of the elements of crop mask 2400, $\omega_2$ represents a probability of a non-vegetation classification of the elements of crop mask 2400, t represents the threshold value, $\sigma_1^2$ represents a variance of vegetation elements within the vegetation classification, and $\sigma_2^2$ represents a variance of non-vegetation elements within the non-vegetation classification. Stand Analyzer and Alert Generator 110, according to Otsu's method of Equation (1), can exhaustively search the domain of green values of pixels of image 2300 to determine a threshold value (t) that minimizes each of the intra-class variances, namely $\sigma_1^2$ and $\sigma_2^2$. Accordingly, Stand Analyzer and Alert Generator 110 can determine crop mask 2400 according to the classifications of each element as determined according to Equation (1), such that each of the elements of crop mask 2400 is categorized as one of a vegetation element and a non-vegetation element.

As illustrated in FIG. 24, Stand Analyzer and Alert Generator 110 can determine a georeferenced crop mask 2400, including a plurality of elements that discriminate between areas of a region of interest corresponding to vegetation and areas of the region of interest corresponding to an absence of vegetation. Stand Analyzer and Alert Generator 110 can utilize crop mask 2400 to determine, for example, georeferenced locations of rows of crops within the region of interest as well as areas within rows corresponding gaps having an absence of vegetation, as is further described below.

Figure 25:
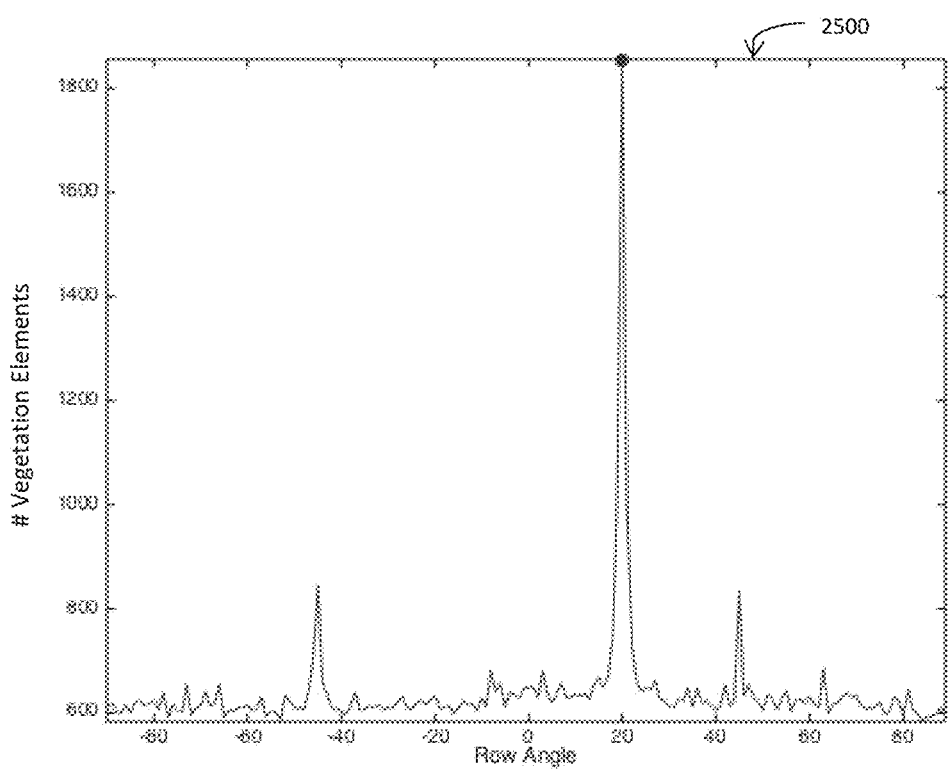
FIG. 25 is a graph illustrating an example output that can be derived from a Hough transform of a crop mask for a region of interest and used to determine a dominant row angle of crops within a region of interest.

FIG. 25 is a graph 2500 illustrating an example output that can be derived from a Hough transform of crop mask 2400 and used to determine a dominant row angle of crops within a region of interest. Stand Analyzer and Alert Generator 110, in certain examples, can utilize crop mask 2400 to determine a row angle of crops within the region of interest. Using the determined row angle, Stand Analyzer and Alert Generator 110 can determine georeferenced locations of rows of crops within the region of interest based on identified starting locations of each row, as is further described herein.

Stand Analyzer and Alert Generator 110 can determine a plurality of candidate row angles of rows of crops within the region of interest via one or more feature extraction image analysis techniques, such as a Hough transform. For example, Stand Analyzer and Alert Generator 110 can determine a plurality of candidate rows via a Hough transform of crop mask 2400 according to the following equation:

$$r = x \cos \theta + y \sin \theta \qquad \text{Equation (2)}$$

where x and y represent x and y coordinates of an element of crop mask 2400 in an X-Y (i.e., Cartesian) coordinate space of crop mask 2400, r represents an algebraic distance of a normal line (i.e., perpendicular line) from an origin of the X-Y coordinate space of crop mask 2400 to a candidate line, and θ represents an angle of the candidate line with respect to the X-axis of the X-Y coordinate space. Accordingly, for any point ($x_0$, $y_0$) on the candidate line, r and θ are constant values. Stand Analyzer and Alert Generator 110 can determine, for each element of crop mask 2400 corresponding to a unique Cartesian coordinate ($x_0$, $y_0$), possible (r,θ) values representing candidate lines that intersect the element ($x_0$, $y_0$). Such a point-to-curve transformation can be referred to as the linear Hough transformation for straight lines within the Cartesian space of crop mask 2400, the resulting domain referred to as the Hough parameter space. Collinear points ($x_0$, $y_0$) within the Cartesian space of crop mask 2400 correspond to intersecting (r,θ) values within the Hough parameter space. Accordingly, Stand Analyzer and Alert Generator 110 can determine a plurality of candidate rows within the region of interest based on a frequency of intersection of lines for each value (r,θ) within the Hough parameter space.

Stand Analyzer and Alert Generator 110 can determine a dominant row angle of crops within the region of interest based on a number of elements of crop mask 2400 corresponding to the determined dominant row angle. For example, as illustrated in FIG. 25, Stand Analyzer and Alert Generator 110 can determine, for each of a plurality of candidate row angles (i.e., θ) ranging from, e.g., negative 90 degrees to positive 90 degrees with respect to orientation direction 2302, a number of elements of crop mask 2400 corresponding to the respective one of the plurality of candidate row angles. Stand Analyzer and Alert Generator 110 can determine a dominant row angle for the region of interest as the one of the plurality of candidate row angles corresponding to a greatest number of vegetation elements of crop mask 2400. For instance, in the illustrated example of FIG. 25, Stand Analyzer and Alert Generator 110 can determine a dominant row for the region of interest represented by crop mask 2400 as twenty degrees (i.e., the candidate row angle corresponding to the greatest number of vegetation elements of crop mask 2400.

Stand Analyzer and Alert Generator 110 can determine the row angle for crops within the region of interest as the determined dominant row angle (e.g., twenty degrees in this example). That is, rather than determine a plurality of row angles associated with the region of interest (e.g., a field of crops, a portion of a field of crops, a portioned tile of one or more fields of crops, or other regions of interest), Stand Analyzer and Alert Generator 110 can determine a dominant row angle corresponding to the region of interest, and can associate the dominant row angle with each of the plurality of rows of crops within the region of interest. In this way, Stand Analyzer and Alert Generator 110 can increase an accuracy of row detection within the region of interest. That is, the inventors have recognized that utilizing an output of a Hough transform or other feature extraction technique that determines a plurality of row angles and associates each pixel (or element) with one of the plurality of row angles can result in inaccurate row detection at portions of a field of crops. For instance, as illustrated in FIG. 25, a local maximum of the range of graph 2500 (i.e., number of vegetation elements) occurs at approximately negative forty-five degrees and positive forty-five degrees. Such local maximums, via traditional feature extraction techniques (e.g., Hough transformation techniques), may typically be identified as row angles having corresponding elements of crop mask 2400. Accordingly, such traditional techniques may determine row angles of crops within the region of interest at negative forty-five degrees, twenty degrees, and forty-five degrees when, in fact, rows of crops within the region of interest represented by crop mask 2400 have been planted at an angle of twenty degrees as measured from orientation angle 2302. Such inaccuracies in the traditional feature extraction techniques can be due to, for example, rows of crops that are not exactly linear, differences in lengths of the rows of crops within the region of interest (e.g., shorter rows of crops represented by northwest and southeast corners of image 2300 of FIG. 23), or other such factors. Accordingly, by determining a dominant row angle of the rows of crops within the region of interest and associating each of the rows of crops with the determined dominant row angle, Stand Analyzer and Alert Generator 110 can more accurately determine row angles and locations of rows of crops within the region of interest.

Figure 26:
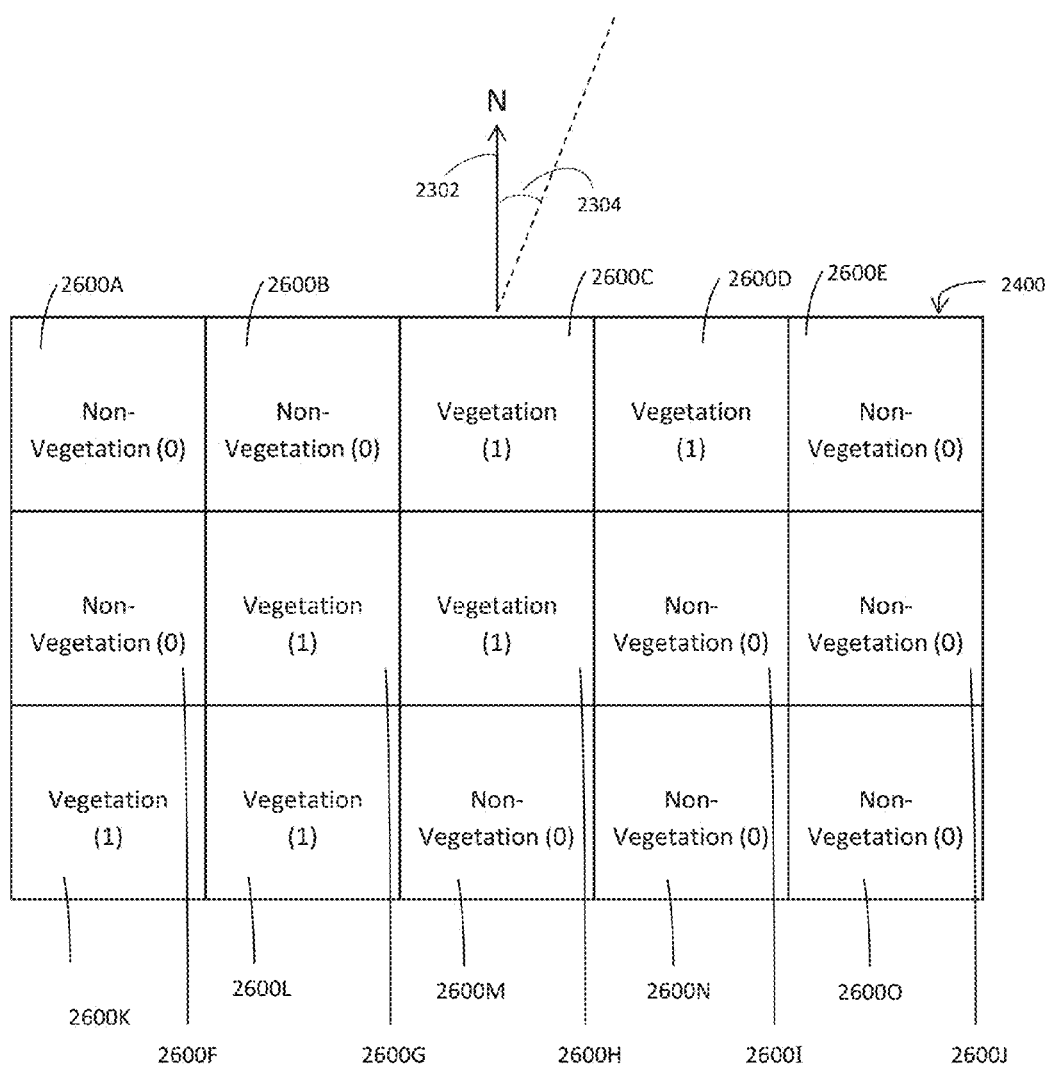
FIG. 26 illustrates a portion of a crop mask that can be used to determine starting locations of crop rows within a region of interest.

FIG. 26 illustrates a portion of crop mask 2400 that can be used to determine starting locations of crop rows within a region of interest. As illustrated in FIG. 26, Stand Analyzer and Alert Generator 110 can determine crop mask 2400 having a plurality of elements, each of the plurality of elements corresponding to a pixel of image data for the region of interest (e.g., pixels of image 2300 of FIG. 23) and categorized as one of a vegetation element indicating that a corresponding pixel of the received image data is associated with vegetation within the region of interest and a non-vegetation element indicating that a corresponding pixel of the received image data is associated with an absence of vegetation within the region of interest. The example of FIG. 26 is illustrated and described with respect to an example portion of crop mask 2400, such that the example portion of crop mask 2400 includes elements 2600A-2600O (collectively referred to herein as "elements 2600"). However, it should be understood that the techniques described herein are applicable to any portion of crop mask 2400, including the entirety of crop mask 2400. As illustrated in FIG. 26, crop mask 2400 is oriented with respect to orientation direction 2302, by which row angle 2304 of rows of crops within the region of interest can be determined. In FIG. 26, the example portion of crop mask 2400 corresponds to a northwest corner of crop mask 2400 (with respect to orientation angle 2302).

Stand Analyzer and Alert Generator 110 can determine one or more starting locations of rows of crops within the region of interest based on a location and classification of elements 2600. For example, Stand Analyzer and Alert Generator 110 can iteratively analyze elements included in an edge of crop mask 2400 to determine the one or more starting locations of the rows of crops. In some examples, Stand Analyzer and Alert Generator 110 can determine the edge of crop mask 2400 to be iteratively analyzed to determine starting locations of rows as an edge of crop mask 2400 corresponding to an outer boundary of crop mask 2400 that intersects orientation 2302. For instance, as in the example of FIG. 26, Stand Analyzer and Alert Generator 110 can determine a northern edge of crop mask 2400 (with respect to orientation direction 2302 extending in a northerly direction) as the edge of crop mask 2400 to be iteratively analyzed. In other examples, Stand Analyzer and Alert Generator 110 can determine a southern edge of crop mask 2400 (with respect to orientation direction 2302 extending in a northerly direction) as the edge of crop mask 2400 to be iteratively analyzed. In yet other examples, such as when orientation direction 2302 extends in an easterly or westerly direction, Stand Analyzer and Alert Generator 110 can determine a western or eastern edge of crop mask 2400 (with respect to orientation direction 2302 extending in an easterly or westerly direction) as the edge of crop mask 2400 to be iteratively analyzed.

In the illustrated example of FIG. 26, Stand Analyzer and Alert Generator 110 iteratively analyzes an edge of crop mask 2400 including elements 2600A-2600E. Stand Analyzer and Alert Generator 110 can determine one or more starting locations of rows of crops within the region of interest based on classifications of each of elements 2600A-2600E as either vegetation elements or non-vegetation elements. For instance, Stand Analyzer and Alert Generator 110 can determine element 2600C as a starting location of a row of crops based on determining that element 2600C is classified as a vegetation element and is adjacent one or more elements within the iteratively analyzed edge of elements that are classified as non-vegetation elements (e.g., one or more of elements 2600A and 2600B). Similarly, Stand Analyzer and Alert Generator 110 can determine element 2600D as a starting location of a row of crops based on determining that element 2600D is classified as a vegetation element and is adjacent one or more elements within the iteratively analyzed edge of elements that are classified as non-vegetation elements (e.g., element 2600E). That is, in some examples, such as the example of FIG. 26, Stand Analyzer and Alert Generator 110 can determine multiple of elements 2600 as starting locations of a same row of crops based on determining that the elements each correspond to a starting location of a row of crops and satisfy proximity criteria, such as proximity criteria specifying that elements are immediately adjacent each other, proximity criteria specifying that elements are within a threshold number of elements of each other, or other proximity criteria.

In some examples, Stand Analyzer and Alert Generator 110 can determine starting locations of crops based on elements of crop mask 2400 that are within a threshold number of elements of the elements included in the iteratively analyzed edge of crop mask 2400, such as one, two, three, or more elements. For instance, in the example of FIG. 26, Stand Analyzer and Alert Generator 110 can determine starting locations of crops based on elements 2600A-2600E as well as elements 2600E-2600J that are within one element of elements 2600A-2600E. In such examples, Stand Analyzer and Alert Generator 110 can determine starting locations of rows as locations corresponding to those of the iteratively analyzed elements that satisfy threshold clustering (or grouping) criteria, such as a threshold number of elements classified as vegetation elements within a threshold number of immediately adjacent elements.

In the example of FIG. 26, Stand Analyzer and Alert Generator 110 determines elements 2600C and 2600D as a starting location of a same row of crops within the region of interest based on physical proximity of those portions of the region of interest corresponding to elements 2600C and 2600D. In other examples, however, such as when rows of crops are spaced closer together or where each of elements 2600 corresponds to a larger area of the region of interest, Stand Analyzer and Alert Generator can determine each of elements 2600C and 2600D as a starting location of a unique row of crops, such that element 2600C corresponds to a starting location of a first row of crops and element 2600D corresponds to a starting location of a second, different row of crops.

While the example of FIG. 26 has been illustrated and described for purposes of clarity and ease of discussion with respect to a portion of crop mask 2400, it should be understood that the techniques described herein are applicable to any sized portion of crop mask 2400, including the entirety of crop mask 2400. For instance, Stand Analyzer and Alert Generator 110 can iteratively analyze an entire edge (as well as elements proximate the iteratively analyzed edge) to determine multiple starting locations corresponding to each of a plurality of rows of crops within the region of interest.

Stand Analyzer and Alert Generator 110 can determine rows of crops (i.e., georeferenced locations of rows of crops) within the region of interest based on the determined dominant row angle of the rows of crops and the determined starting locations of the rows of crops. For instance, as is further described below, Stand Analyzer and Alert Generator 110 can determine the rows of crops within the region of interest as extending from each of the determined starting locations in a direction of the determined dominant row angle for the rows of crops within the region of interest. In this way, Stand Analyzer and Alert Generator 110 can determine locations of rows of crops within the region of interest, thereby enabling more accurate determinations of a stand status of the growing crops within the region of interest based on received data for the region of interest associated with portions of the region of interest included in the identified rows of crops and excluding portions of the region of interest outside the identified rows of crops.

Figure 27:
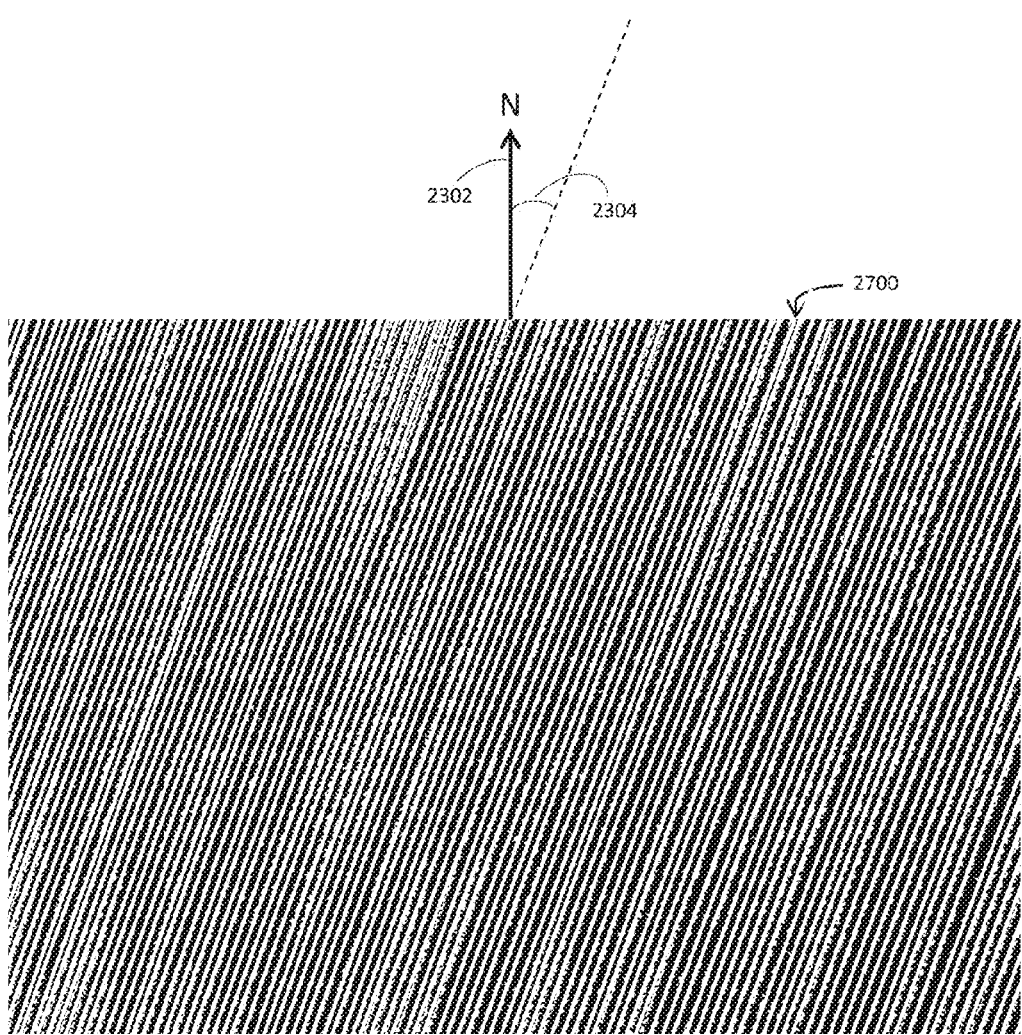
FIG. 27 illustrates an example crop row location map for a region of interest.

FIG. 27 illustrates an example crop row location map 2700 for a region of interest. As illustrated in FIG. 27, Stand Analyzer and Alert Generator 110 can determine crop row location map 2700 that identifies georeferenced locations of rows of crops within the region of interest. In the example of FIG. 27, rows of crops are illustrated as solid white lines extending from each of a plurality of starting locations (e.g., determined as described above with respect to FIG. 26) along dominant row angle 2304 (e.g., twenty degrees in this example) measured with respect to orientation direction 2302. As further illustrated in FIG. 27, a width of each of the white lines associated with the rows of crops corresponds to a width of the rows of crops within the region of interest. That is, Stand Analyzer and Alert Generator 110 can determine each of the rows of crops as having a width based on, e.g., a standard width of rows of a corresponding crop (e.g., twenty-inch rows, thirty-inch rows, or other standard widths of rows), configuration data specifying a width of the rows, widths of rows as determined based on crop mask 2400, or other data specifying widths of the rows of crops. In this way, Stand Analyzer and Alert Generator 110 can determine georeferenced locations of the rows of crops within the region of interest as well as locations within the region of interest corresponding to areas outside the determined rows, such as areas of the region of interest between the rows of crops.

Figure 28:
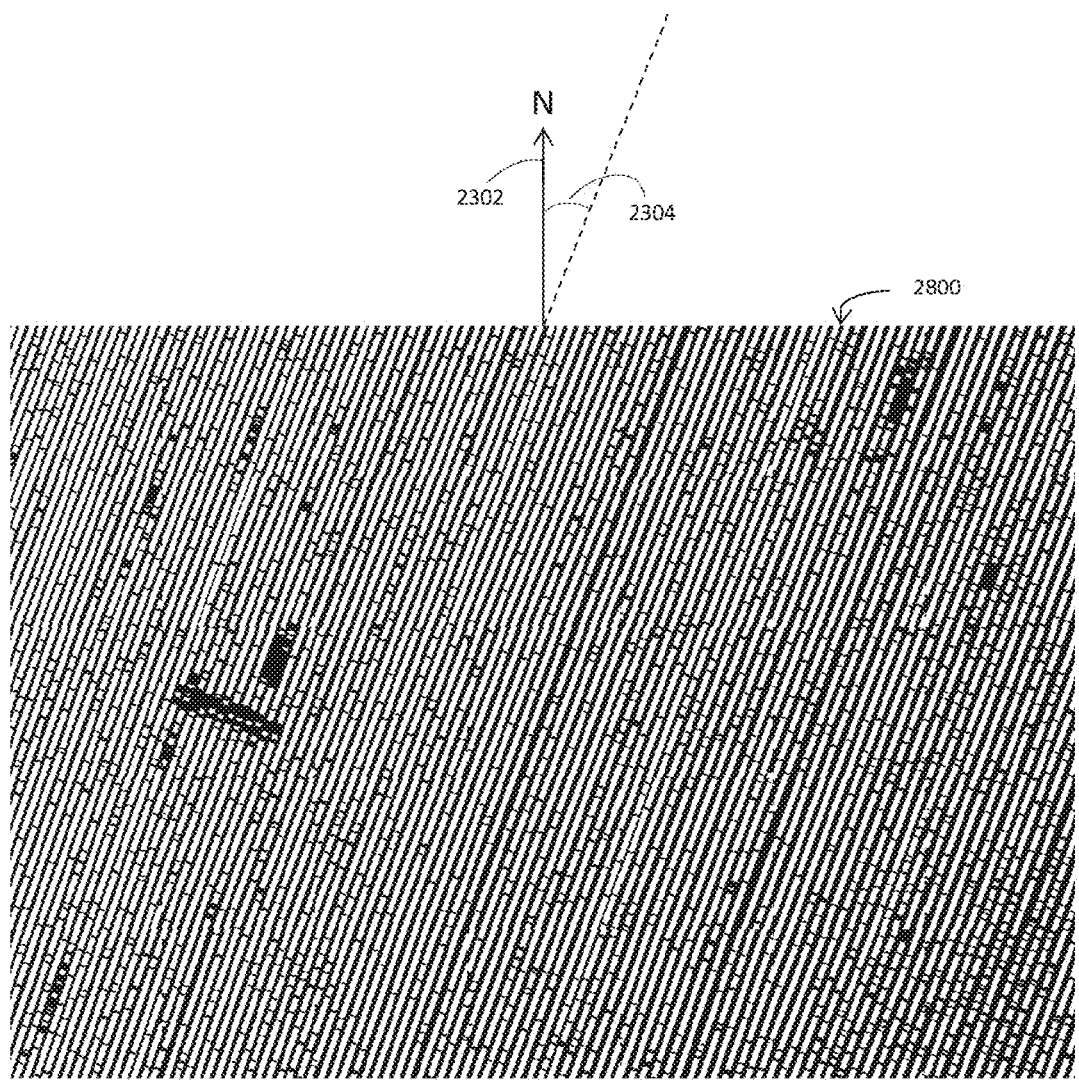
FIG. 28 illustrates an example crop map including row locations for a region of interest.

FIG. 28 illustrates an example crop map 2800 including row locations for a region of interest. As illustrated in FIG. 28, crop map 2800 can identify georeferenced locations of rows of crops extending from determined starting locations of the rows in a direction along dominant row angle 2304 as measured with respect to orientation direction 2302. In addition, crop map 2800 identifies areas of the region of interest corresponding to an absence of vegetation within the identified rows of crops. Such areas within the identified rows that correspond to an absence of vegetation can be referred to as gaps within rows. Stand Analyzer and Alert Generator 110 can determine crop map 2800 by comparing (e.g., superimposing) elements of crop mask 2400 and crop row location map 2700. For instance, because each of crop mask 2400 (including the plurality of vegetation and non-vegetation elements) and crop row location map 2700 (indicating the locations of rows within the region of interest) are georeferenced with respect to the region of interest, locations of the region of interest corresponding to elements of crop mask 2400 that are classified as non-vegetation elements and intersecting locations of the region of interest that are identified as included within a row location of the region of interest correspond to an absence of vegetation within the identified row. As one example, Stand Analyzer and Alert Generator 110 can determine crop map 2800 as the logical comparison of the elements of each of crop mask 2400 and corresponding elements (or locations) of crop row location map 2700, logical true values indicating that a corresponding location of the region of interest is both included in a row of crops and corresponds to vegetation within the region of interest, logical false values indicating that a corresponding location of the region of interest is either outside a row of crops (i.e., not included in a row of crops) or corresponds to an absence of vegetation within the region of interest. In the example of FIG. 28, such logical true values (indicating that a corresponding location of the region of interest corresponds to vegetation within a row of crops) are illustrated as white. Similarly, such logical false values (indicating that a corresponding location of the region of interest corresponds to either an absence of vegetation or a location outside the identified rows) are illustrated as black.

Stand Analyzer and Alert Generator 110 can determine a stand status of growing crops within the region of interest based on crop map 2800. For instance, Stand Analyzer and Alert Generator 110 can determine a stand status (e.g., quantity status, quality status, and/or consistency status) based on received data for the region of interest associated with portions of the region of interest included in the identified rows. Stand Analyzer and Alert Generator 110 can exclude from such stand status determination received data for the region of interest associated with portions of the region of interest outside the identified rows of crops. As one example, Stand Analyzer and Alert Generator 110 can determine a quantity (or population) status of growing crops within the region of interest based on, e.g., a length of gaps within rows of crops within the region of interest. For instance, Stand Analyzer and Alert Generator 110 can determine a total length of gaps within the rows, and can compare the length of the gaps with one or benchmark criteria, such as benchmark criteria specifying an expected number of plants per unit length of row (e.g., feet, meters, etc.) to determine an estimated number of plants that are not present within the gaps (i.e., as compared to a total number of plants for a row having no gaps). As another example, Stand Analyzer and Alert Generator 110 can determine a quality (or plant variability status) specifying a number of plants within the identified rows of crops classified as one of a boss, laggard, or runt. Stand Analyzer and Alert Generator 110 can exclude from such quality status determination data for the region of interest (e.g., image data) corresponding to areas of the region of interest that are outside the identified rows of crops. In general, Stand Analyzer and Alert Generator 110 can determine a stand status of growing crops within the region of interest according to any of the techniques described herein and for portions of the region of interest included in identified rows and excluding portions of the region of interest outside the identified rows. In this way, Stand Analyzer and Alert Generator 110 can increase an accuracy of stand status determinations by excluding received data corresponding to portions of the region of interest may include largely weeds or other non-crop vegetation.

Figure 29:
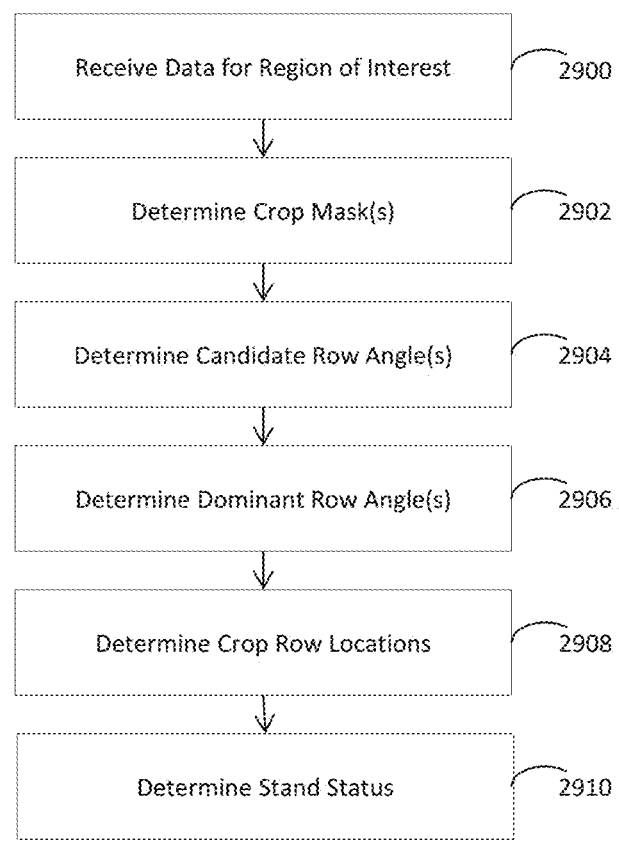
FIG. 29 is a flow diagram illustrating example operations to determine a stand status of growing crops based on received data associated with portions of a region of interest included in identified rows of crops and excluding portions of the region of interest outside the identified rows of crops.

FIG. 29 is a flow diagram illustrating example operations to determine a stand status of growing crops based on received data associated with portions of a region of interest included in identified rows of crops and excluding portions of the region of interest outside the identified rows of crops. For purposes of clarity and ease of discussion, the example operations are described below within the context of system 100 of FIG. 1.

Data for a region of interest can be received (2900). For instance, Stand Analyzer and Alert Generator 110 can receive data for a region of interest that includes growing crops, such as a portion of a field of crops, an entire field of crops, multiple fields of crops, or other regions of interest. The received data can include image data for the region of interest, such as image data captured by an image sensor while traversing the region of interest via, e.g., an aerial vehicle such as a UAV, irrigation equipment configured to traverse the region of interest, or other traversal devices. In some examples, Stand Analyzer and Alert Generator 110 can segregate the received image data for the region of interest into a plurality of tiles. As such, a region of interest, as described with respect to techniques of this disclosure, can be a portion of a field of crops, such as a portion of the field of crops corresponding to one of the plurality of tiles determined (e.g., segregated) by Stand Analyzer and Alert Generator 110.

One or more crop masks can be determined based on the received image data for the region of interest (2902). For example, Stand Analyzer and Alert Generator 110 can determine crop mask 2400 (FIG. 24) for the region of interest. In some examples, Stand Analyzer and Alert Generator 110 can determine multiple crop masks 2400, such as for each of a plurality of segregated tiles corresponding to a field of crops. Crop mask 2400 can include a plurality of elements, each of the plurality of elements corresponding to a pixel of the image data for the region of interest and categorized as one of a vegetation element indicating that a corresponding pixel of the received image data is associated with vegetation within the region of interest and a non-vegetation element indicating that a corresponding pixel of the received image data is associated with an absence of vegetation within the region of interest. In some examples, a color of each of the pixels of the received image data for the region of interest can be represented by a red value indicating an intensity of a contribution of a red color to the color of the respective pixel, a green value indicating an intensity of a contribution of a green color to the color of the respective pixel, and a blue value indicating an intensity of contribution of a blue color to the color of the respective pixel. In certain examples, Stand Analyzer and Alert Generator 110 can determine crop mask 2400 based on the green value and excluding the red value and the blue value of each of the pixels of the received image data. Stand Analyzer and Alert Generator 110 can determine crop mask 2400 based on the green value of each of the pixels of the received image data by, e.g., comparing the green value of each of the pixels to a threshold value, determining that the respective pixel corresponds to vegetation within the region of interest based on determining that the green value of the respective pixel exceeds the threshold value, and determining that the respective pixel corresponds to an absence of vegetation within the region of interest based on determining that the green value of the respective pixel does not exceed the threshold value. In some examples, Stand Analyzer and Alert Generator 110 can determine crop mask 2400 using Otsu's method, such as via Equation (1) described above.

One or more candidate row angles can be determined (2904). For instance, Stand Analyzer and Alert Generator 110 can determine a plurality of candidate row angles using one or more feature extraction techniques, such as a Hough transform, based on crop mask 2400. A dominant row angle can be determined (2906). For instance, Stand Analyzer and Alert Generator 110 can a number of vegetation elements of crop mask 2400 corresponding to each of the plurality of candidate row angles, and can determine a dominant row angle as one of the plurality of candidate row angles corresponding to a greatest number of vegetation elements of crop mask 2400.

One or more crop row locations can be determined (2908). As an example, Stand Analyzer and Alert Generator 110 can determine one or more crop row starting locations by traversing an edge of crop mask 2400 and determining crop row starting locations based on a classification of elements of crop mask 2400 as either vegetation elements or non-vegetation elements. Stand Analyzer and Alert Generator 110 can determine crop row location map 2700 (FIG. 27) that specifies locations of rows of crops within the region of interest as extending from the one or more determined crop row starting locations in a direction of the determined dominant row angle. Stand Analyzer and Alert Generator 110 can determine crop map 2800 (FIG. 28) specifying georeferenced locations of rows of crops corresponding to vegetation within the region of interest as well as locations within the region of interest (e.g., locations within rows and between rows) corresponding to an absence of vegetation.

A stand status of growing crops within the region of interest can be determined (2910). For example, Stand Analyzer and Alert Generator 110 can determine, based on received data for the region of interest associated with portions of the region of interest included in the identified rows of crops and excluding portions of the region of interest outside the identified rows of crops, a stand status (e.g., quantity status, quality status, and/or consistency status) of the growing crops within the region of interest.

As described herein, a computing device implementing techniques of this disclosure can process various types of data from various sources to determine and/or analyze a stand of growing crops within a region of interest. The computing device can determine the stand status for groups of crops within the region of interest, and can compare the determined stand status for each group with benchmark criteria, such as a benchmark yield of crops, thereby enabling accurate determination of an effect of one or more impactful factors to a stand status of the crops. In this way, the computing device can enable possible corrective action, such as replanting, application of fertilizer, or other corrective actions.

In some examples, the computing device can determine rows of crops within the region of interest, and can determine the stand status of the growing crops based on received data associated with portions of the region of interest included in the identified rows and excluding portions of the region of interest outside the identified rows, thereby improving accuracy of stand status determinations by basing such determinations on locations corresponding to crops and excluding locations that can include data from non-crop elements, such as weeds. Moreover, techniques described herein can enable more accurate crop row detection from images of the field of crops, thereby enabling more accurate and efficient stand status determinations.

While the invention has been described with reference to an exemplary embodiment(s), it will be understood by those skilled in the art that various changes can be made and equivalents can be substituted for elements thereof without departing from the scope of the invention. For instance, while particular embodiments have been described with respect to a corn crop, it should be understood that the techniques described herein can be applied to any type of crop. In addition, many modifications can be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
receiving, by a computing device, data for a region of interest that includes growing crops, wherein the received data for the region of interest comprises image data for the region of interest;
determining a crop mask for the region of interest, the crop mask comprising a plurality of elements, each of the plurality of elements corresponding to a pixel of the image data for the region of interest and categorized as one of a vegetation element indicating that a corresponding pixel of the received image data is associated with vegetation within the region of interest and a non-vegetation element indicating that a corresponding pixel of the received image data is associated with an absence of vegetation within the region of interest; and
determining the rows of crops within the region of interest based on the determined crop mask; and
determining, by the computing device based on the received data for the region of interest associated with portions of the region of interest included in the identified rows of crops and excluding portions of the region of interest outside the identified rows of crops, a stand status of the growing crops within the region of interest, the stand status comprising a quantity status corresponding to a population of crops within the region of interest.

2. The method of claim 1,
wherein a color of each of the pixels of the received image data for the region of interest is represented by a red value indicating an intensity of a contribution of a red color to the color of the respective pixel, a green value indicating an intensity of a contribution of a green color to the color of the respective pixel, and a blue value indicating an intensity of contribution of a blue color to the color of the respective pixel; and
wherein determining the crop mask for the region of interest comprises determining the crop mask, based on the green value and excluding the red value and the blue value, of each of the pixels of the received image data.

3. The method of claim 2, wherein determining the crop mask for the region of interest based on the green value of each of the pixels of the received image data comprises:
comparing the green value of each of the pixels to a threshold value;
determining that the respective pixel corresponds to vegetation within the region of interest based on determining that the green value of the respective pixel exceeds the threshold value; and
determining that the respective pixel corresponds to an absence of vegetation within the region of interest based on determining that the green value of the respective pixel does not exceed the threshold value.

4. The method of claim 3, wherein determining the threshold value comprises determining, via Otsu's method, the threshold value so as to minimize a variance between the threshold value and the green values of each of the pixels of the received image data for the region of interest.

5. The method of claim 1, wherein determining the rows of crops within the region of interest based on the determined crop mask comprises:
    determining a plurality of starting locations of the rows of crops within the region of interest, each of the plurality of starting locations corresponding to at least one vegetation element of the crop mask;
    determining a row angle of the rows of crops within the region of interest, the row angle measured relative to an orientation direction of the received image data for the region of interest; and
    determining the rows of crops as extending from each of the plurality of starting locations in a direction of the row angle.

6. The method of claim 5, wherein determining the row angle of the rows of crops within the region of interest comprises:
    determining a number of vegetation elements of the crop mask corresponding to each of a plurality of candidate row angles;
    determining a dominant row angle as one of the plurality of candidate row angles corresponding to a greatest number of vegetation elements of the crop mask; and
    determining the row angle of the rows of crops within the region of interest as the dominant row angle.

7. The method of claim 6, wherein determining the number of vegetation elements of the crop mask corresponding to each of the plurality of candidate row angles comprises determining the number of vegetation elements of the crop mask corresponding to each of the plurality of candidate row angles via a Hough transform of the crop mask.

8. The method of claim 1, further comprising:
    segregating, by the computing device, data representative of the growing crops into a plurality of groups based on one or more parameters of a category of the received data for the region of interest;
    wherein determining the stand status of the growing crops within the region of interest comprises determining the stand status for each of the plurality of groups; and
    wherein the method further comprises:
        comparing, by the computing device, the stand status of each of the plurality of groups to at least one benchmark criterion; and
        outputting, by the computing device, an indication of the comparison.

9. The method of claim 8,
    wherein the quantity status indicates an expected yield of the growing crops within each respective group;
    wherein the at least one benchmark criterion includes a benchmark yield criterion; and
    wherein comparing the stand status of each of the plurality of groups to at least one benchmark criterion comprises comparing the expected yield of the growing crops within each respective group to the benchmark yield criterion to determine an expected yield loss of the growing crops within each respective group.

10. The method of claim 9, wherein receiving the data for the region of interest comprises receiving first data for the region of interest, the method further comprising:
    receiving, by the computing device, second data for the region of interest, the second data including data representative of a harvested yield of the growing crops; and
    comparing, by the computing device, the data representative of the harvested yield to the benchmark yield criterion to determine a calculated yield loss of the growing crops within each respective group; and
    outputting, by the computing device, an indication of the comparison of the calculated yield loss of the growing crops within each respective group.

11. The method of claim 8,
    wherein the category of received data comprises a seed treatment category;
    wherein the one or more parameters of the seed treatment category identify a type of treatment associated with the growing crops; and
    wherein segregating the data representative of the growing crops into the plurality of groups comprises segregating the data representative of the growing crops into the plurality of groups according to a seed treatment associated with each of the growing crops.

12. The method of claim 8,
    wherein the category of received data comprises a soil compaction category;
    wherein the one or more parameters of the soil compaction category indicate proximity of the growing crops to a path of a support structure of equipment used to plant the growing crops; and
    wherein segregating the data representative of the growing crops into the plurality of groups comprises segregating the data representative of the growing crops into the plurality of groups according to a proximity of each of the growing crops to the path of the support structure of the equipment used to plant the growing crops.

13. The method of claim 8,
    wherein the category of received data comprises a soil type category;
    wherein the one or more parameters of the soil type category indicate a type of soil associated with the growing crops; and
    wherein segregating the data representative of the growing crops into the plurality of groups comprises segregating the data representative of the growing crops into the plurality of groups according to a soil type associated with each of the growing crops.

14. The method of claim 8,
    wherein the category of received data comprises a seed type category;
    wherein the one or more parameters of the seed type category indicate a type of seed associated with the growing crops; and
    wherein segregating the data representative of the growing crops into the plurality of groups comprises segregating the data representative of the growing crops into the plurality of groups according to a seed type associated with each of the growing crops.

15. The method of claim 8,
    wherein the category of received data comprises a drain tile category;
    wherein the one or more parameters of the drain tile category indicate proximity of the growing crops to drain tail; and
    wherein segregating the data representative of the growing crops into the plurality of groups comprises segregating the data representative of the growing crops into the plurality of groups according to a proximity of each of the growing crops to drain tile.

16. The method of claim 8,
    wherein the category of received data comprises a ground surface residue category;

wherein the one or more parameters of the ground surface residue category indicate an amount of ground surface residue associated with the growing crops; and wherein segregating the data representative of the growing crops into the plurality of groups comprises segregating the data representative of the growing crops into the plurality of groups according to an amount of ground surface residue associated with each of the growing crops.

17. The method of claim 8, wherein the category of received data comprises a planter equipment speed category;

wherein the one or more parameters of the planter equipment speed category indicate a planter equipment speed associated with the growing crops; and wherein segregating the data representative of the growing crops into the plurality of groups comprises segregating the data representative of the growing crops into the plurality of groups according to a speed associated with each of the growing crops of the planter equipment used to plant the growing crops.

18. A system comprising:

a computing device comprising at least one processor; and computer-readable memory encoded with instructions that, when executed by the at least one processor, cause the computing device to:

receive data for a region of interest that includes growing crops, wherein the received data for the region of interest comprises image data for the region of interest;

determine a crop mask for the region of interest, the crop mask comprising a plurality of elements, each of the plurality of elements corresponding to a pixel of the image data for the region of interest and categorized as one of a vegetation element indicating that a corresponding pixel of the received image data is associated with vegetation within the region of interest and a non-vegetation element indicating that a corresponding pixel of the received image data is associated with an absence of vegetation within the region of interest; and determine the rows of crops within the region of interest based on the determined crop mask; and determine, based on the received data for the region of interest associated with portions of the region of interest included in the identified rows of crops and excluding portions of the region of interest outside the rows of crops, a stand status of the growing crops within the region of interest, the stand status comprising a quantity status corresponding to a population of crops within the region of interest.

19. A method comprising:

receiving, by a computing device, data for a region of interest that includes growing crops, wherein the received data for the region of interest comprises image data for the region of interest;

segregating, by the computing device, the image data for the region of interest into a plurality of tiles, each tile from the plurality of tiles including image data corresponding to a different geographical portion of the region of interest;

determining, by the computing device, a plurality of crop masks, each of the plurality of crop masks corresponding to one of the plurality of tiles and including a plurality of elements, each of the plurality of elements corresponding to a pixel of image data included in the respective tile and categorized as one of a vegetation element indicating that the respective pixel is associated with vegetation within the respective tile and a non-vegetation element indicating that the respective pixel is associated with an absence of vegetation within the respective tile;

determining, by the computing device for each of the plurality of crop masks, a number of vegetation elements of the respective crop mask corresponding to each of a plurality of candidate row angles;

determining, by the computing device for each of the plurality of crop masks, a dominant row angle as one of the plurality of candidate row angles for the respective crop mask corresponding to a greatest number of vegetation elements;

identifying, by the computing device for each of the plurality of tiles, rows of crops within the geographical portion of the region of interest corresponding to the respective tile based on the determined dominant row angle of the crop mask corresponding to the respective tile; and determining, by the computing device, a stand status of the growing crops within the region of interest based on the received data for the region of interest associated with geographical portions of the region of interest included in the identified rows of crops within each of the plurality of tiles and excluding geographical portions of the region of interest outside the identified rows of crops.

* * * * *